(12) United States Patent
Crow et al.

(10) Patent No.: US 11,696,004 B2
(45) Date of Patent: Jul. 4, 2023

(54) IMAGE CAPTURE DEVICE

(71) Applicant: GoPro, Inc., San Mateo, CA (US)

(72) Inventors: Kielan C. Crow, San Mateo, CA (US); Nicholas Vitale, Foster City, CA (US); Marco Marroquin, San Mateo, CA (US); Matthew David Thomas, Castro Valley, CA (US); Jordan Zook Todd, Piedmont, CA (US); John George Muhlenkamp, IV, Brisbane, CA (US); Huy Phuong Nguyen, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 72 days.

(21) Appl. No.: 17/028,934

(22) Filed: Sep. 22, 2020

(65) Prior Publication Data

US 2021/0112182 A1    Apr. 15, 2021

Related U.S. Application Data

(63) Continuation-in-part of application No. 29/706,013, filed on Sep. 17, 2019, now Pat. No. Des. 920,419, (Continued)

(51) Int. Cl.
*H04N 5/225* (2006.01)
*H04N 5/232* (2006.01)
(Continued)

(52) U.S. Cl.
CPC ............. *H04N 23/51* (2023.01); *H04N 23/54* (2023.01); *H04N 23/665* (2023.01)

(58) Field of Classification Search
CPC .............. H04N 5/2252; H04N 5/2253; H04N 5/23227; H04N 5/22521; H04N 23/51; H04N 23/54; H04N 23/665; H04N 23/52
See application file for complete search history.

(56) References Cited

U.S. PATENT DOCUMENTS 4,295,721 A * 10/1981 Rebikoff .............. H04N 5/2252
396/26
5,092,458 A    3/1992 Yokoyama
(Continued)

OTHER PUBLICATIONS

International Preliminary Report on Patentability for App. No. PCT/US2020/012030, dated Jun. 16, 2021, 8 pages.
(Continued)

*Primary Examiner* — Timothy J Henn
(74) *Attorney, Agent, or Firm* — Young Basile Hanlon & MacFarlane, P.C.

(57) ABSTRACT

An image capture device includes electronic components and a body. The electronic components include an image sensor and a processing apparatus. The body defines an internal compartment containing the electronic components. The body includes a rear housing and a chassis. The rear housing extends around a top side, a right side, a bottom side, and a left side of the body. The chassis includes an upright portion and a lateral portion extending rearward from the upright portion. The rear housing and the chassis are coupled to each other to cooperatively form the internal compartment with the upright portion of the chassis being coupled to a front end of the rear housing and the lateral portion being positioned outside of and below the internal compartment.

20 Claims, 70 Drawing Sheets

Related U.S. Application Data and a continuation-in-part of application No. 29/705,668, filed on Sep. 13, 2019, now Pat. No. Des. 921,084, and a continuation-in-part of application No. 29/705,667, filed on Sep. 13, 2019, now Pat. No. Des. 911,411, and a continuation-in-part of application No. 29/705,673, filed on Sep. 13, 2019, now Pat. No. Des. 911,412.

(60) Provisional application No. 62/904,176, filed on Sep. 23, 2019.

(51) Int. Cl.
*H04N 23/51* (2023.01)
*H04N 23/54* (2023.01)
*H04N 23/60* (2023.01)

(56) References Cited

U.S. PATENT DOCUMENTS

| | | | |
|---|---|---|---|
| 6,138,826 A | 10/2000 | Kanamori | |
| 7,466,360 B2* | 12/2008 | Lee | H04N 5/2251 |
| | | | 348/E5.025 |
| 8,736,753 B2 | 5/2014 | Kaga | |
| 8,792,050 B2 | 7/2014 | Shinohara | |
| 9,383,628 B1 | 7/2016 | Coons | |
| 10,694,083 B1 | 6/2020 | Thomas | |
| 2004/0041937 A1* | 3/2004 | Oshima | H04N 5/2253 |
| | | | 348/335 |
| 2004/0212727 A1* | 10/2004 | Ariga | H04N 5/2252 |
| | | | 348/E5.026 |
| 2006/0055820 A1* | 3/2006 | Lyon | G08B 13/19619 |
| | | | 348/E5.026 |
| 2007/0046854 A1* | 3/2007 | Doui | G02F 1/133308 |
| | | | 348/E5.026 |
| 2007/0268371 A1 | 11/2007 | Misawa | |
| 2010/0060747 A1 | 3/2010 | Woodman | |
| 2011/0273859 A1* | 11/2011 | Sotsu | H04N 5/2252 |
| | | | 361/803 |
| 2012/0155037 A1* | 6/2012 | Yamamoto | H04N 5/2252 |
| | | | 361/679.01 |
| 2012/0262618 A1 | 10/2012 | Weakly | |
| 2013/0021522 A1* | 1/2013 | Yamada | H04N 5/2253 |
| | | | 348/E5.025 |
| 2014/0353178 A1 | 12/2014 | Kim | |
| 2016/0062217 A1 | 3/2016 | Slater | |
| 2016/0072992 A1* | 3/2016 | Doshin | H04N 5/2251 |
| | | | 348/371 |
| 2017/0078537 A1 | 3/2017 | Peddecord | |
| 2017/0108759 A1* | 4/2017 | Clearman | G03B 17/561 |
| 2017/0339319 A1 | 11/2017 | Woodman | |
| 2018/0095343 A1 | 4/2018 | Wroblewski | |
| 2019/0174623 A1* | 6/2019 | Owaki | H05K 1/0215 |
| 2019/0278960 A1 | 9/2019 | Russell | |

OTHER PUBLICATIONS

International Search Report and Written Opinion issued in PCT/US2020/012030, dated Apr. 16, 2020, 10 pages.

Wasabi Power Extended Battery for GoPro HERO7/HERO6/HERO5/HERO 2018 | 2500mAh: URL: https://www.herogear.com.au/wasabi-power-extended-battery-for-gopro-hero7-hero; retrieved on Jan. 14, 2019, 21 pages.

* cited by examiner

IMAGE CAPTURE DEVICE

CROSS-REFERENCE TO RELATED APPLICATION(S)

This application claims priority to and the benefit of U.S. Provisional Application No. 62/904,176, filed Sep. 23, 2019; this application is a continuation-in-part of U.S. Design application No. 29/705,667, filed Sep. 13, 2019; this application is a continuation-in-part of U.S. Design application No. 29/705,668, filed Sep. 13, 2019; this application is a continuation-in-part of U.S. Design application No. 29/705,673, filed Sep. 13, 2019; and this application is a continuation-in-part of U.S. Design application No. 29/706,013, filed Sep. 17, 2019; the disclosures of the aforementioned applications are incorporated by reference herein in their entireties.

TECHNICAL FIELD

This disclosure relates to image capture devices and, more particularly, structures thereof and housings therefor.

BACKGROUND

An image capture device is an electronic image capture device that captures images and may also record audio. Depending on their environment and types of use, image capture devices may be subject to adverse environmental conditions (e.g., water, debris, temperature) and forces (e.g., impacts with other objects).

SUMMARY

Disclosed herein are implementations of image capture devices, mounts therefor, housings therefor, and systems comprising the same.

In one implementation, an image capture device includes electronic components and a body. The electronic components include an image sensor and a processing apparatus. The body defines an internal compartment containing the electronic components. The body includes a rear housing and a chassis. The rear housing extends around a top side, a right side, a bottom side, and a left side of the body. The chassis includes an upright portion and a lateral portion extending rearward from the upright portion. The rear housing and the chassis are coupled to each other to cooperatively form the internal compartment with the upright portion of the chassis being coupled to a front end of the rear housing and the lateral portion being positioned outside of and below the internal compartment.

In one implementation, a housing for an image capture device includes a top side, a right side, a left side, and a bottom side that cooperatively define a cavity for receiving the image capture device therein and that engage the image capture device to prevent movement of the image capture device in the cavity. The bottom side includes a mount aperture that permits a mount coupled to a bottom side of the image capture device to extend through the bottom side to be connectable to a support device.

In one implementation, a housing for an image capture device includes a frame, an electronic component, and an electronic interface. The frame defines a cavity for receiving the image capture device and includes a movable side that opens the frame for receiving the image capture device in the cavity. The electronic component is coupled to the frame. The electronic interface is operatively coupled to the electronic component and faces toward the movable side. The electronic interface is operatively coupled to the electronic component and is connectable with another electronic interface of the image capture device for transferring at least one of signals or power between the electronic component and the image capture device.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

in FIGS. 7N-7U the image capture device is shown in dashed lines.

in FIGS. 8N-8V the image capture device is shown in dashed lines.

in FIGS. 9N-9U the image capture device is shown in dashed lines.

DETAILED DESCRIPTION

Described herein are image capture devices, mounts therefor, housings therefor (e.g., protective or removable housings), and systems that include image capture devices, housings, and other devices. As used herein, the term "image capture device" is an electronic device that captures images. An image capture device is considered to include any electronic device having a primary function of capturing images and having tangential functions related to capturing images, such as storing, processing, displaying or otherwise outputting, and transferring captured images and associated audio. An image capture device is also considered to include any electronic device having other functions unrelated to image capture, such as a communications device having functions for both user communication and image capture (e.g., a smartphone) or a portable computing device having functions for both personal computing and image capture (e.g., a tablet or laptop computer). An image capture device may alternatively be referred to as camera or a digital image capture device.

As discussed in further detail below, the image capture devices and housings disclosed herein include structures and mounts that may provide improved robustness to environmental and usage conditions, which may provide improved reliability and longevity over other image capture devices subject to similar environmental and usage conditions.

Figure 1A:
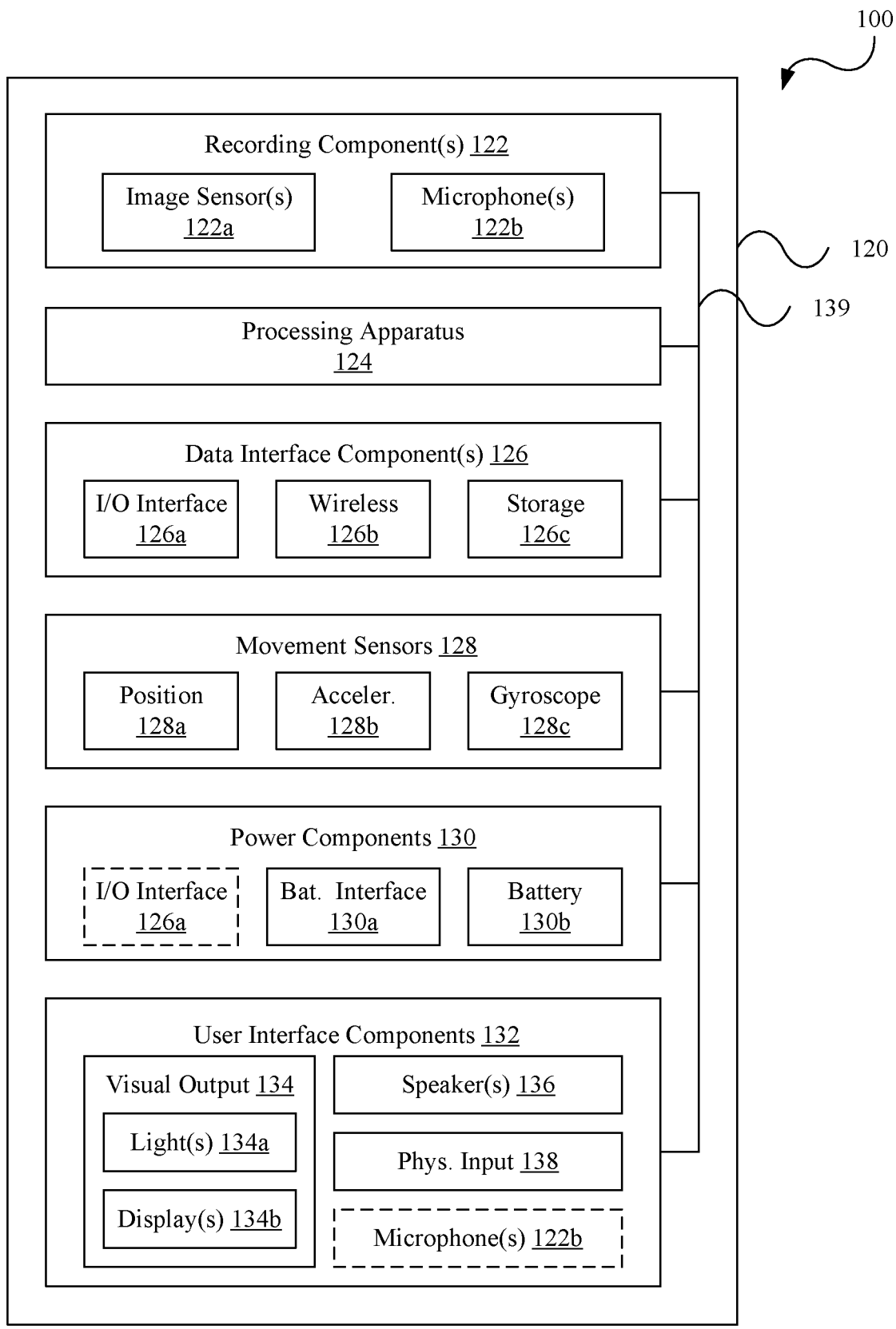
FIG. 1A is a block diagram of electronic components of an image capture device.
Figure 1B:
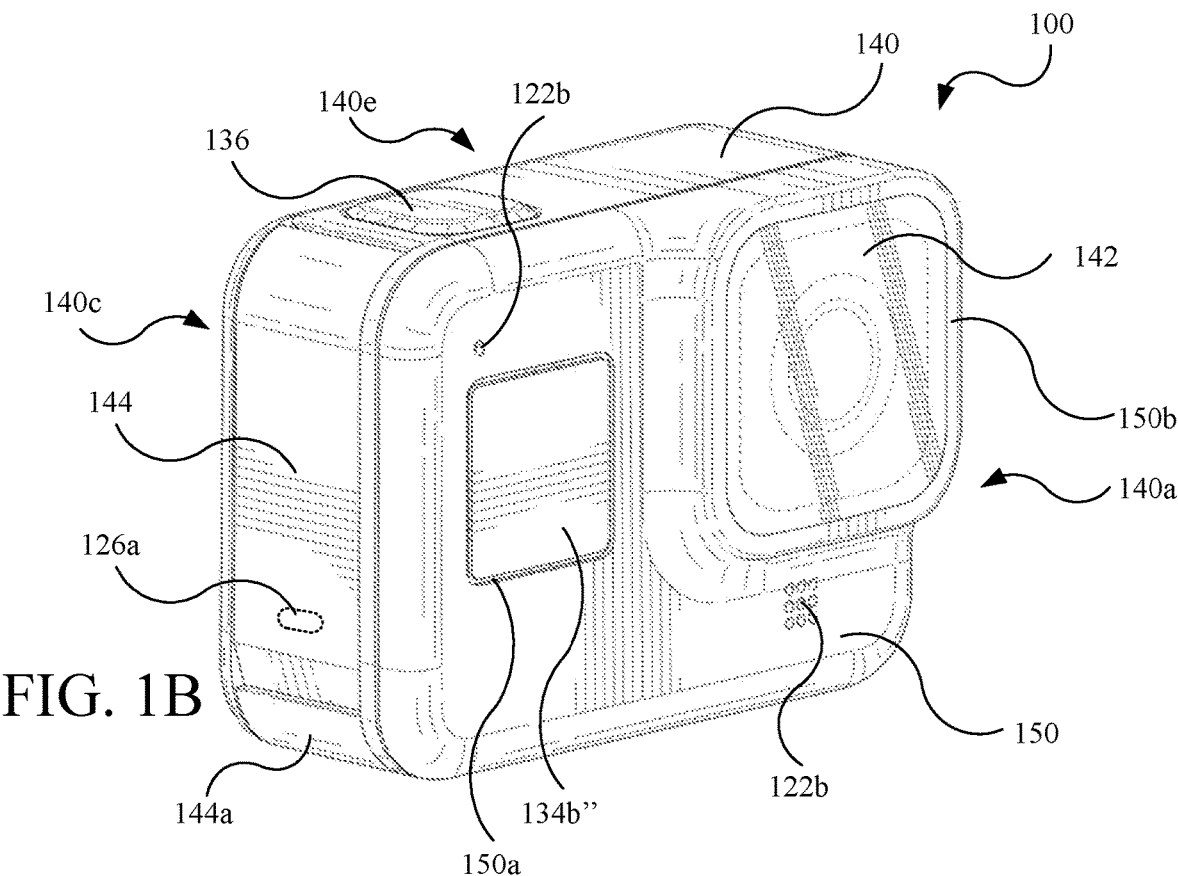
FIG. 1B is an upper, front, left perspective view of an image capture device.

FIG. 1A is a block diagram of electronic components of an image capture device 100. FIGS. 1A and 1B are perspective views of an example of the image capture device 100.

Referring to FIG. 1A, the image capture device 100 includes electronic components 120 and a body 140 that contains or is otherwise coupled to the electronic components 120. The electronic components 120 may generally include capture components 122, a processing apparatus 124, data interface components 126, movement sensors 128, power components 130, and/or user interface components 132.

The capture components 122 include one or more image sensors 122a for capturing images and one or more microphones 122b for capturing audio.

The image sensor 122a is configured to detect light of a certain spectrum (e.g., the visible spectrum or the infrared spectrum) and convey information constituting an image as electrical signals (e.g., analog or digital signals). The image sensor 122a detects light incident through a lens. The image sensor 122a may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor 122a may be passed to other electronic components 120 of the image capture device 100 via a bus 139, such as to the processing apparatus 124. In some implementations, the image sensors 122a includes a digital-to-analog converter. The image sensor 122a may be provided as a camera system-on-chip (SoC), which may include other components (e.g., the processing apparatus 124). A multi-lens variation of the image capture device 100 can include multiple image sensors 122a.

The one or more microphones 122b are configured to detect sound, which may be recorded in conjunction with capturing images to form a video.

The processing apparatus 124 may be configured to perform image signal processing (e.g., filtering, tone mapping, stitching, and/or encoding) to generate output images based on image data from the image sensors 122a. The processing apparatus 124 may include one or more processors having single or multiple processing cores. In some implementations, the processing apparatus 124 may include an application specific integrated circuit (ASIC). For example, the processing apparatus 124 may include a custom image signal processor. The processing apparatus 124 may exchange data (e.g., image data) with other components of the image capture device 100, such as the image sensor 122a, via the bus 139.

The processing apparatus 124 may include memory, such as a random-access memory (RAM) device, flash memory, or another suitable type of storage device, such as a non-transitory computer-readable memory. The memory of the processing apparatus 124 may include executable instructions and data that can be accessed by one or more processors of the processing apparatus 124. For example, the processing apparatus 124 may include one or more dynamic random-access memory (DRAM) modules, such as double data rate synchronous dynamic random-access memory (DDR SDRAM). In some implementations, the processing apparatus 124 may include a digital signal processor (DSP).

The one or more data interface components 126 enable communication between the image capture device 100 and another electronic device, which may be referred to as an external device, such as an external user interface device. The other external electronic device may be a remote control, smartphone, tablet computer, laptop computer, a desktop computer, or a storage device. For example, the data interface components 126 may be considered to form a computing communication link that may be used to receive commands for operating the image capture device 100, transfer image data to the other electronic device, and/or transfer other signals or information to and from the image capture device 100. The data interface components 126 may be configured for wired and/or wireless communication. For example, the data interface components 126 may include an I/O interface 126a that provides wired communication for the image capture device 100, which may be a USB interface (e.g., USB type-C), a high-definition multimedia interface (HDMI), a FireWire interface, and/or any other suitable wired communications link (e.g., a digital video interface, a display port interface, such as a Video Electronics Standards Association (VESA) digital display interface, an Ethernet, a Thunderbolt link, or other wired computing communication link). The data interface components 126 may include a wireless data interface 126b that provides wireless communication for the image capture device 100, such as being a Bluetooth interface, a ZigBee interface, a Wi-Fi interface, and/or any other suitable wireless communication link (e.g., infrared, near field communications (NFC), such as an ISO/IEC 20643 protocol, an Advanced Network Technology interoperability (ANT+)). The data interface components 126 may include a storage interface 126c, such as a memory card slot, that is configured to receive and operatively couple to a storage device (e.g., a memory card) for data transfer with the image capture device 100 (e.g., for storing captured images and/or recorded audio).

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

The movement sensors 128 may detect the position and movement of the image capture device 100. The movement sensors 128 include one or more of a position sensor 128a, an accelerometer 128b, or a gyroscope 128c. The position sensor 128a, such as a global positioning system (GPS) sensor, is used to determine a position of the image capture device 100. The accelerometer 128b, such as a three-axis accelerometer, measures linear motion (e.g., linear acceleration) of the image capture device 100. The gyroscope 128c, such as a three-axis gyroscope, measures rotational motion (e.g., rate of rotation) of the image capture device 100.

The power components 130 receive, store, and/or provide power for operating the image capture device 100. The power components 130 may include a battery interface 130a and a battery 130b. The battery interface 130a operatively couples to the battery 130b, for example, with conductive contacts to transfer power from the battery 130b to the other electronic components of the image capture device 100. The power components 130 may also include the I/O interface 126a, which may receive power from an external source, such as a wall plug or external battery, for operating the image capture device 100 and/or charging the battery 130b of the image capture device 100. For example, the I/O interface 126a may function to transfer both data and power.

The user interface components 132 allow the user to interact with the image capture device 100, for example, providing outputs to the user and receiving inputs from the user. The user interface components 132 may include one or more visual output components 134 that visually communicate information and/or present captured images to the user. The visual output components 134 may include one or more lights 134a and/or one or more displays 134b. One or more of the displays 134b may be configured as a touch screen that receives inputs from the user. The user interface components 132 may also include one or more speakers 136, which function as audio output components that audibly communicate information and/or present recorded audio to the user. The user interface components 132 may also include one or more physical input interfaces 138 that are physically manipulated by the user to provide input to the image capture device 100. The physical input interfaces 138 may, for example, be configured as buttons or switches. The user interface components 132, as indicated in dotted lines, may also be considered to include the one or more microphones 122b, which may function to receive audio inputs from the user, such as voice commands.

Figure 1C:
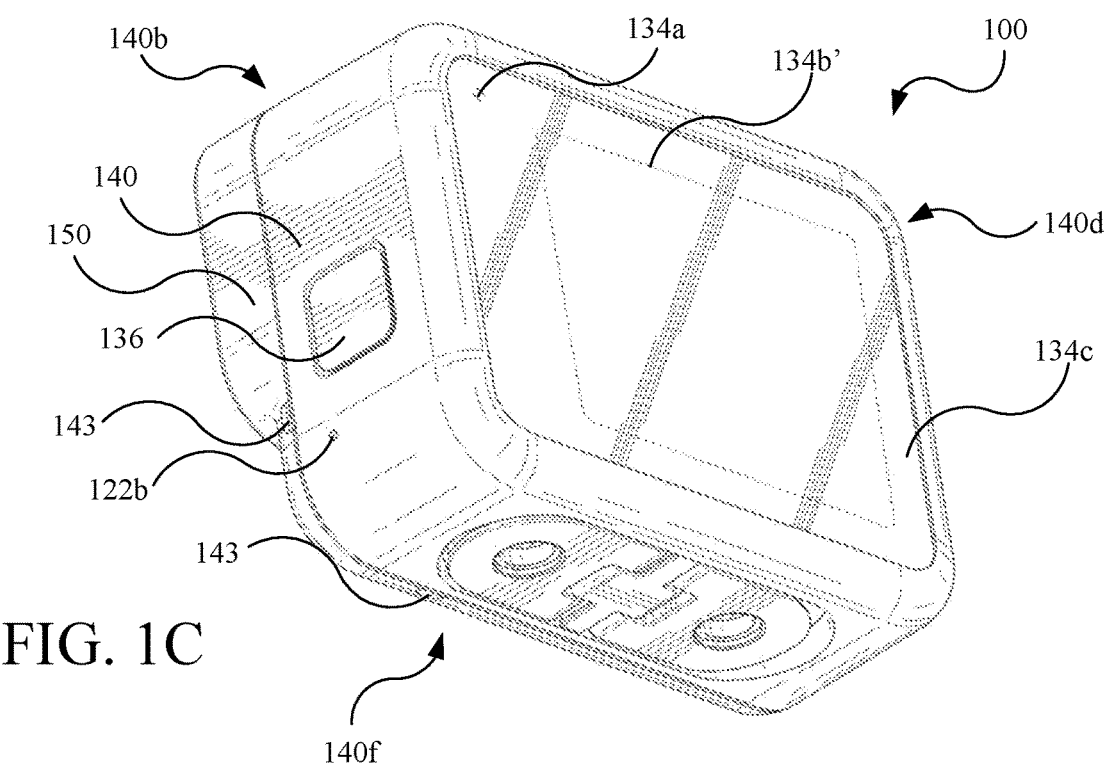
FIG. 1C is a lower, rear, right perspective view of the image capture device of FIG. 1B.

Referring first to FIGS. 1B and 1C, the image capture device 100 includes the body 140, one or more lenses 142 (e.g., one as shown), and one or more doors 144 (e.g., one as shown).

The body 140 of the image capture device 100 includes exterior surfaces of the image capture device 100 and houses and protects internal electronic components. In the present example, the exterior includes six sides (i.e., a front side 140a, a left side 140b, a right side 140c, a back side 140d, a top side 140e, and a bottom side 140f) that form a rectangular cuboid. Various sides of the body 140 may include and/or be formed by various other components, such as the lens 142 and the displays 134b (as discussed below). In other embodiments, the exterior may have a different shape. Components forming the body 140 of the image capture device 100 may be made of one or more rigid materials such as plastic, aluminum, steel, or fiberglass.

As illustrated, the lens 142 may be arranged on the front side 140a of the body 140. The lens 142, as shown, allows light to pass therethrough to an image sensor (discussed in further detail below) that is contained in the body 140. The lens 142 is a transparent structure that protects internal components of the image capture device 100, such as the image sensor 122a and an optical element (e.g., refractive lens).

The image capture device 100 may include one or more of the microphones 122b, which are configured to receive and record audio signals in conjunction with recording video. The microphones 122b may also detect sound that includes voice commands from the user for operating the image capture device 100. The image capture device 100 may also include another microphone (not shown) integrated into the body 140. The front surface of the image capture device 100 may include two drainage ports as part of a drainage channel 143.

The image capture device 100 may include the I/O interface 126a (e.g., hidden as indicated using dotted lines), such as a universal serial bus (USB) type-C socket or other standardized or proprietary interface. As best shown in FIG. 1B, the I/O interface 126a can be covered by the door 144 of the image capture device 100. The door 144 is hingedly coupled to the body 140 of the image capture device 100 and can be secured to the body, for example, using a latch 144a that releasably engages the body 140 generally opposite the hinge. The door 144 may, in addition to covering the I/O interface 126a, cover other types of electronic interfaces (not shown) of the image capture device 100, such as a storage interface 126c that receives a storage device (e.g., a memory card) and/or the battery interface 130a that operatively couples to the battery 130b. The door 144 may seal with the body 140, for example, providing a watertight seal that prevents water and other debris from reaching the I/O interface 126a and the other electronic interfaces. The door 144 may also be removable from the body 140.

As referenced above, the image capture device 100 may include one or more visual output components 134, which may include one or more lights 134a (e.g., light-emitting diodes or LEDs) and displays 134b (e.g., liquid crystal display screens or LCDs). The visual output components 134 communicate various information to the user about the image capture device 100. The lights 134a may be illuminated in various patterns and/or colors, for example, to indicate that the image capture device 100 is currently recording. The one or more displays 134b may display images and information, such as image capture information (e.g., resolution, frames-per-second), image capture mode (e.g., still frame or video), or status information of the image capture device 100 (e.g., recording time or battery life remaining). As shown, the displays 134b arranged on each of the front side 140a (e.g., a front display screen 134b") and the back side 140d (e.g., a rear display screen 134b') of the body 140 of the image capture device 100.

As referenced above, one or more of the displays 134b may be configured as an interactive display that allows for interaction with the image capture device 100 while simultaneously displaying information on a surface of the image capture device 100. For example, the rear display screen 134b' on the back side 140d of the body 140 may be a touch screen that detects user touch (e.g., capacitively) for receiving user inputs for controlling various operations of the image capture device 100.

The image capture device 100 may also include the physical input interfaces 138, such as buttons or switches configured to allow a user to control electronic operations the image capture device 100. The physical input interfaces 138 may allow a user to turn the image capture device 100 on, select between different modes of operation, and/or to instruct the device to capture images (e.g., still images or video). For example, as shown in FIG. 1B, one of the physical input interfaces 138 is a button positioned on the top side 140e of the body 140 and is configured as a shutter button that, when pressed by the user, causes the image capture device 100 to capture one or more images. As another example, as shown in FIG. 1C, one of the physical input interfaces 138 is a button that is positioned on the left side 140b of the image capture device 100 and is configured as a mode button that, when pressed by the user, causes the image capture device 100 to change between modes, such as between modes for capturing still images, capturing video, or playback of still images or video. The image capture device 100 may further include other physical input interfaces, such as other buttons, switches, hinges, or latches configure to allow the user to operate various mechanical features of the image capture device 100, such as doors or other access panels.

Figure 2A:
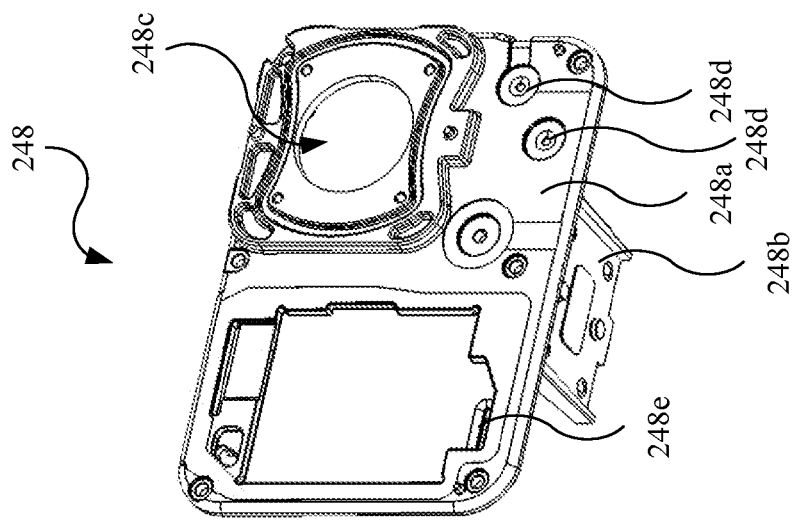
FIG. 2A is lower, front, left partial exploded view of a rear housing, seal, and chassis components of the image capture device of FIG. 1B.
Figure 2A:
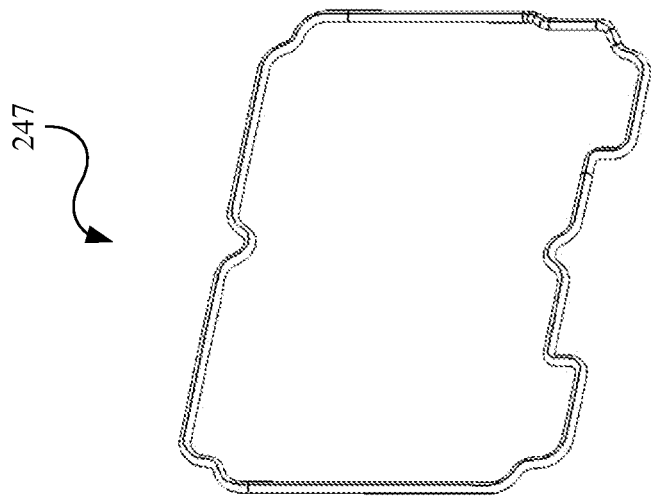
Figure 2A:
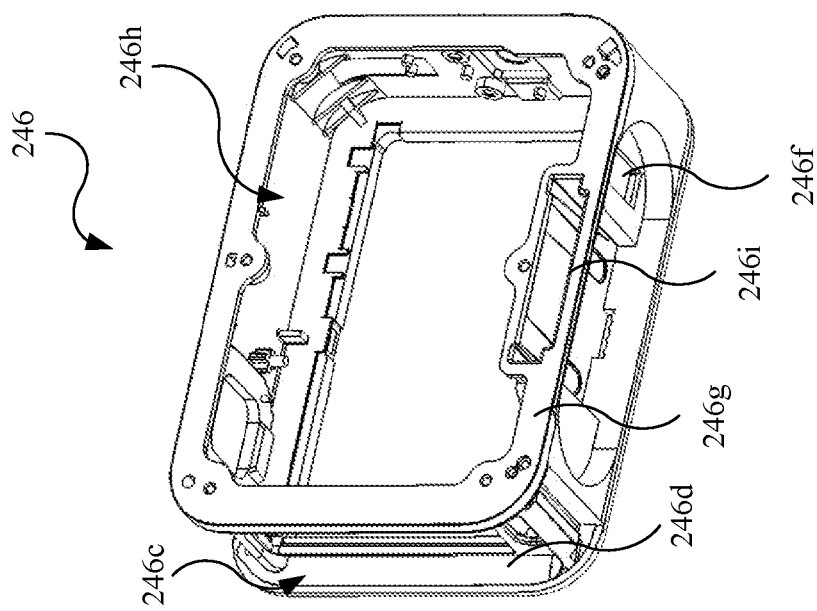
Figure 2B:
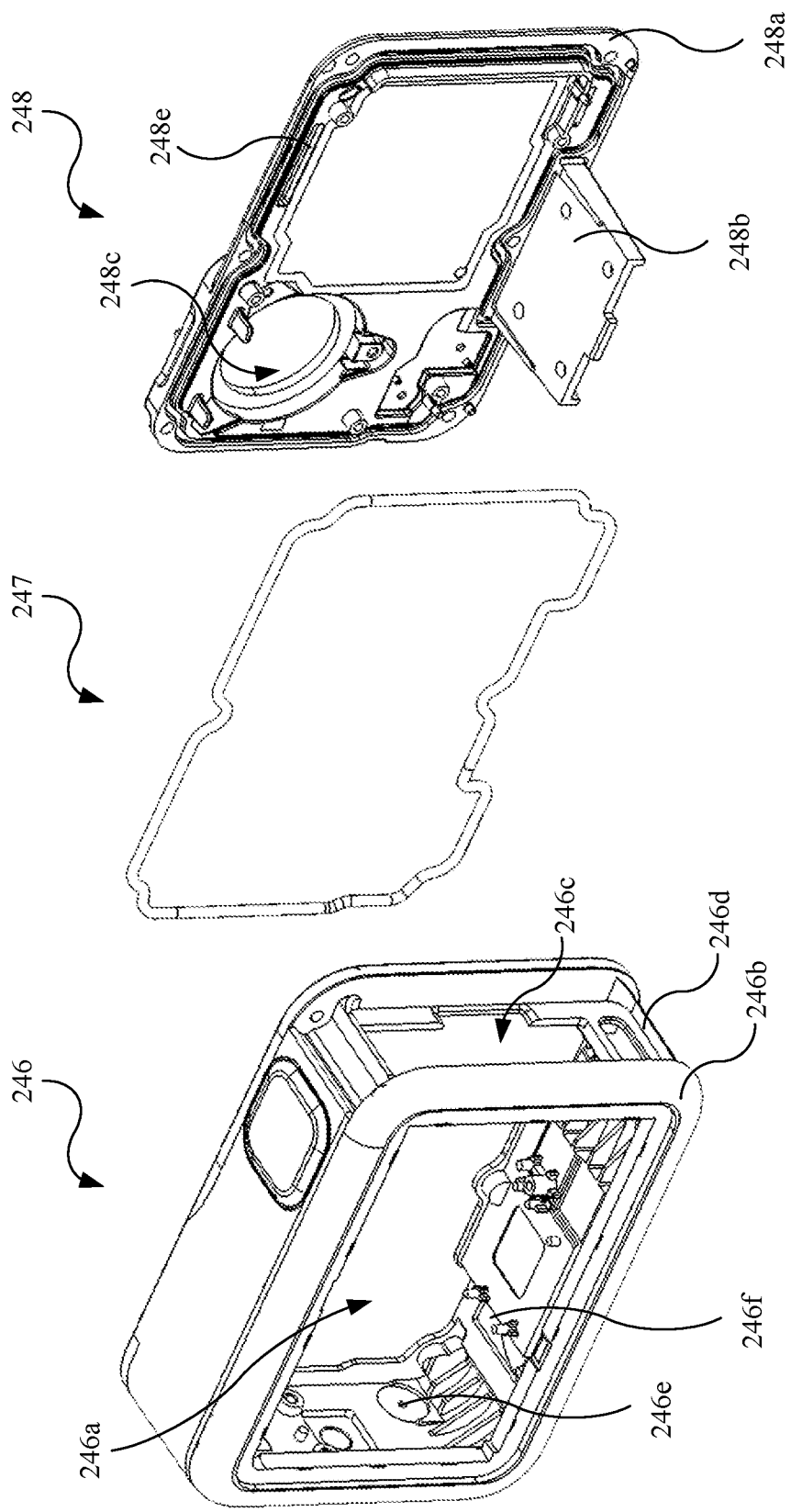
FIG. 2B is an upper, rear, right partial exploded view of the rear housing, seal, and chassis components of the image capture device of FIG. 1B.

Referring to FIGS. 2A to 2B, the body 140 of the image capture device 100 defines an internal compartment that contains various of the electronic components 120 and that may be waterproof. The body 140 generally includes primary structural components of a rear housing 246, a chassis 248, and a front housing cover 150. The body 140 may be considered to further include the displays 134b, as referenced above, or others of the electronic components 120 that form an outer surface of the body 140 and/or seal apertures of the primary structural components of the body 140. The body 140 may also be considered to further include the door 144, which forms an outer surface of the body 140 and may engage other portions of the body 140 to seal an aperture of the primary structural components of the body 140.

The rear housing 246 and the chassis 248 are coupled together to cooperatively form the internal compartment. The rear housing 246 is the primary structure at the rear of the body 140 and generally defines the overall shape of the image capture device 100 extending from the back side 140d to proximate the front side 140a and around the top side 140e, the right side 140c, the bottom side 140f, and the left side 140b of the body 140. The chassis 248 is coupled to a front end of the rear housing 246 to form a seal therebetween. The chassis 248 functions as the primary structural component to which various of the electronic components 120 are connected and which functions as a heat sink for conducting thermal energy away from the electronic components 120.

The rear housing 246 includes various apertures that are sealed by other components of the image capture device 100. The rear housing 246 defines a display opening 246a that is sealed by one of the display 134b and, in particular, the rear display screen 134b'. The rear housing 246 forms a display bezel 246b that defines the display opening 246a and is configured as a flange that protrudes inward from the top side 140e, the right side 140c, the bottom side 140f, and the left side 140b. The display bezel 246b includes an outer portion and an inner portion, which define a recess in which is received a display cover 134c of the rear display screen 134b'. The outer portion forms an exterior surface of the body 140, and the inner portion is inset relative to the exterior surface to form the recess. The display cover 134c of the rear display screen 134b' is a transparent protective layer of suitable material (e.g., glass or polycarbonate) that forms an exterior surface of the rear display screen 134b'. An outer periphery of an inward-facing surface of the display cover 134c is continuously coupled (e.g., adhered) to the exterior-facing surface of the inner portion of the display bezel 246b, thereby forming a waterproof seal between the rear housing 246 and the rear display screen 134b'. The exterior surface of the display bezel 246b and the exterior surface of the display cover 134b" cooperatively form the exterior surface of the back side 140d (e.g., a rear surface) of the body 140 of the image capture device 100.

Figure 3A:
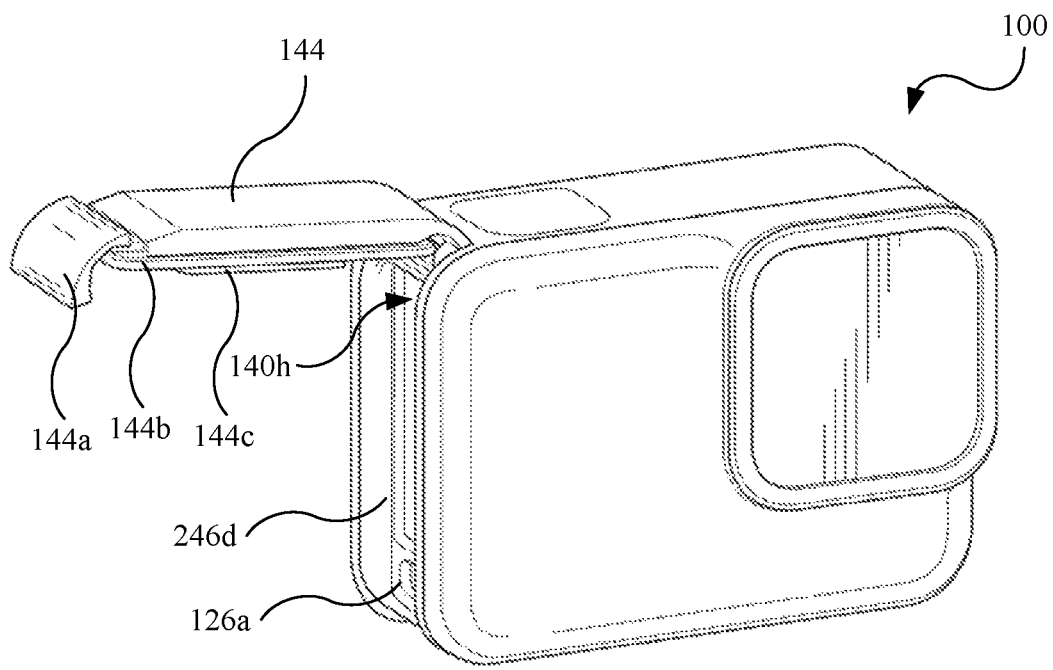
FIG. 3A is an upper, front, left perspective view of the image capture device of FIG. 1B shown in simplified form and with a door in an open position.
Figure 3B:
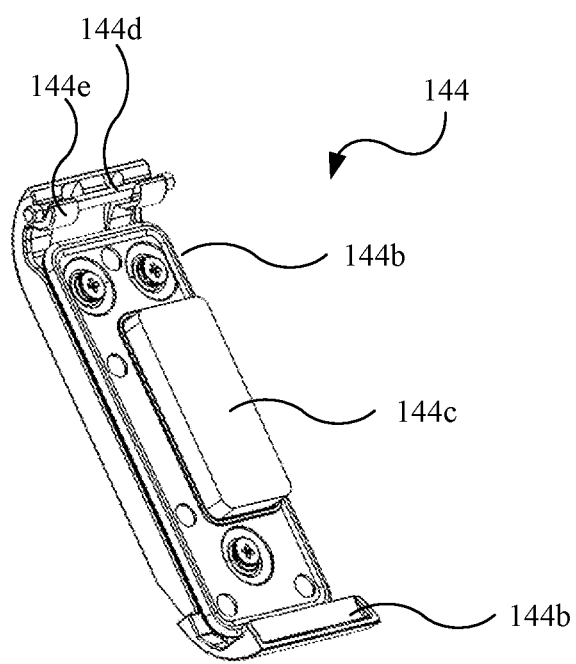
FIG. 3B is a perspective view of the door of the image capture device of FIGS. 1B and 3A.

Still referring to FIGS. 2A and 2B, and additionally referring to FIGS. 3A and 3B, the rear housing 246 defines a door opening 246c that is sealed by the door 144. The door opening 246c opens the internal compartment of the body 140. The door opening 246c is provided on one side of the body 140, such as the right side 140c (as shown). One end of the door 144 (e.g., an upper end) is hingedly coupled to the body 140, for example, to the rear housing 246. Another end of the door 144 (e.g., a lower end) is releasably coupled to the body 140, for example, with a latch 144a. The latch 144a, as shown, may be part of the door 144, which rotates with the door 144 and releasably engages the body 140 and, in particular, the rear housing 246. The door 144, including the latch 144a, spans a substantial majority of the height of the body 140 (e.g., 90% or more of the height, such as a near entirety thereof), for example, from the top side 140e to the bottom side 140f. The door 144 may also span a majority of a thickness of the body 140 (e.g., 50% or more. As a result, the door 144 may form a majority (e.g., 50% or more) of the surface area of a side of the body 140 (e.g., the right side 140c).

Opening the door 144 provides access to various interfaces of the image capture device 100, which are located within the internal compartment. For example, the door 144 may provide access through the door opening 246c to a battery receptacle 140h and the battery interface 130a (not shown), the I/O interface 126a, and the storage interface 126c (not shown). The body 140 defines the battery receptacle 140h within the internal compartment, which extends from the door opening 246c inward into the internal compartment. The battery receptacle 140h is configured to receive the battery 130b therein and includes the battery interface 130a (e.g., conductive contacts; not shown) at an inner end thereof for operatively connecting to the battery 130b for power transfer therebetween. The I/O interface 126a (e.g., a USB type-C receptacle) and the storage interface 126c (e.g., a memory card slot; not shown or labeled) are provided proximate the door opening 246c of the body 140 (e.g., of the rear housing 246).

The door 144 forms a seal with the body 140 and, more particularly, with the rear housing 246 proximate the door opening 246c. For example, as shown, the door 144 includes a seal 144b that peripherally engages the rear housing 246 outward of the door opening 246c. For example, as shown, the rear housing 246 includes an outwardly-extending peripheral flange 246d that engages the seal 144b and compresses the seal 144b in a radial direction relative to the door opening 246c.

The door 144 may further be configured to engage the battery 130b, for example, to ensure engagement between the battery 130b and the battery interface 130a. In one example, the door 144 includes a battery pad 144c that is arranged radially inward of the seal 144b and is formed of an elastic, compressible material (e.g., foam or rubber) that presses against the battery 130b.

The door 144 may also be removable from the body 140. For example, the body 140 and, more particularly, the rear housing 246 may include a hinge pin 144d fixedly coupled to an upper end thereof. The upper end of the door 144 includes clips 144e (e.g., C-shaped clips) that removably attach to the hinge pin to form the hinged coupling therebetween.

The rear housing 246 may also include one or more microphone holes 246e and/or one or more speaker holes 246f, which allow sound to be transmitted from the environment to the microphones 122b and from the speaker 132a to the environment, respectively. The microphone hole 246e may, for example, be located on a side of the rear housing 246 opposite the door 144 (e.g., on the left side 140b). The microphone hole 246e may be sealed by the microphone 122b (e.g., a structure thereof) being continuously adhered to an interior surface of the rear housing 246 that surrounds and defines the microphone hole 246e, the internal compartment such that the internal compartment is waterproof.

The speaker hole 246f may, for example, be located on the bottom side 140f of the body 140 image capture device 100. The speaker hole 246f may be sealed by the speaker 132a being continuously adhered to an interior surface of the rear housing 246 that surrounds and defines the speaker hole 246f, so such that the internal compartment is waterproof. As will be discussed in further detail below, the speaker hole 246f may be covered by a movable mount of the image capture device 100.

The rear housing 246 is a singular structure. For example, the rear housing 246 may be an injection molded thermoplastic (e.g., polycarbonate) that is overmolded in select locations with a thermoplastic elastomer (TPE). The thermoplastic may form the exterior surfaces of various of the sides, while the thermoplastic elastomer may form other surfaces, such as the physical input interfaces 138 (e.g., buttons) and the display bezel 246b. As provided on the display bezel 246b, the thermoplastic elastomer may also provide shock protection to the image capture device 100 at corners and edges of the back side 140d of the body 140.

Referring to FIGS. 2A-2B, the chassis 248 is coupled to a front end of the rear housing 246 to form a seal therebetween. The rear housing 246 includes a front flange 246g that extends around a forward periphery of the rear housing 246 and defines a front opening 246h therein.

The chassis 248 generally includes an upright portion 248a and a lateral portion 248b. The upright portion 248a of the chassis 248 is generally rectangular and is coupled to the front end of the rear housing 246 and mates to the front flange 246g, for example, with a seal 247 arranged therebetween to form a seal. The chassis 248 may be coupled to the rear housing 246, for example, with screws (not shown) that are arranged outside the seal 247 and, thereby, outside the internal compartment, such that screw holes (shown; not labeled) do not form leak paths into the internal compartment. The seal 247 is, for example, an O-ring.

Figure 4A:
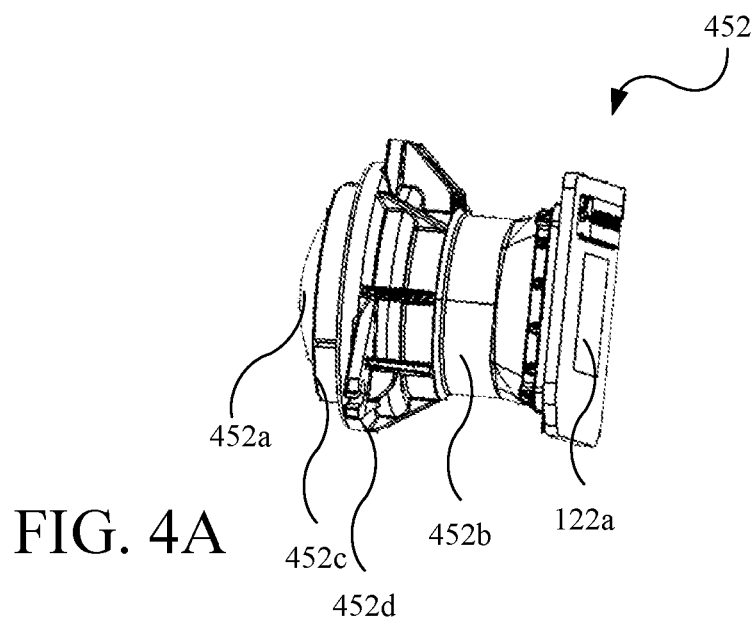
FIG. 4A is a perspective view of a lens assembly of the image capture device of FIG. 1B.
Figure 4B:
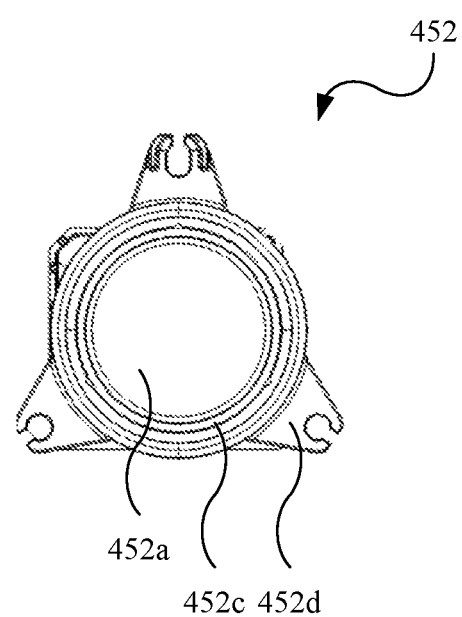
FIG. 4B is a front view of the lens assembly of FIG. 4A.
Figure 5A:
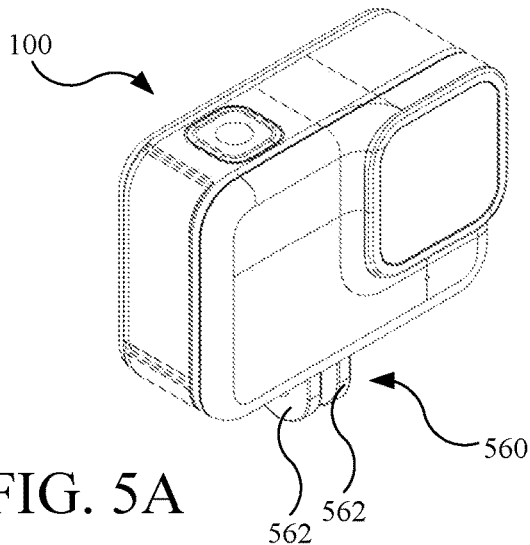
FIGS. 5A-5C are perspective, front, and left side views of the image capture device of FIG. 1B with a mount in an extended configuration.
Figure 5D:
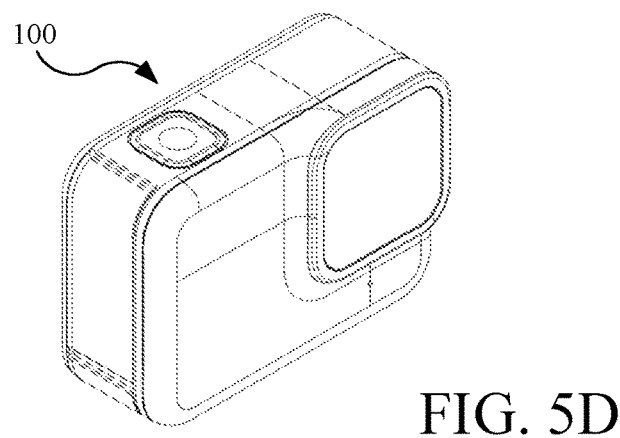
FIGS. 5D-5F are perspective, front, and left side views of the image capture device of FIG. 1B with the mount in a stowed configuration.
Figure 5B:
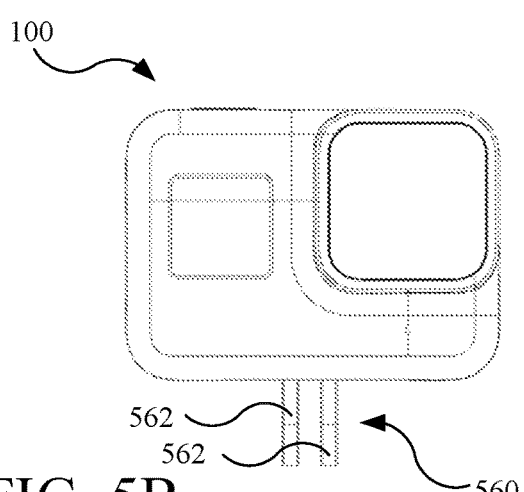
Figure 5E:
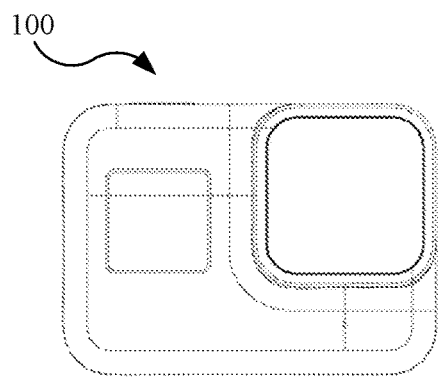
Figure 5C:
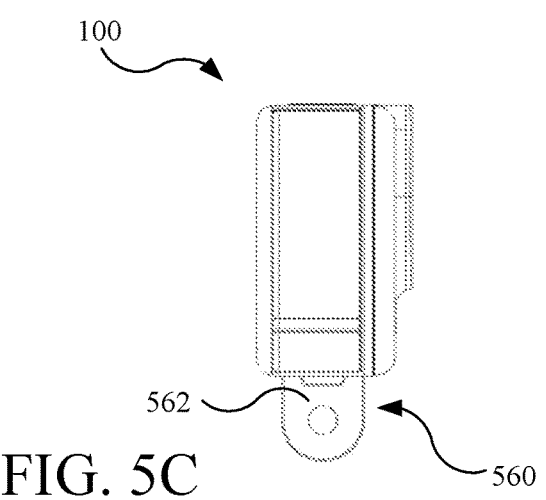
Figure 5F:
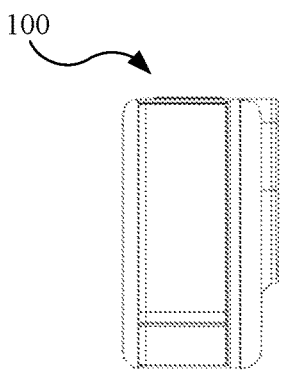
Figure 6A:
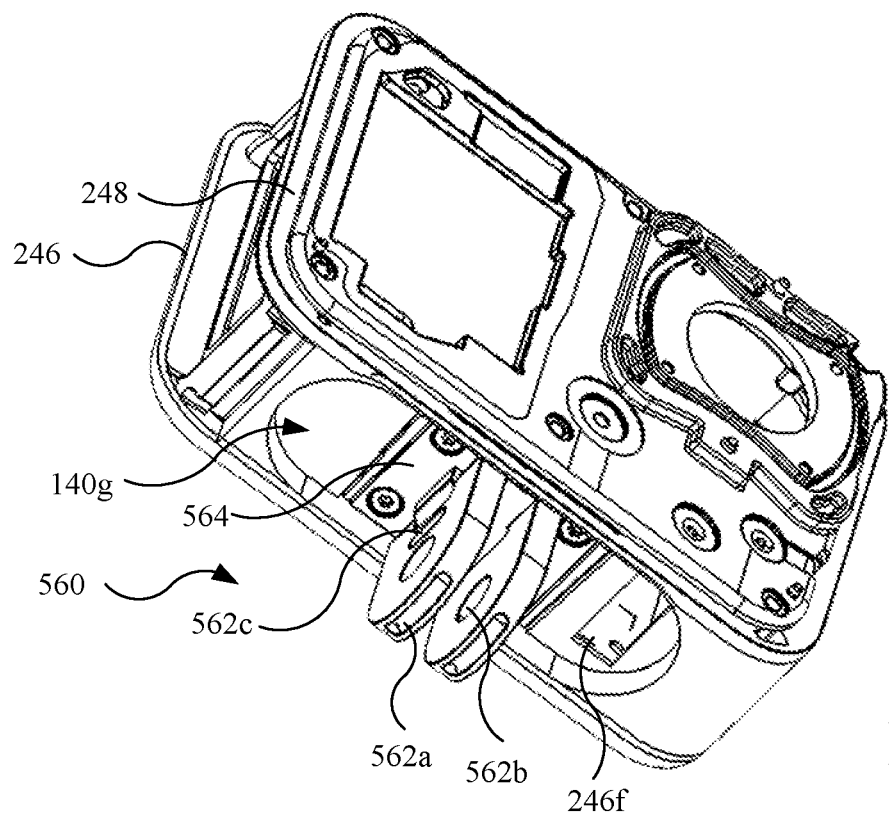
FIG. 6A is a lower, front, left perspective views of a partial assembly of the image capture device of FIG. 1B.
Figure 6B:
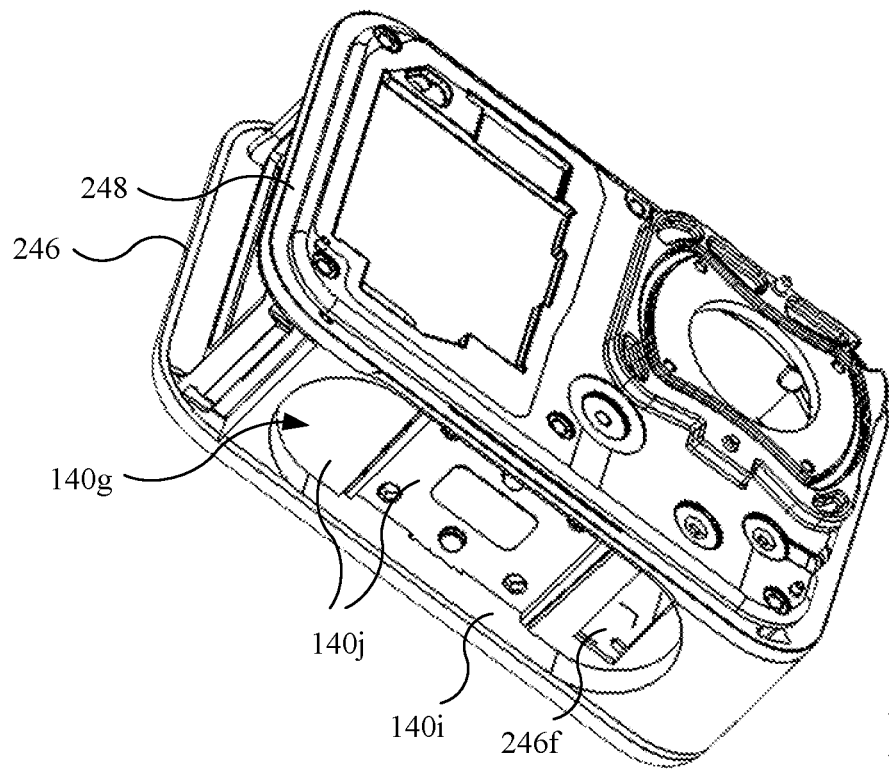
FIG. 6B is a lower, front, left perspective views of a partial assembly of the image capture device as shown in FIG. 6B without a mount.
Figure 6C:
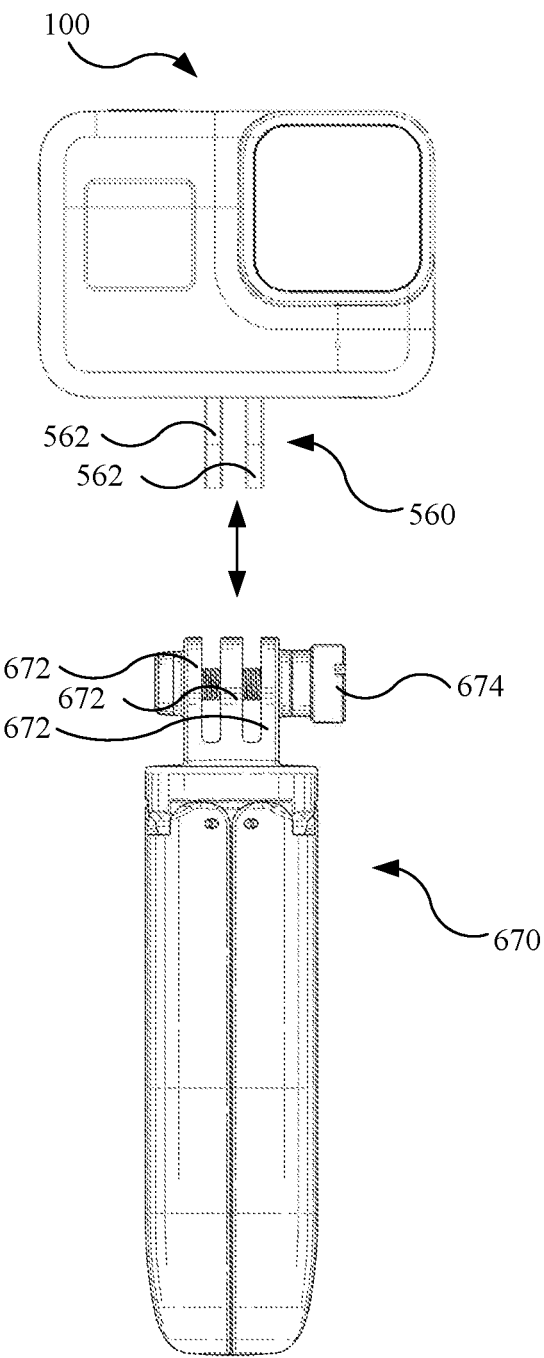
FIG. 6C is a front view of the image capture device of FIG. 1B and a support device therefor.
Figure 6D:
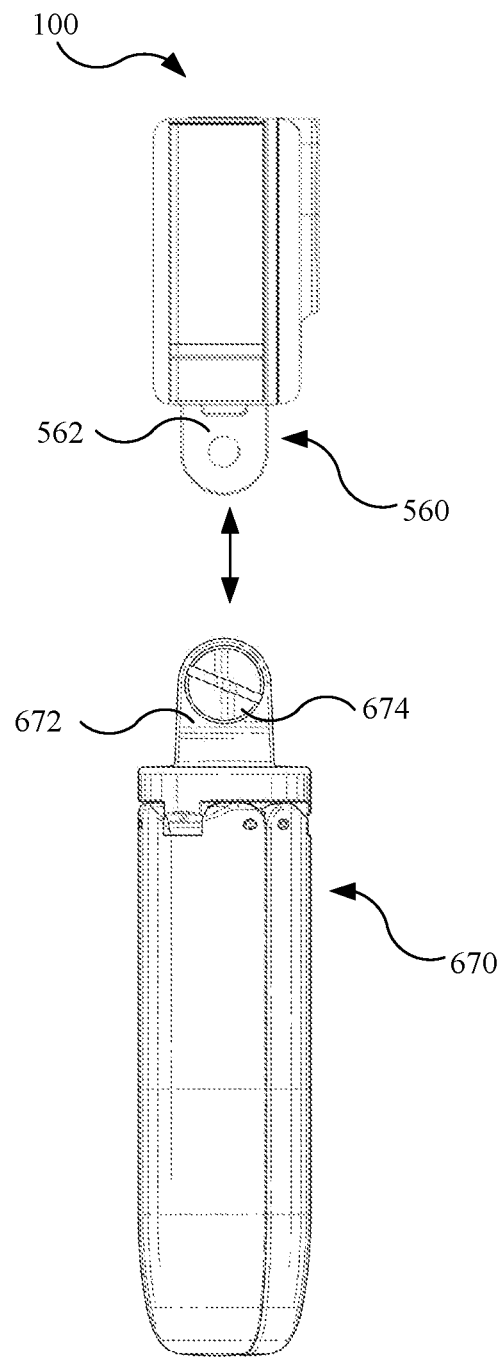
FIG. 6D is a right side view of the image capture device of FIG. 1B and the support device of FIG. 6C.

Still referring to FIGS. 2A and 2B, and additionally to FIGS. 4A and 4B, the upright portion 248a of the chassis 248 includes various apertures that are sealed by other components of the image capture device 100. The chassis 248 includes a lens opening 248c in which is positioned a lens assembly 452. The lens assembly 452 includes an optical element 452a that refracts light (e.g., a lens), the image sensor 122a, and a lens mount 452b (e.g., a lens barrel) by which the optical element 452a is coupled to the image sensor 122a in a fixed position and orientation. The lens mount 452b (as shown) or other structure of the lens assembly 452 also functions to couple the lens assembly 452 to the chassis 248. In particular, the lens mount 452b includes outwardly extending flanges 452d that are coupled to the chassis 248 with threaded fasteners (e.g., screws). A dust seal 452c is arranged between a rearward-facing surface of the chassis 248 around the lens opening 248c and a forward-facing surface of the lens mount 452b around the optical element 452a.

The lens opening 248c of the chassis 248 may be sealed, for example, with the front housing cover 150. The lens 142 is sealed to the front housing cover 150 (e.g., with an adhesive) that, is in turn sealed to a front surface of the chassis 248 around the lens opening 248c. The front housing cover 150 is discussed in further detail below.

The chassis 248 may also include one or more microphone holes 248d, which allow sound to be transmitted between the environment and the microphones 122b. The microphone holes 248d may be sealed by the microphones 122b (e.g., a structure thereof) being continuously adhered to an interior surface of the chassis 248 that surrounds and defines the microphone hole 248d, the internal compartment such that the internal compartment is waterproof.

The chassis 248 may also include one or more display holes 248e by which wires (not shown) are routed from the front display screen 134b" to other electronic components. The display holes 248e are sealed by the front display screen 134b" (or structure coupled thereto), for example, with a gasket (e.g., O-ring) that is arranged and compressed between a rearward-facing surface of the front display screen 134b" and a forward facing surface of the chassis 248 that surrounds the display holes 248e.

The chassis 248, as discussed in further detail below, may also be coupled to a mount of the image capture device 100.

The chassis 248 is formed of a rigid material that may have higher stiffness and/or yield strength than the material or materials forming the rear housing 246 and/or the front housing cover 150. The material forming the chassis 248 may also be more thermally conductive than the materials forming the rear housing 246 and/or the front housing cover 150. For example, the chassis 248 may be a unitary component formed of a metal material, such as aluminum or aluminum alloy that may be cast.

As shown in FIG. 1B, the front housing cover 150 covers from view and is coupled to the chassis 248. The front housing cover 150 may include various apertures. For example, the front housing cover 150 includes microphone holes (identified by the reference numeral "122b" for the microphones 122b), a display aperture 150a, and a lens opening 150b. The microphone holes are aligned with the microphone holes 248d of the chassis 248, which cooperatively permit sound to travel therethrough from the environment to the microphones 122b. One of the microphone holes may be surrounded by indentations in the front housing cover 150, which do not form apertures by not extending entirely through the front housing cover 150. The indentations may provide a visual indication of enhanced audio capabilities of the image capture device 100 as compared to other image captures devices with a single hole.

The front display screen 134b" is positioned within the display aperture 150a.

The lens opening 150b permits light to pass through the front housing cover 150 and to the lens assembly 452. The lens opening 150b may be sealed with the lens 142 described previously. The lens 142 protects the lens assembly 452 thereunder and may be referred to as a cover glass, lens cover, or protective lens cover. The lens 142 may, for example, be formed of glass and have a thickness of approximately 2 mm, more, or less.

The front housing cover 150 is formed of one or more materials that have lower stiffness and/or yield strength than the material forming the chassis 248. For example, the front housing cover 150 may be formed of a polymer, such as a thermoplastic (e.g., polycarbonate) that is overmolded with a thermoplastic elastomer, such as those materials forming the rear housing 246. The thermoplastic elastomer may form a majority of the exterior surface of the front housing cover 150, for example, extending to upper, side, and bottom edges thereof. As a result, the thermoplastic elastomer may also provide shock protection to the image capture device 100 at corners and edges of the front side 140a of the body 140.

Referring to FIGS. 5A-6D, the image capture device 100 may also include a mount 560. The mount 560 functions to removably couple the image capture device 100 to another device, such as a tripod or other support device 670 (see FIGS. 6C-6D). As shown, the mount 560 includes two finger members 562 that pivot relative to the body 140 between stowed positions (as shown in FIGS. 1C and 5D-5F) and deployed positions (as shown in FIGS. 5A-5C and 6A). When in the deployed positions, the two finger members 562 extend away from the body 140 in parallel and are insertable between complementary finger members 672 of the support device 670. The mount 560 may additionally include a base 564 to which the two finger members 562 are pivotably coupled and which is in turn coupled to the body 140 of the image capture device 100.

Each of the finger members 562 is a generally planar member (e.g., having parallel planar surfaces) that extends between a proximal end and a distal end thereof. The proximal end is positioned proximate the image capture device 100 and hingedly coupled to the base 564, for example, with a hinge pin that defines a pivot axis about which the finger member 562 rotates. The proximal end may be rounded about the pivot axis. The proximal end of the finger member 562 may also be referred to as a pivot end.

The distal end is positioned distally from the proximal and from the pivot axis. The distal end is movable relative to image capture device the body 140 and, accordingly, may be referred to as a free end. The finger members 562 may each include a recess 562a in the distal end between the parallel planar surfaces, which forms a finger pick that may be engaged by the finger (e.g., finger nail) of the user to facilitate rotating the finger member 562 from the stowed to the deployed position.

Each of the finger members 562 further includes an aperture 562b positioned between the proximal end and the distal end, which extends between the planar surfaces thereof (e.g., perpendicular thereto). When the two finger members 562 are in the deployed positions, the apertures 560a thereof are aligned with each other so as to receive a shaft of a thumbscrew 674 of the support device 670 therethrough, which also extends through apertures of the complementary finger members of the support device for coupling the mount 560 to the support device 670. The distal end of each of the finger members 562 may be rounded about the apertures 560a (e.g., a center axis thereof), so as to permit the finger members 562 to pivot relative to the support device 670.

The mount 560 may be configured to retain the finger members 562 in the stowed and/or deployed positions. For example, the finger members 562 may be retained in the stowed and/or deployed positions magnetically and/or frictionally. As shown, the finger members 562 may be retained magnetically in the stowed positions. The finger members 562 each include a magnet 562c, which is arranged between the pivot axis and the aperture 562b thereof. The magnet 562c magnetically couples to the base 564, or other magnetic portion of the image capture device 100, to retain the finger member 562 in the stowed position. The finger members 562 may be retained frictionally in the deployed positions. The finger members 562 are each fixedly coupled to the hinge pin (not shown), which is in turn frictionally engaged with the body 140, for example, with an elastomeric friction pad pressing the hinge pin to resist rotation thereof.

The mount 560 is positioned at the bottom side 140f of the body 140 of the image capture device 100. For example, as shown, the mount 560 is positioned within a mount receptacle 140g formed in the bottom side 140f of the body 140 and below the internal compartment. As shown, the mount receptacle 140g is recessed relative to a bottommost surface of the body 140. For example, the mount receptacle 140g is defined by a recessed (e.g., concave) portion of the body 140 (e.g., of the rear housing 246). The recessed portion generally includes a peripheral wall 140i that extends upward from the bottommost surface of the body 140 and defines the horizontal shape and bounds (e.g., length and width) of the mount receptacle 140g, as well as a top wall 140j that extends across the peripheral wall 140i and defines the vertical shape and bounds (e.g., the depth) of the mount receptacle 140g. The top wall 140j and the peripheral wall 140i may be part of the rear housing 246.

The shape and dimension of the mount receptacle 140g may permit the mount 560 (e.g., the finger members 562) to be contained entirely therein when the finger members 562 are in the stowed positions. For example, the depth of the mount receptacle 140g at locations corresponding to the finger members 562 may be the same or greater than the thickness of the finger members 562, such that the finger members 562 are flush or recessed relative to the bottommost surface of the body 140 when in the stowed positions. As a result, the image capture device 100 may rest stably on a flat support surface, such as a table. The horizontal shape and dimensions of the mount receptacle 140g permit access to the distal ends of the finger members 562 (e.g., to the recesses 562a thereof), thereby allowing the user to engage and pull the finger members 562 from the stowed position to the deployed position. The horizontal shape of the mount receptacle 140g, which is visible at the bottom side 140f of the body 140, may correspond to that of the finger members 562, such that a generally uniform gap is formed laterally between the recessed portion of the body 140 (e.g., the peripheral wall 140i defining the mount receptacle 140g) and the finger members 562. For example, as shown, the mount receptacle 140g includes ends that are rounded (e.g., forming semicircles at left and right sides thereof) and correspond to the distal ends of the finger members 562 which are also rounded.

The portion of the body 140 defining the mount receptacle 140g is sealed, such that the internal compartment is waterproof. As referenced above, the bottom side 140f of the body 140 (e.g., the rear housing 246) includes a speaker 132a, which is sealed (e.g., by the speaker 132a within the internal compartment). Thus, the speaker hole 246f is positioned generally within the mount receptacle 140g and/or may be covered by one of the finger members 562 when in the stowed position and visible when the finger member 562 is in the deployed position.

The mount 560 is coupled to the body 140 and, in particular, to the chassis 248, such as with threaded fasteners (not shown). By being coupled to the chassis 248, the mount 560 may be considered indirectly coupled to other components of the image capture device 100, such as the rear housing 246, the front housing cover 150, and the electronic components 120. The mount 560 may form a stronger connection to the image capture device 100 by being coupled to the chassis 248 as opposed to other components of the body 140 (e.g., the rear housing 246 and the front housing cover 150), because the chassis 248 is formed from material having higher stiffness and/or yield strength as described above (e.g., aluminum instead of plastic).

In particular, the mount 560 is coupled to the lateral portion 248b of the chassis 248. The lateral portion 248b of the chassis extends rearward from the upright portion 248a of the chassis 248. As such, the lateral portion 248b may also be referred to as a bottom portion of the chassis 248, while the upright portion 248a may be referred to as a forward portion of the chassis 248. The lateral portion 248b is configured as a generally planar segment, which may further include strengthening ribs (e.g., as shown at outer portions) that also extend from the upright portion 248a and provide bending strength between the lateral portion 248b and the upright portion 248a. As referenced above, the chassis 248 may be a unitary component (e.g., cast aluminum) of which the lateral portion 248b is integrally formed with the upright portion 248a. Alternatively, the lateral portion 248b may be separately formed and coupled to the upright portion 248a (e.g., with fasteners, adhesives, and/or complementary mechanical mating features).

The lateral portion 248b of the chassis 248 is positioned outside (e.g., below) the internal compartment of the body 140 and, as shown, in the mount receptacle 140g of the body 140. The lateral portion 248b extends rearward from the upright portion 248a below the seal 247 and into the mount receptacle 140g. The lateral portion 248b may extend through an aperture 246i in the body 140 (e.g., in the rear housing 246) that is positioned between the top wall 140j of the mount receptacle 140g and the bottommost surface of the body 140, as well as below the seal 247. By coupling to the chassis 248 outside the internal compartment, as opposed to another portion of the chassis 248 or similar structure inside the internal compartment, the mount 560 may be coupled to the image capture device 100 without requiring any waterproofing features (e.g., seals or adhesives) or otherwise providing an entry path for water to enter the internal compartment.

Referring to FIGS. 7A-9D, various different camera housings may be used with the image capture device 100. The camera housings may also be referred to as camera cases or camera enclosures. The combination of any of the housings and the image capture device 100 may be referred to as an image capture device system. An elastomeric housing 780 is shown in FIGS. 7A-7D, an electronic housing 880 is shown in FIGS. 8A-8D, and a battery housing 980 is shown in FIGS. 9A-9D. Each of the housings defines a cavity in which the image capture device 100 is receivable, so as to hold and/or protect the image capture device 100 therein, and engages the image capture device 100 to prevent movement of the image capture device 100 within the cavity. The various housings differ from each other according to manner of coupling to the image capture device 100, usability of the mount 560 of the image capture device 100, accommodation of a support device 670, and inclusion of electronic features, among other characteristics.

Referring to FIGS. 7A-7D, the elastomeric housing 780 is formed of an elastomeric material, such as silicone, or other flexible and elastic material. The elastomeric housing 780 defines a cavity 782 in which is received the image capture device 100. The cavity 782 is defined by interior surfaces of a top side, a right side, a bottom side, and a left side of the elastomeric housing 780, which have a shape that closely corresponds to and otherwise conforms with the shape of the exterior surfaces of the body 140 of the image capture device 100 (e.g., the front side 140a, the left side 140b, the right side 140c, the back side 140d, the top side 140e, and the bottom side 140f). The top, right, left, and bottom sides of the elastomeric housing 780 engage the image capture device 100 to prevent movement of the image capture device 100 within the cavity 782.

The elastomeric housing 780 defines primary apertures that correspond to features of the image capture device 100 that the user may require access to while the image capture device 100 is capturing images. The primary apertures generally include a rear display aperture 784a on a back side of the elastomeric housing 780, a front display aperture 784b and a lens aperture 784c on a front side of the elastomeric housing 780, and a mount aperture 784d in the bottom side of the elastomeric housing 780. The elastomeric housing 780 may include other apertures, which may be significantly smaller than the primary apertures and used, for example, to permit sound to pass from the environment to the microphones 122b.

The rear display aperture 784a and the front display aperture 784b align with and allow the user to view therethrough the rear display screen 134b' and the front display screen 134b", respectively. The rear display aperture 784a is also the largest aperture of the elastomeric housing 780 and due to the flexibility and elasticity of the material forming the elastomeric housing 780 (e.g., silicone) permits the image capture device 100 to pass therethrough to be inserted into and removed from the cavity 782. The lens aperture 784c allows light from the environment to pass therethrough to the image sensor 122a.

The mount aperture 784d permits the finger members 562 of the mount 560 to extend through the bottom side of the elastomeric housing 780 and couple to be received by the complementary finger members 672 of the support device 670.

The mount aperture 784d is also configured to permit the finger members 562 of the mount 560 rotate through the mount aperture 784d between stowed and deployed positions. For example, the mount aperture 784d has a length and width that correspond to (e.g., are slightly larger than) the width and combined length of the finger members 562 when in the stowed position. As shown, the mount aperture 784d may have a similar shape to the finger members 562, for example, by having rounded ends (e.g., semi-circular). The mount aperture 784d may have any suitable shape that provides the user access to the finger members 562 and for the finger members 562 to rotate therethrough.

The bottom side of the elastomeric housing 780 that defines the mount aperture 784d has a relatively low thickness, such that the complementary finger members 672 of the support device 670 do not extend into the mount aperture 784d. As a result, the mount aperture 784d need only be sized for the finger member 562 of the mount to 560 to extend therethrough. Furthermore, the relatively low thickness of the bottom side of the elastomeric housing 780 permits rotation of the thumbscrew 674 without interference with the bottom side of the elastomeric housing 780.

Figure 7A:
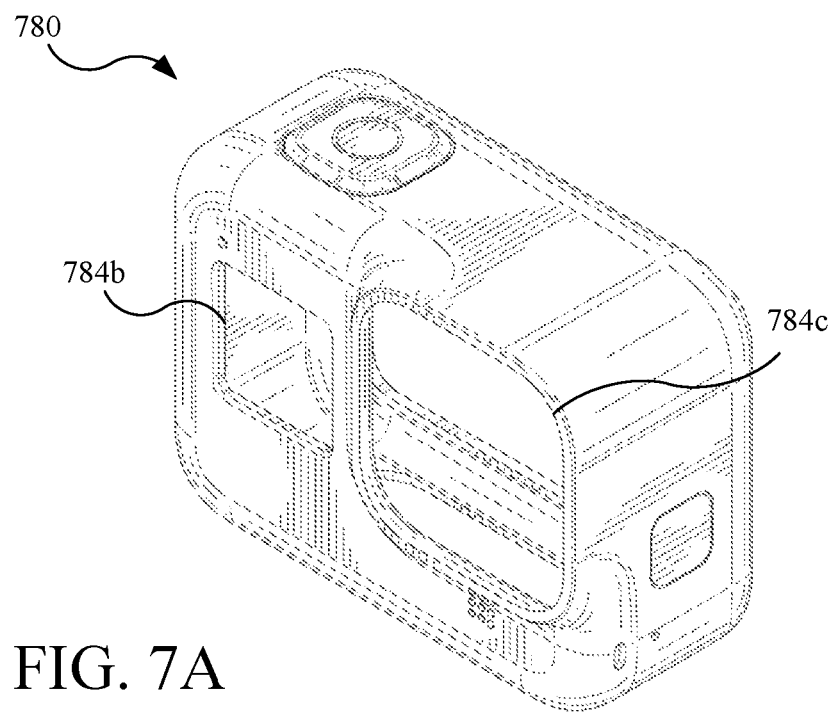
FIG. 7A is an upper, front, right perspective view of an elastomeric housing for the image capture device of FIG. 1B.
Figure 7B:
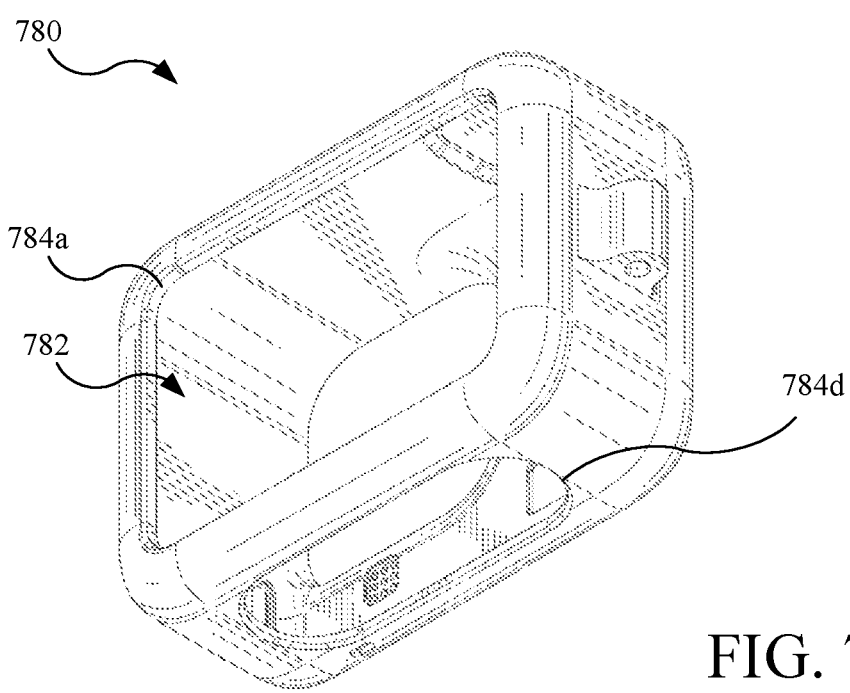
FIG. 7B is a lower, rear, left perspective view of the elastomeric housing of FIG. 7A.
Figures 7C, 7D:
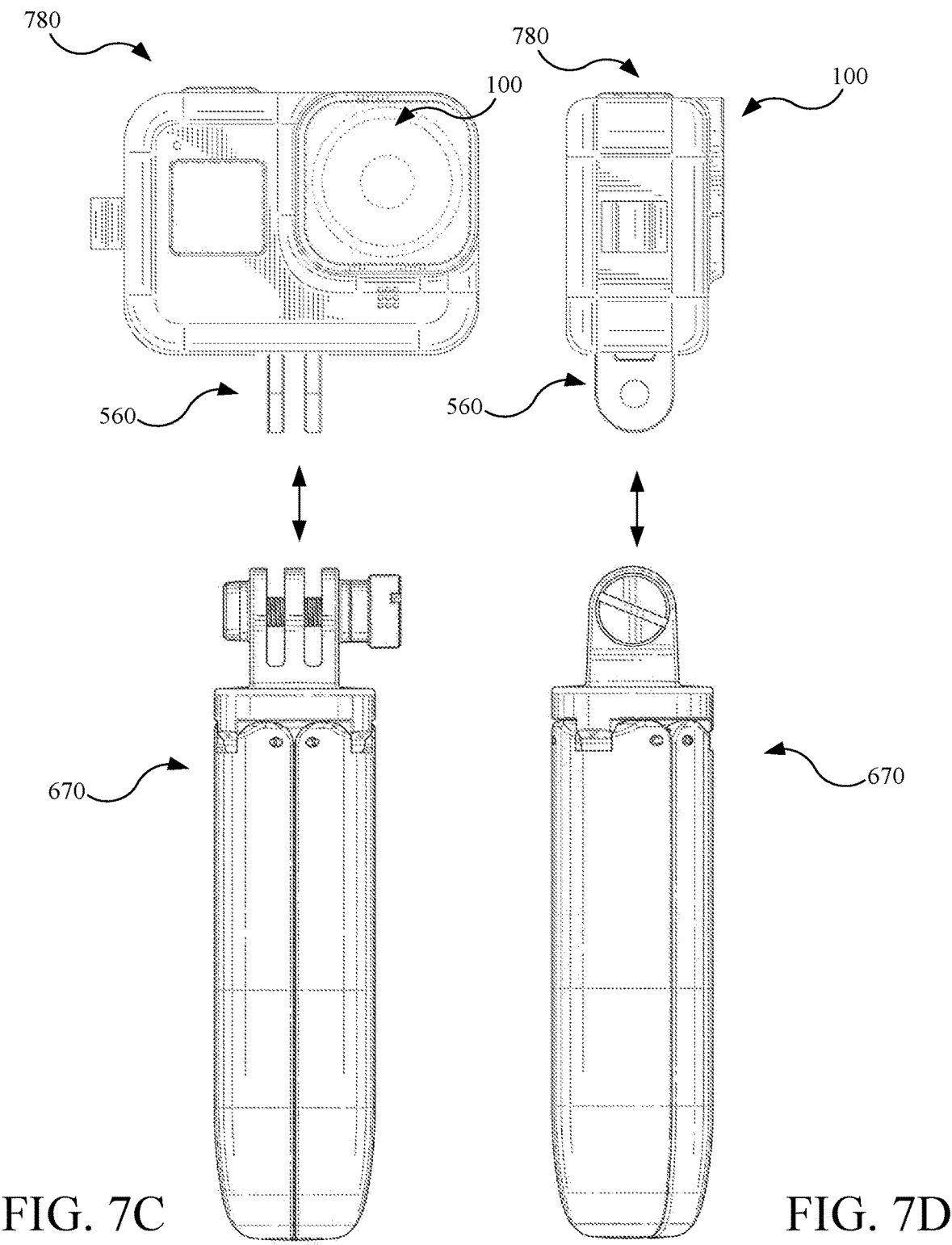
FIG. 7C is a front view of the image capture device of FIG. 1B, the elastomeric housing of FIG. 7A, and the support device of FIG. 6C.
FIG. 7D is a right view of the image capture device of FIG. 1B, the elastomeric housing of FIG. 7A, and the support device of FIG. 6C.
Figure 7E:
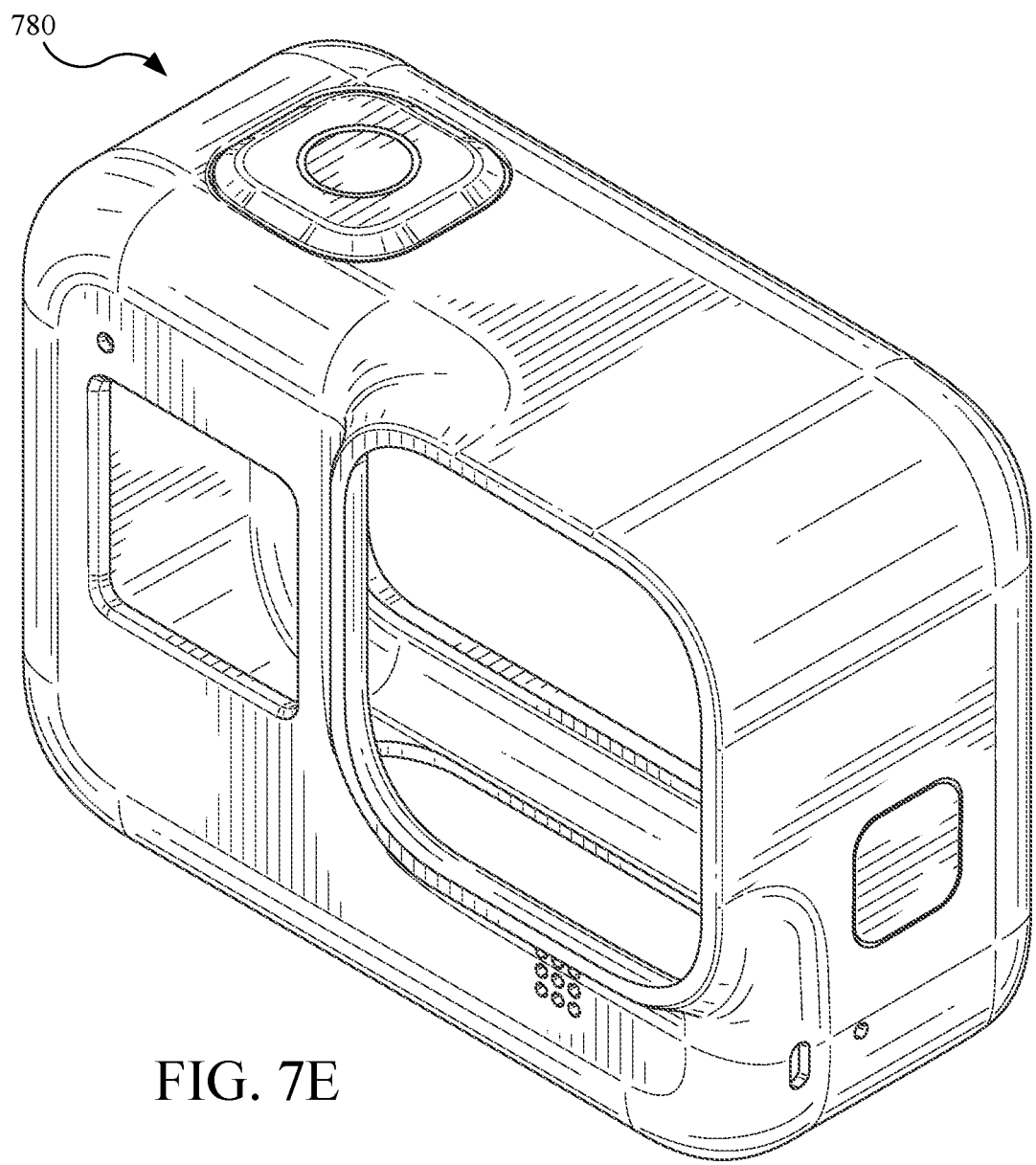
FIGS. 7E-7U are alternative views of the elastomeric housing of FIG. 7A.
Figure 7F:
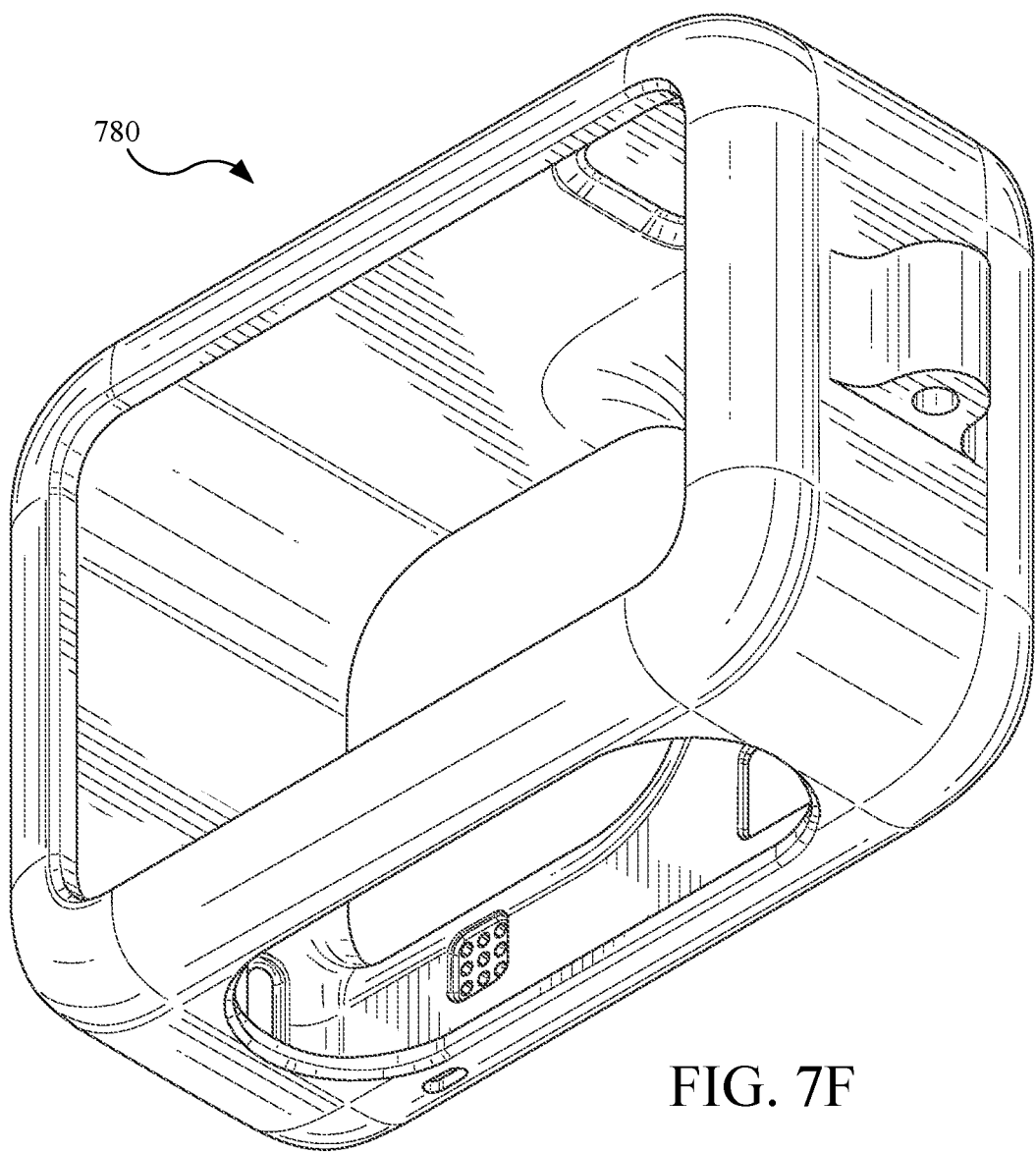
Figure 7G:
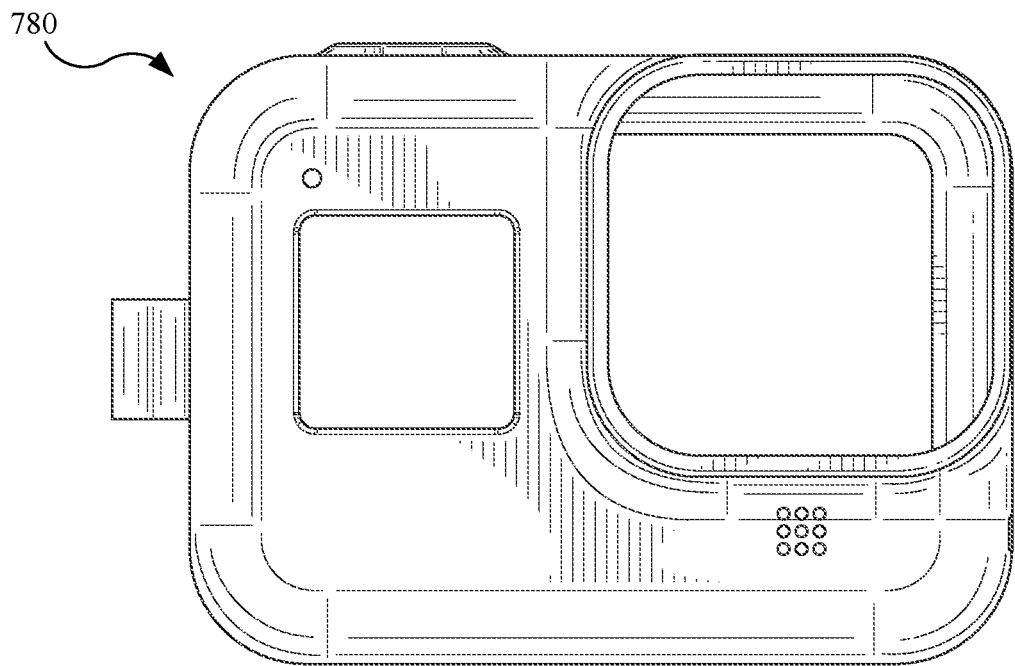
Figure 7H:
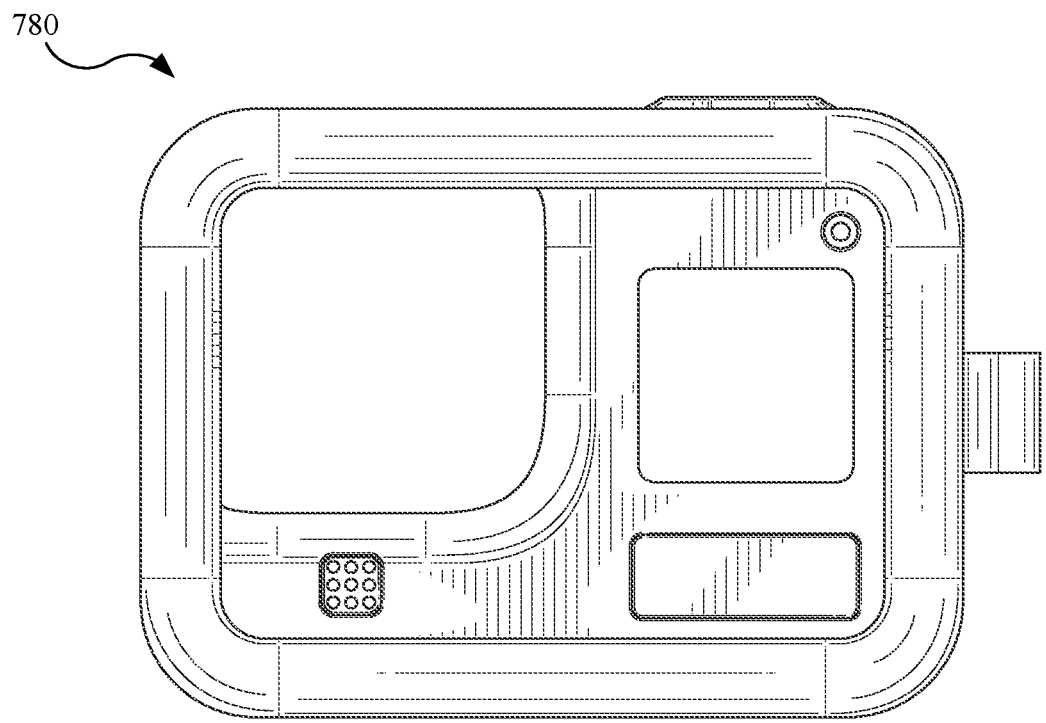
Figure 7I:
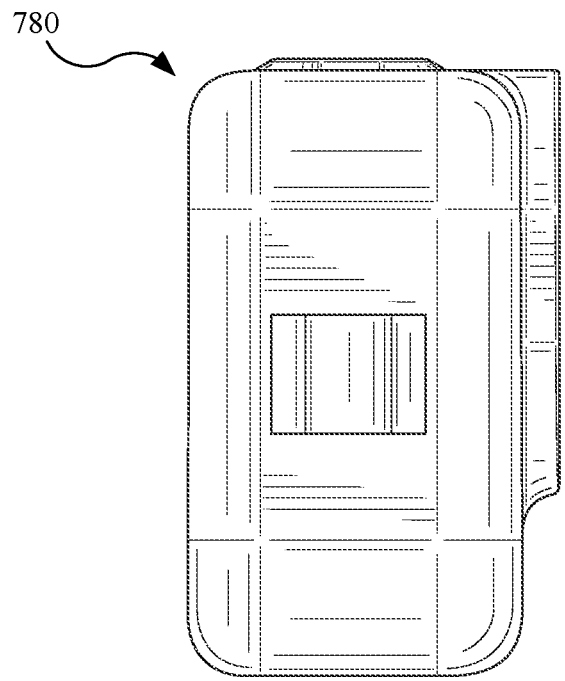
Figure 7J:
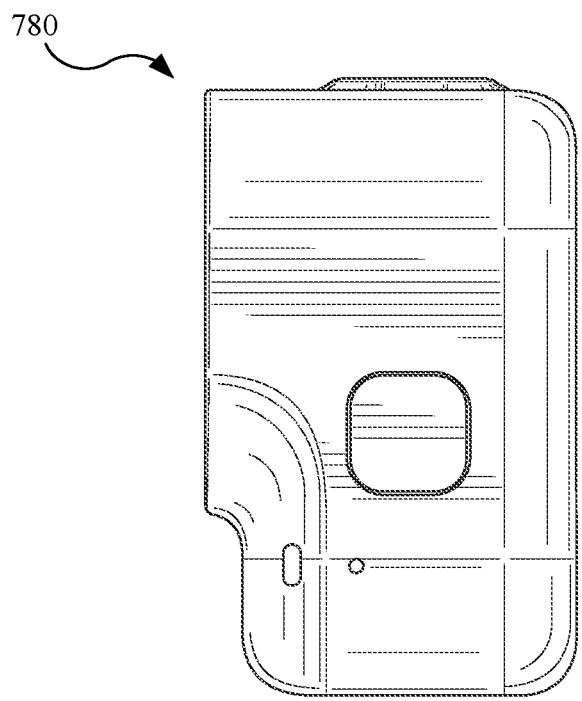
Figure 7K:
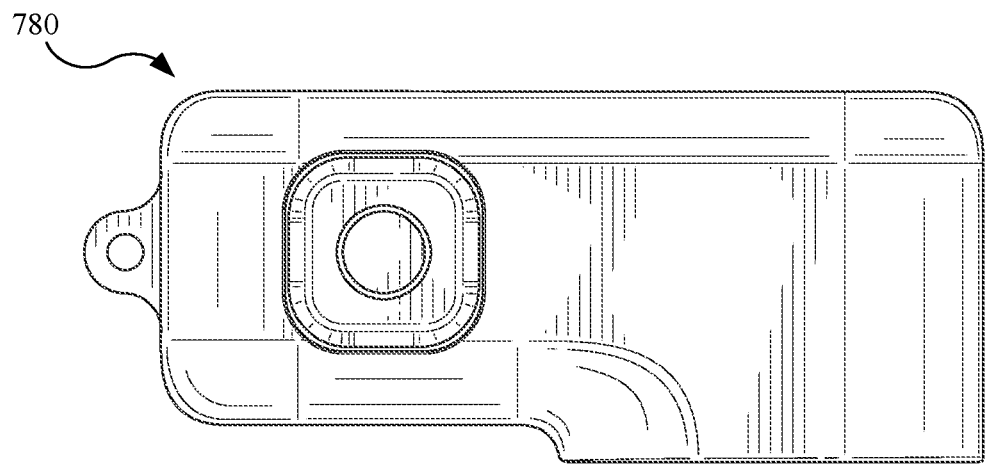
Figure 7L:
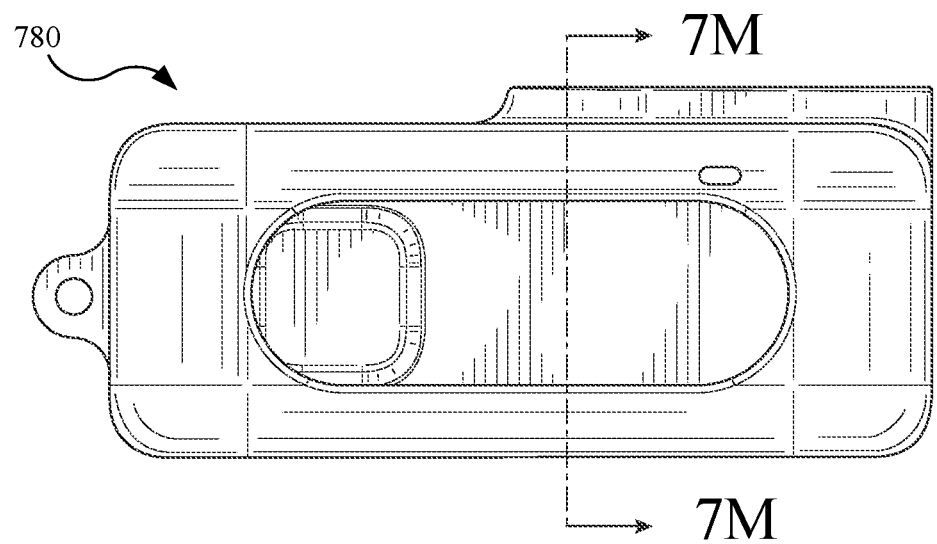
Figure 7M:
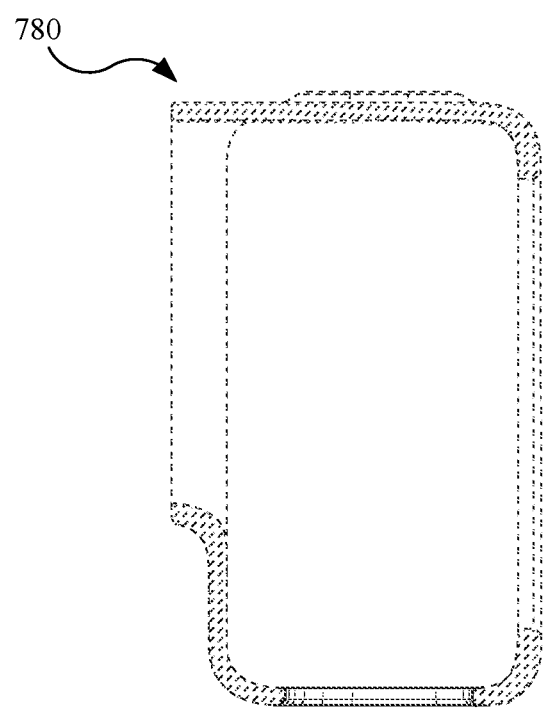
Figure 7N:
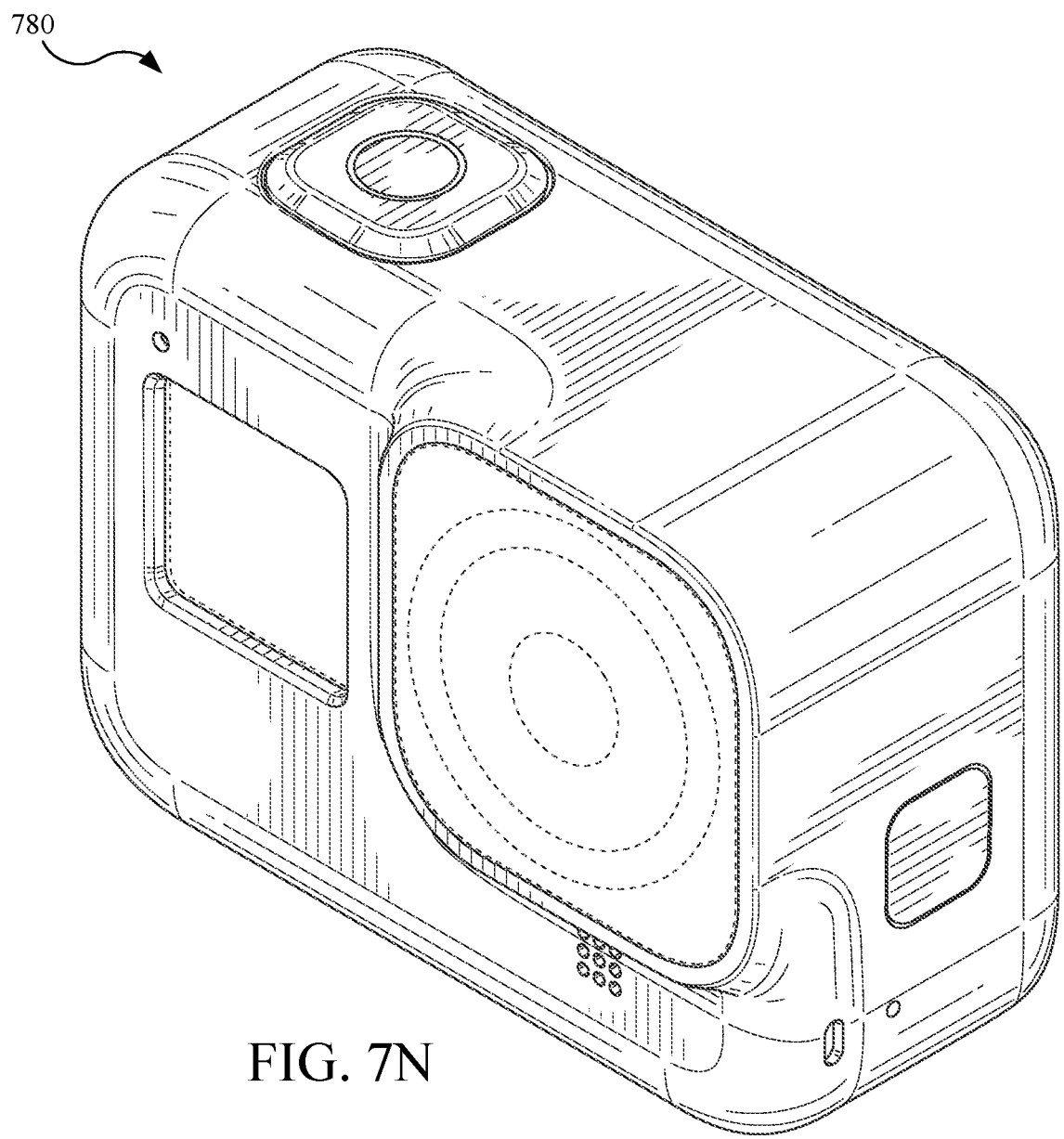
Figure 7O:
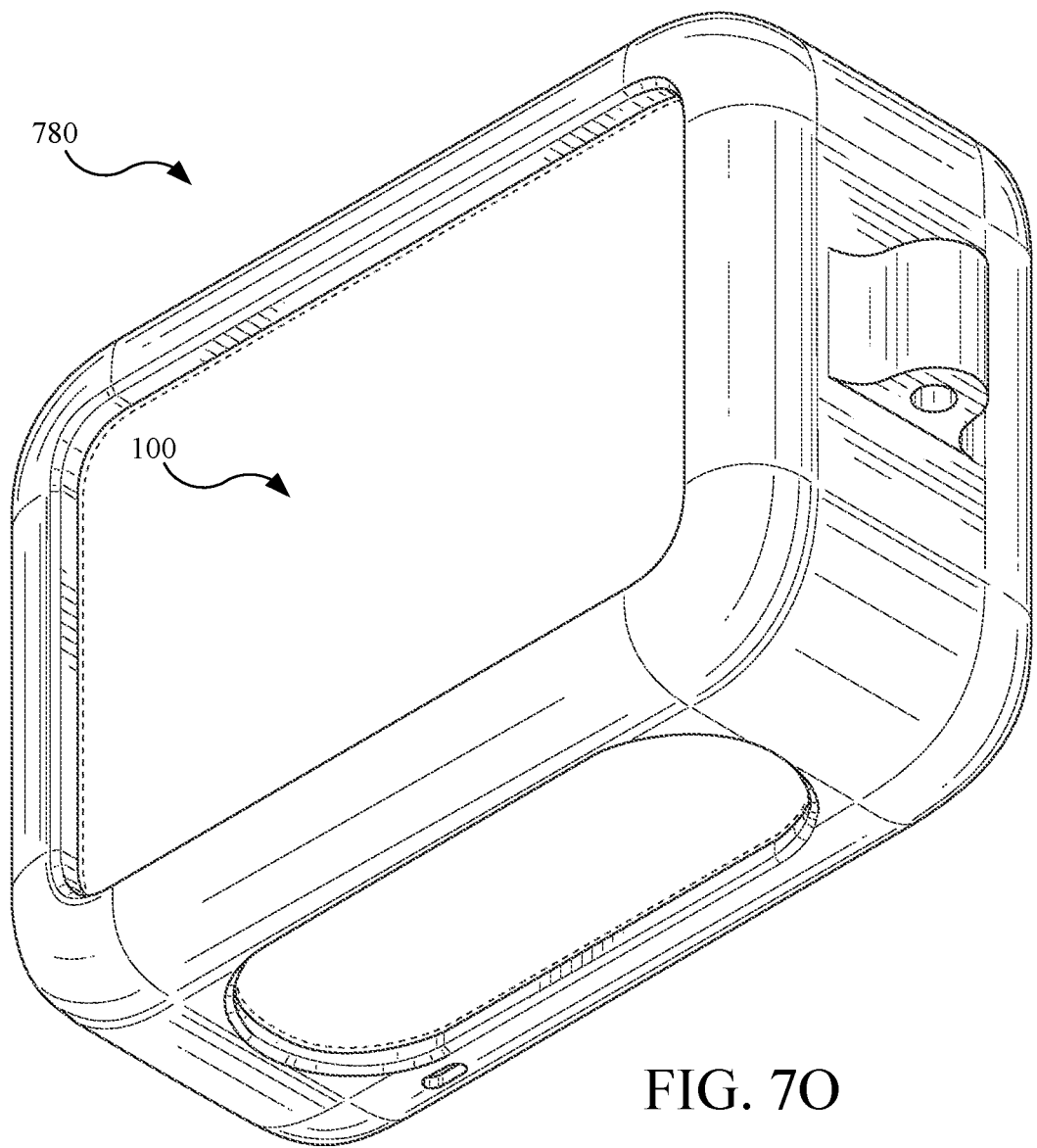
Figure 7P:
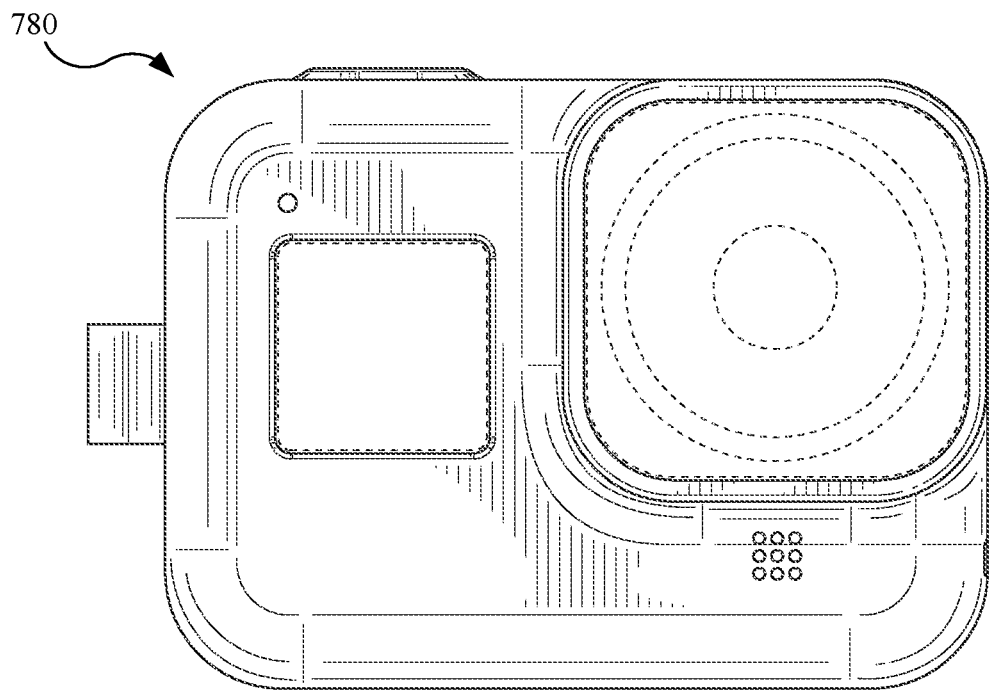
Figure 7Q:
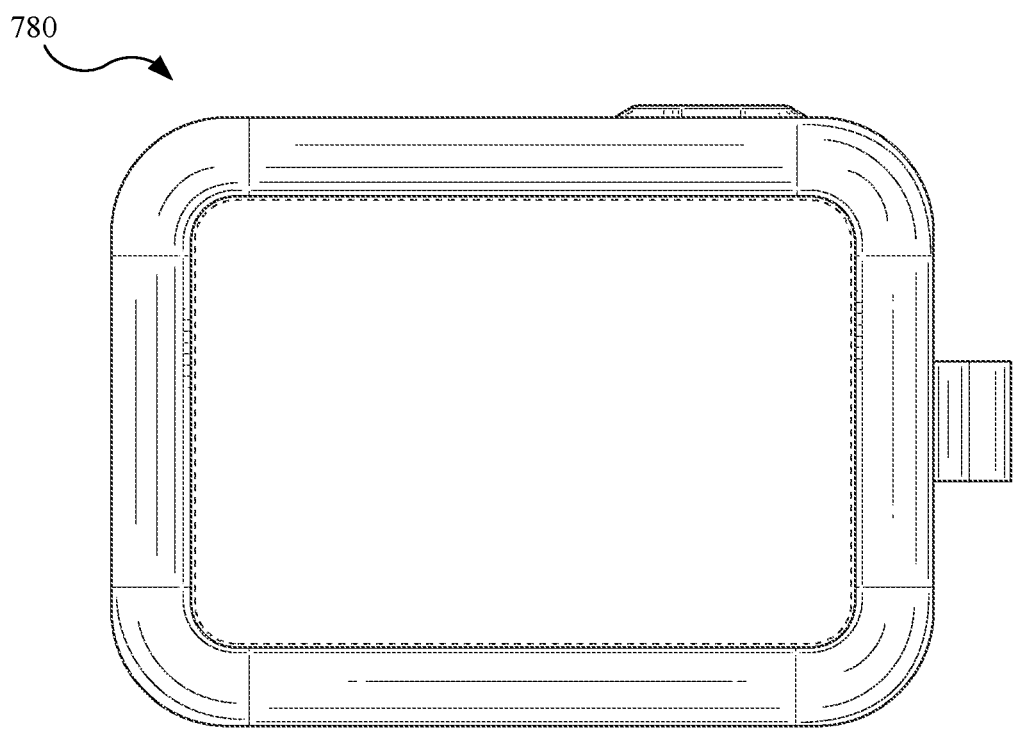
Figure 7R:
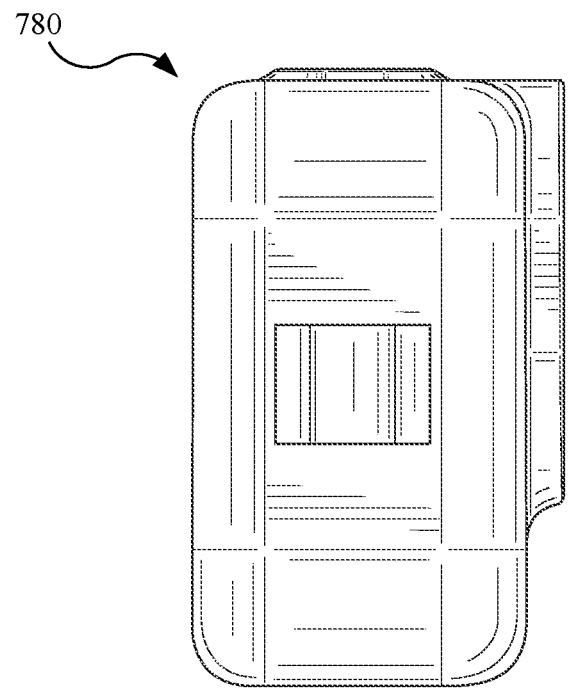
Figure 7S:
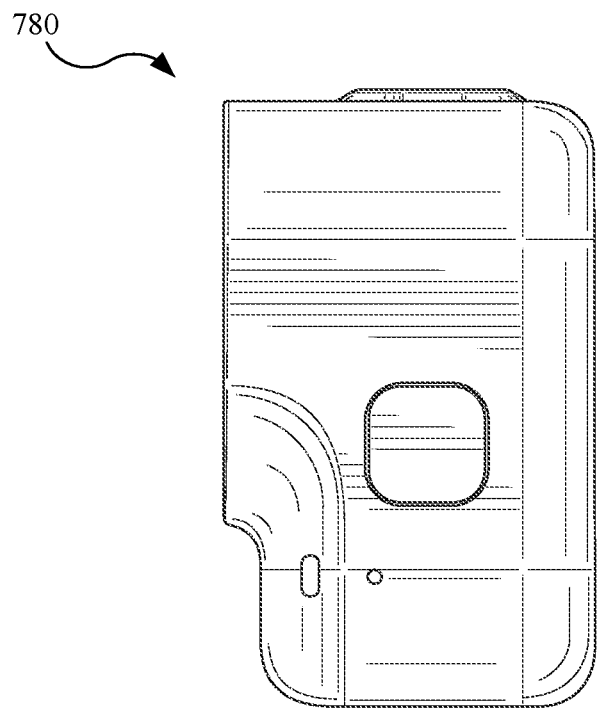
Figure 7T:
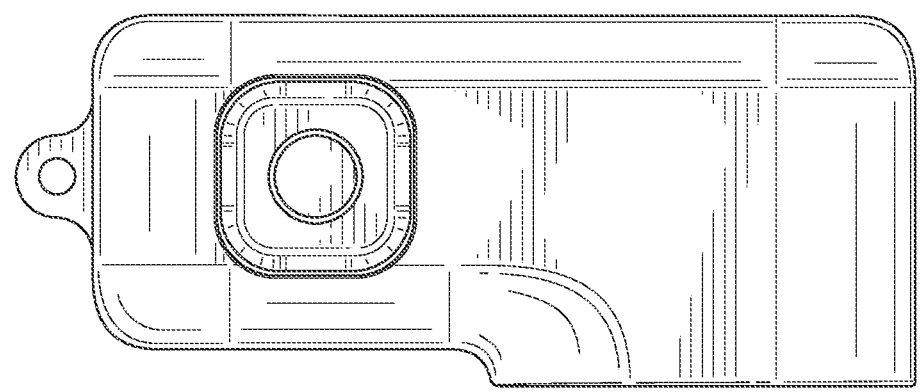
Figure 7U:
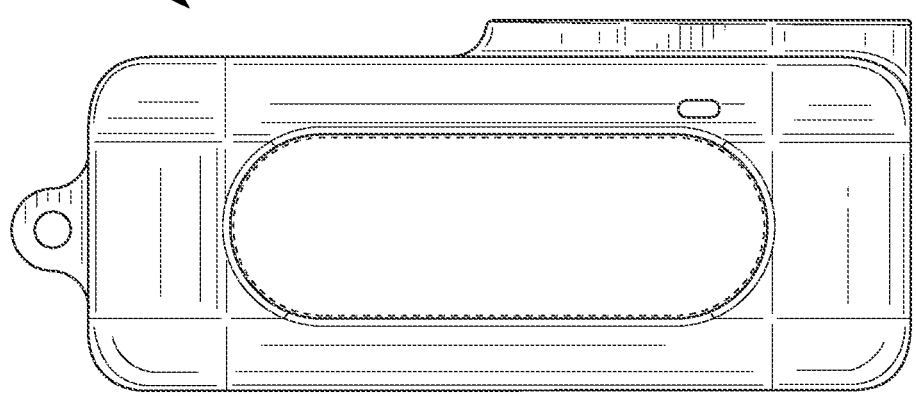

FIGS. 7E-7U are alternative views of the elastomeric housing 780 shown without reference numerals. In FIGS. 7N-7U depict the image capture device 100 in dashed lines and inside the elastomeric housing 780.

Referring to FIGS. 8A-8D, the electronic housing 880 includes electronics that operatively couple to the image capture device 100 to provide further electronic functionality thereto. As shown, the electronic housing 880 includes electronic components of a microphone 881a for detecting sound, and one or more additional ports 881b for operatively connecting to external electronic devices. The electronic housing 880 is configured to both mechanically couple to the image capture device 100 and also electronically couple thereto (e.g., for power and/or data transfer).

The electronic housing 880 defines a cavity 882 in which the image capture device 100 is received. More particularly, the electronic housing 880 includes a frame 884, which defines the cavity 882. The frame 884 is rigid and extends entirely round the left side 140b, the right side 140c, the top side 140e, and the bottom side 140f and partially along the front side 140a and the back side 140d. For example, the frame may be considered to have a top side, a left side, a bottom side, and a right side. The frame 884 (e.g., the top, left, bottom, and right sides thereof) engage the image capture device 100 to prevent movement thereof within the cavity 882. The frame 884 may also be referred to as a rigid frame.

The frame 884 is configured open and close one side thereof to release and receive, respectively, the image capture device 100 within the cavity 882. For example, as shown, a movable side 884a (e.g., the left side as shown) of the frame 884, which corresponds to the left side 140b of the image capture device 100 or otherwise to a side having the lens 142, is hingedly coupled to another portion of the frame 884 (e.g., an upper side 884b thereof) and releasably coupled to a still other portion of the frame 884 (e.g., to a bottom side 884c thereof), such as with a latch 884d. When the movable side 884*a* is pivoted relative to the other sides of the frame 884, an opening is formed through which the image capture device 100 is insertable into the cavity 882. For example, the image capture device 100 may be received by the cavity 882 by sliding the image capture device 100 laterally between the upper and lower sides of the frame 884.

The electronic housing 880 is further configured to electronically couple to the image capture device 100. More particularly, the electronic housing 880 includes an electronic interface 886 (e.g., an I/O interface), which is operatively coupled to the electronic components, for example, of the microphone 881*a* and/or the additional ports 881*b*), that is configured to electronically connect to the I/O interface 126*a* of the image capture device 100 to transfer data and/or signals therebetween. For example, as shown, the electronic interface 886 of the electronic housing 880 is a plug, and the I/O interface 126*a* of the image capture device 100 is a receptacle that receives the plug (e.g., a USB type-C receptacle receiving a USB type-C plug). The I/O interface 126*a* of the image capture device 100 may also be referred to as an electronic interface.

The electronic housing 880 is configured for the electronic interface 886 thereof to engage the I/O interface 126*a* of the image capture device 100 when the electronic housing 880 receives the image capture device 100 in the cavity 882. More particularly, the electronic interface 886 is coupled to the frame 884, directly or indirectly, in in a fixed position and orientation relative thereto. The electronic interface 886 is positioned opposite and faces toward the movable side 884*a* of the frame 884 (e.g., faces inward), and the I/O interface 126*a* of the image capture device 100 is positioned on the same side (e.g., the right sides as shown) and faces outward therefrom. Thus, when the image capture device 100, with the door 144 having been removed, is inserted into the cavity 882 through the opening defined by the movable side 884*a*, the I/O interface 126*a* thereof is moved toward and eventually mates with the electronic interface 886 of the electronic housing 880.

Furthermore, the electronic housing 880 may include a protrusion 888 (e.g., a boss) that closes the door opening 246*c* of the body 140 in a similar manner to the door 144. The protrusion 888 is coupled to the frame 884 and extends inward therefrom (e.g., into the cavity 882). The protrusion 888 has a rectangular shape similar in size to an inner portion of the door 144 (e.g., being elongated in a vertical direction) and may substantially block access to the battery receptacle 140*h*. Similar to the electronic interface 886, the protrusion 888 is positioned opposite and faces toward the movable side 884*a* of the frame 884 (e.g., faces inward), and the door opening 246*c* of the body 140 of the image capture device 100 is positioned on the same side and faces outward therefrom. Thus, when the image capture device 100, with the door 144 having been removed, is inserted into the cavity 882 through the opening defined by the movable side 884*a*, the door opening 246*c* thereof is moved toward and eventually receives the protrusion 888 therein. Furthermore, the electronic interface 886 may be positioned on and face outward from the protrusion 888 (e.g., being a plug that extends outward from the protrusion further into the cavity 882).

As discussed below with respect to the battery housing 980, the protrusion 888 may also include a battery pad, configured similar to the battery pad 144*c* (e.g., materials), that engages the battery 130*b* to secure the battery 130*b* to the battery interface 130*a* of the image capture device 100.

The protrusion 888 may also include a peripheral seal that seals the door opening 246*c* in the same manner as the seal 144*b* of the door 144.

The electronic housing 880 also defines primary apertures that correspond to features of the image capture device 100 that the user may require access to while the image capture device is capturing images. The primary apertures generally include a rear aperture 890*a* on a back side of the electronic housing 880, a front opening 890*b*, and a mount aperture 890*c* through the bottom side of the electronic housing 880. The electronic housing 880 may include other apertures, which may significantly smaller than the primary apertures and be used, for example, to permit sound to pass from the environment to the microphones 122*b*.

The rear aperture 890*a* aligns with and allows the user to view therethrough the rear display screen 134*b*' of the image capture device 100. The front opening 890*b* surrounds the front display screen 134*b*" and the lens 142, thereby allowing the user to view therethrough the front display screen 134*b*" and permitting light from the environment to pass therethrough to the image sensor 122*a*. The front opening 890*b* may extend higher (e.g., the frame 884 extends lower) than adjacent portions of the front opening 890*b*, so as to receive the lens region of the image capture device 100, which may protrude forward from the front side 140*a* of the body 140. The electronic interface 886 is positioned opposite the side (e.g., the movable side 884*a*) adjacent the higher part of the front opening 890*b*.

As with the mount aperture 784*d*, described above, the mount aperture 890*c* allows the finger members 562 of the mount to extend therethrough to be coupled to a support device 670 and also permits the finger members 562 to rotate therethrough between the stowed and deployed positions. Because the frame 884 is rigid and the upper and lower sides engage the top side 140*e* and the bottom side 140*f* of the image capture device 100, the image capture device 100 is not receivable into the cavity when the finger members 562 are in the deployed positions.

While the finger members 562 extend a predetermined distance from the image capture device 100 when in the deployed position, the bottom sides of the different housings may have different thickness that may require spatial accommodations to provide access to and/or turning of the thumbscrew 674 of the support device 670. As compared to the elastomeric housing 780, the bottom side of the electronic housing 880 is thicker (e.g., to incorporate the latch 884*d* and/or provide sufficient rigidity to the frame 884. The bottom side 884*c* of the frame 884 includes a concave portion opposite the movable side 884*a* relative to the mount aperture 890*c*, which defines an upwardly protruding recess that receives and allows rotation of the thumbscrew 674 of the support device 670 therein. The bottom side 884*c* of the frame may still, on both sides of the mount aperture 890*c*, have bottommost surfaces in a single plane allowing the electronic housing 880 may rest stably on a flat surface (e.g., a table).

Figure 8A:
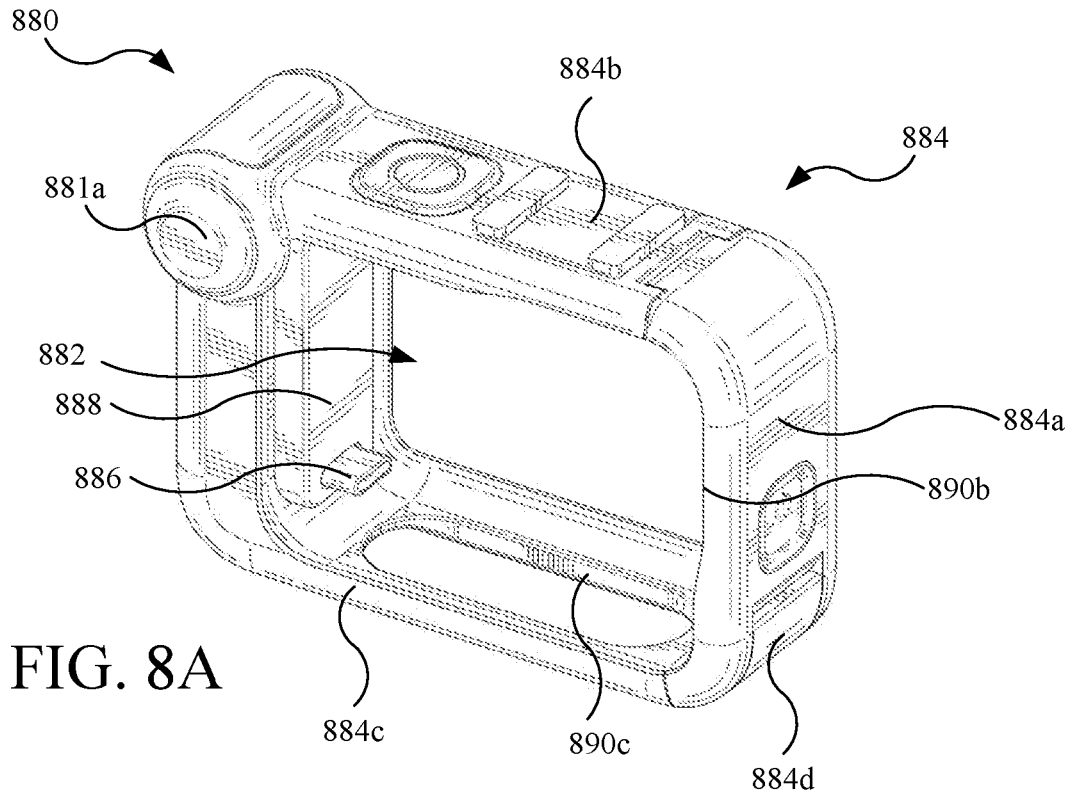
FIG. 8A is an upper, front, right perspective view of an electronic housing for the image capture device of FIG. 1B.
Figure 8B:
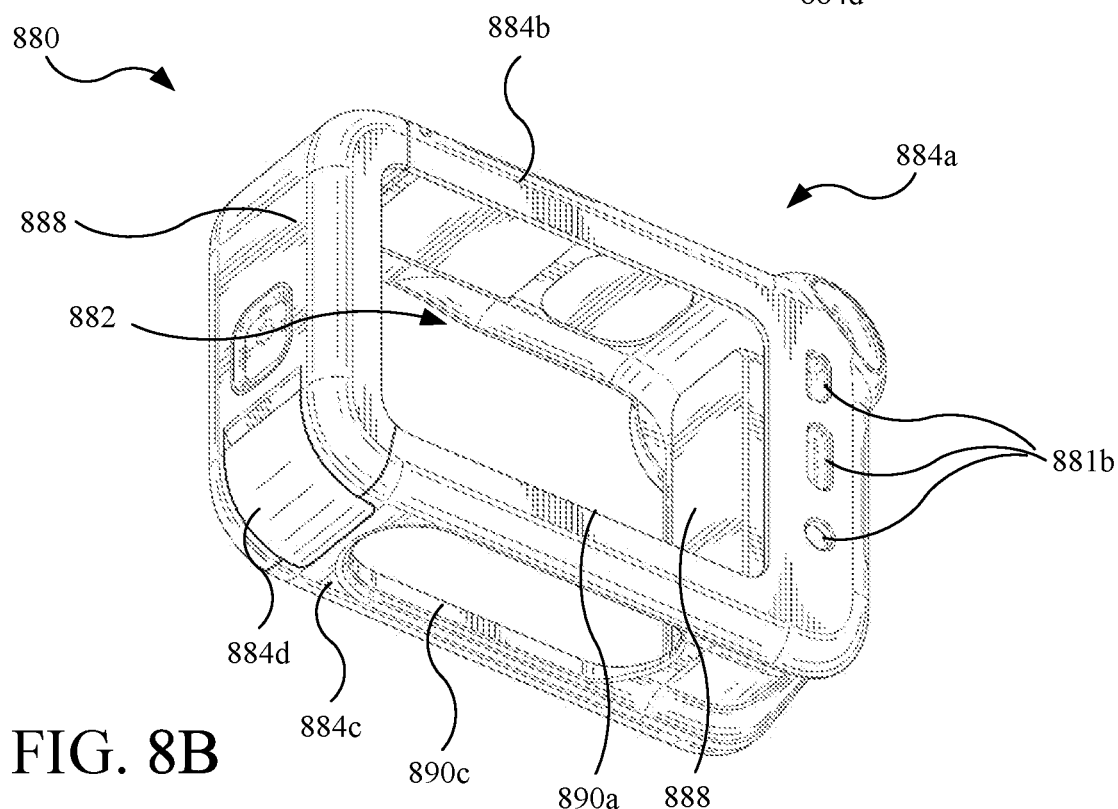
FIG. 8B is a lower, rear, left perspective view of the electronic housing of FIG. 8A.
Figures 8C, 8D:
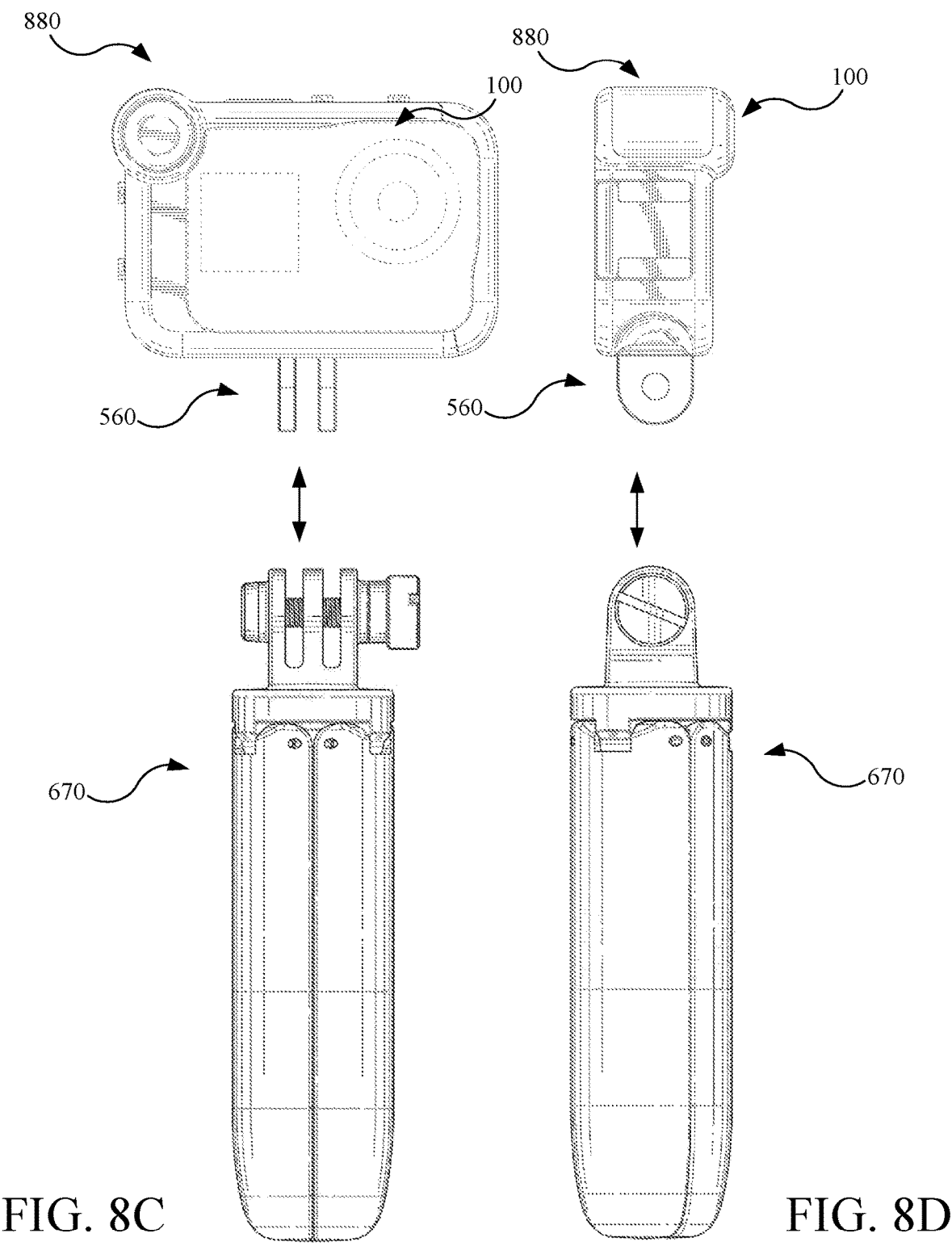
FIG. 8C is a front view of the image capture device of FIG. 1B, the elastomeric housing of FIG. 8A, and the support device of FIG. 6C.
FIG. 8D is a left view of the image capture device of FIG. 1B, the elastomeric housing of FIG. 8A, and the support device of FIG. 6C.
Figure 8E:
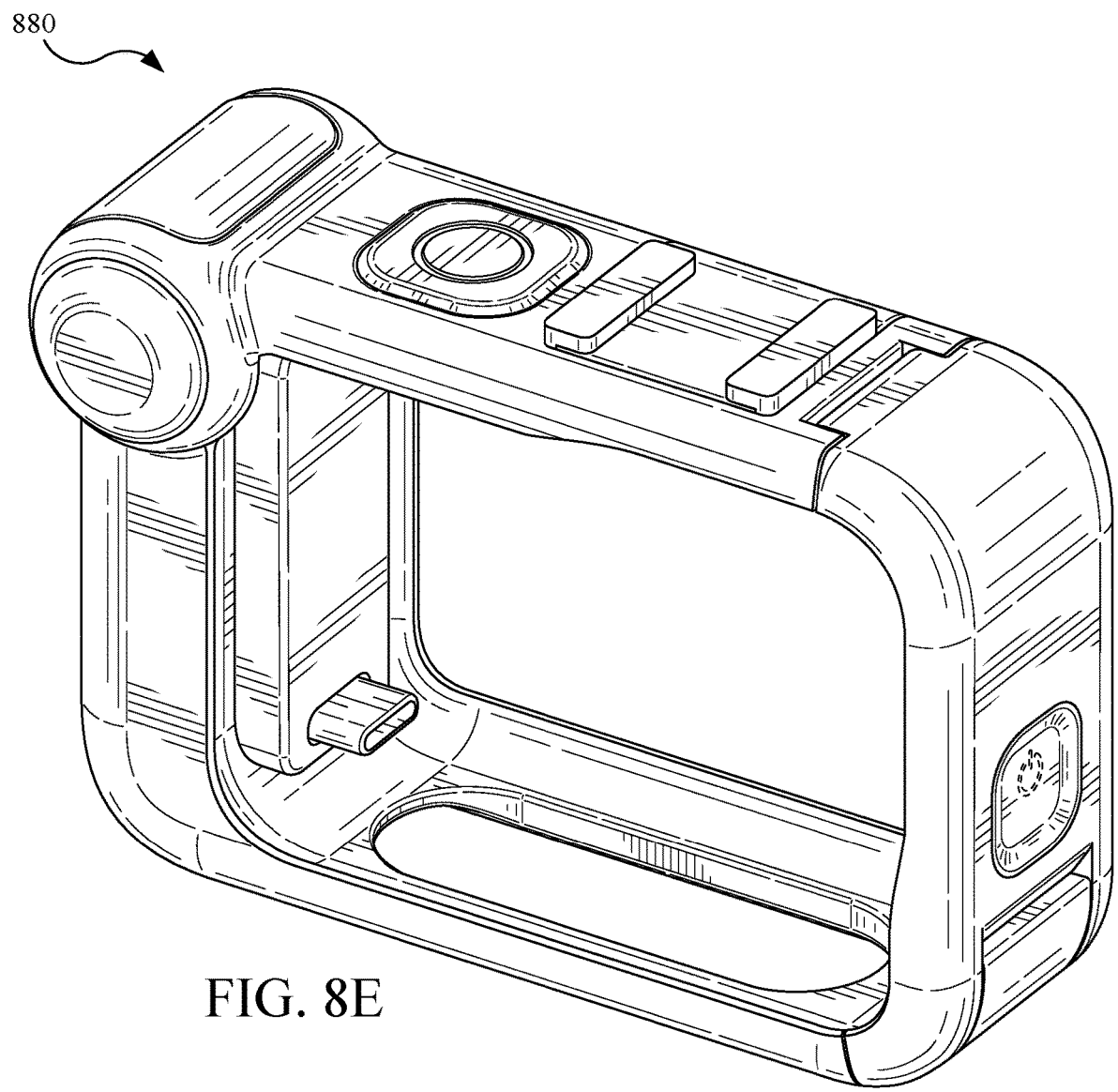
FIGS. 8E-8V are alternative views of the electronic housing of FIG. 8A shown without reference numerals.
Figure 8F:
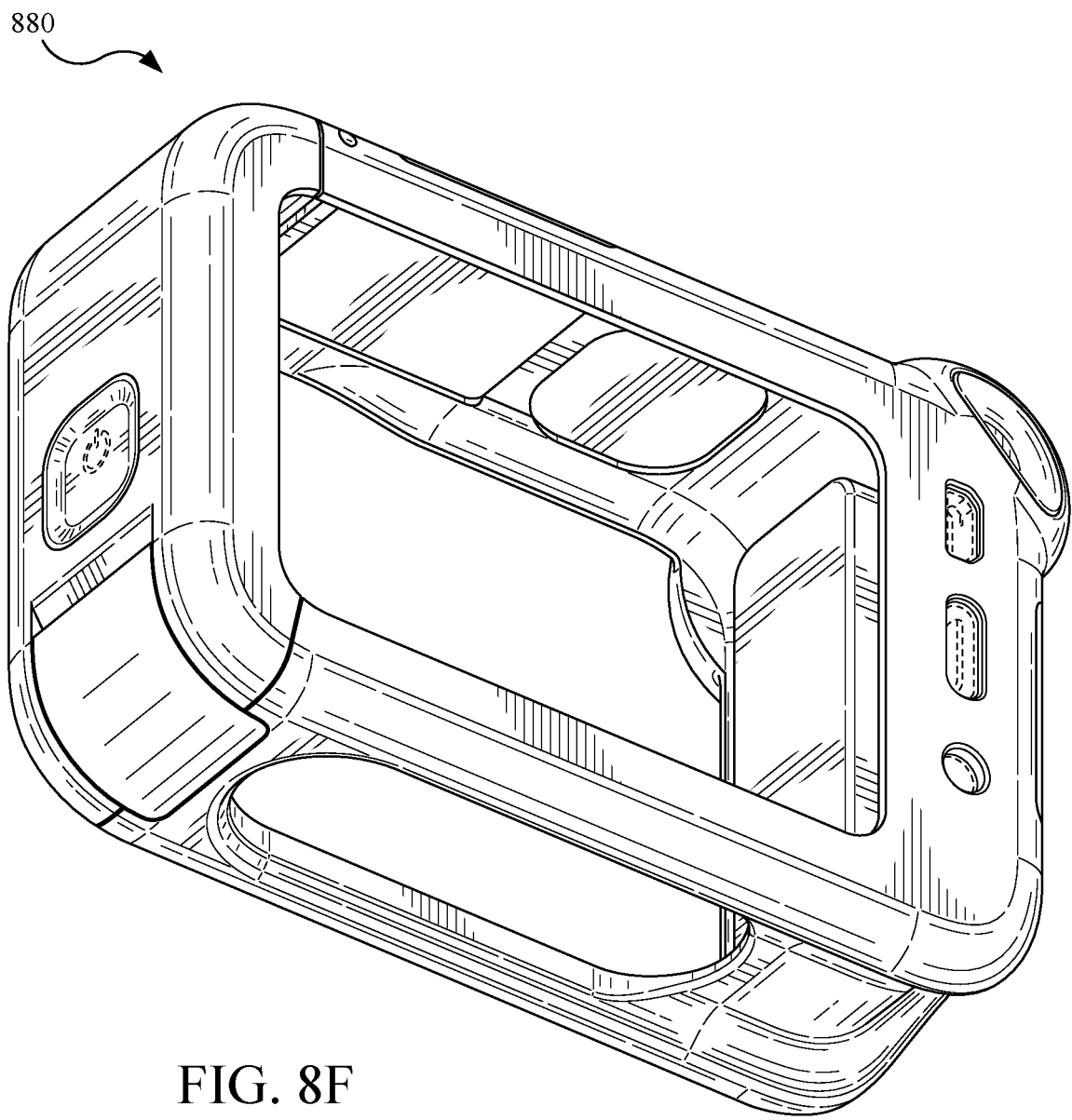
Figure 8G:
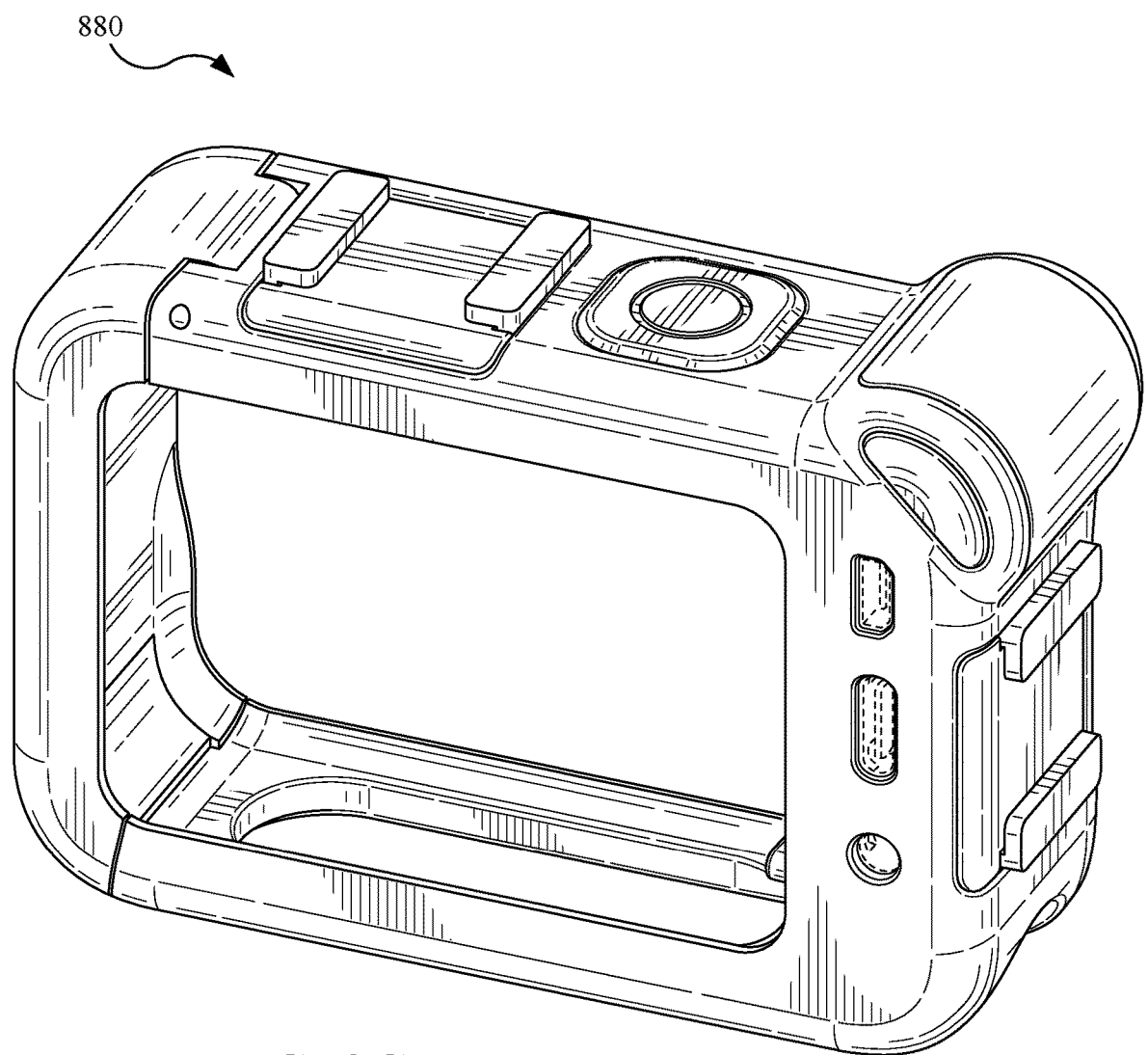
Figure 8H:
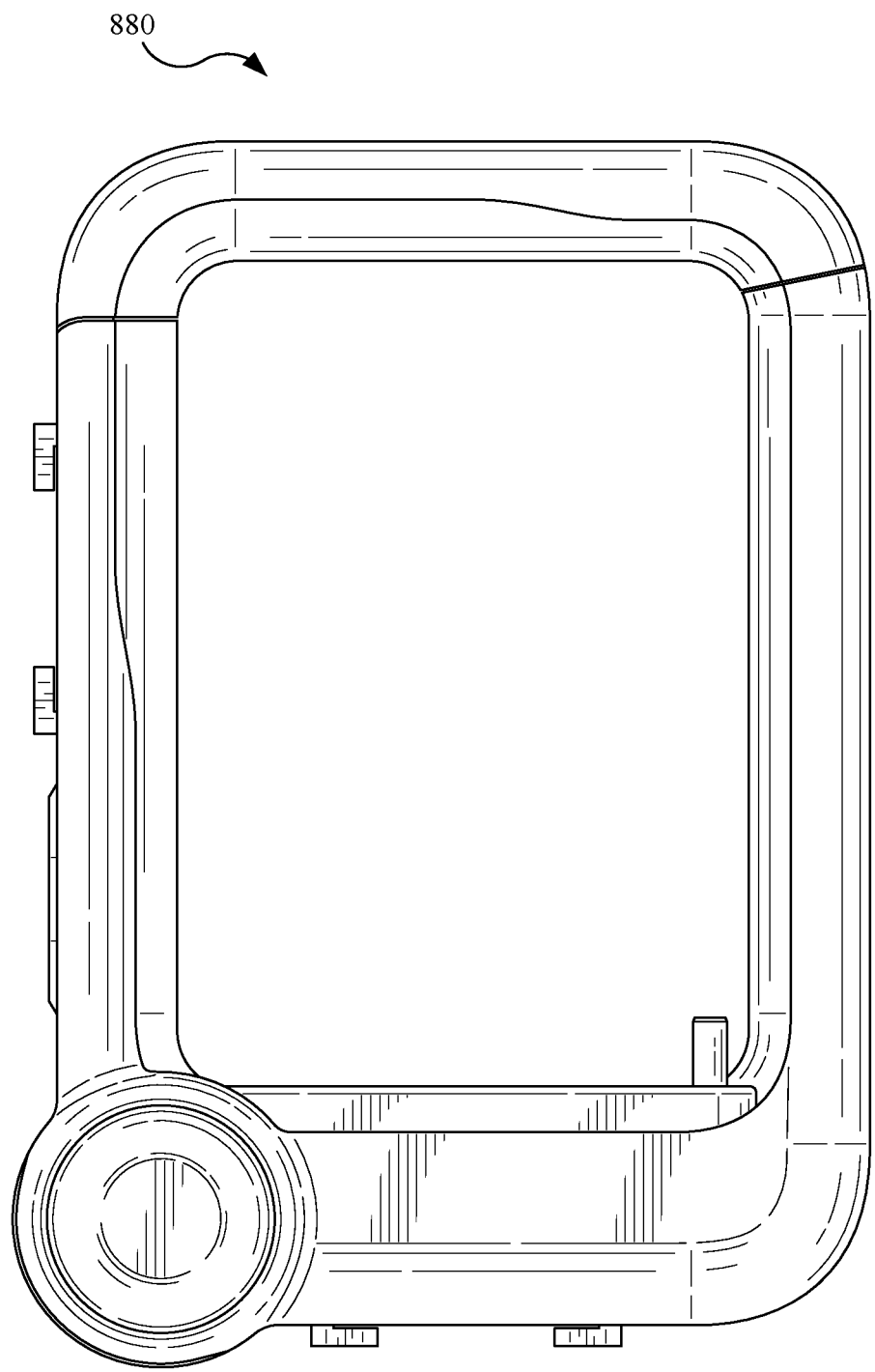
Figure 8I:
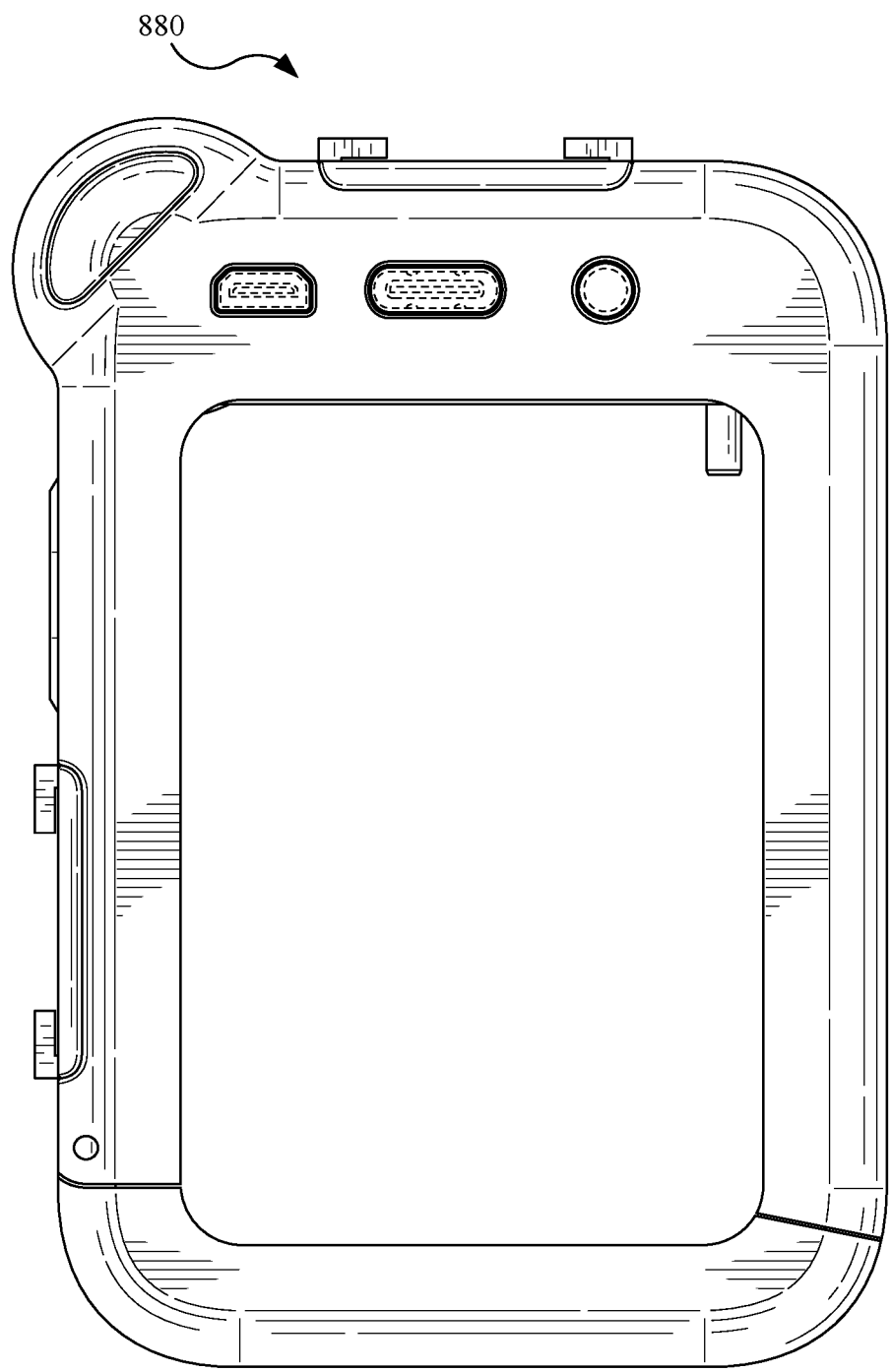
Figure 8J:
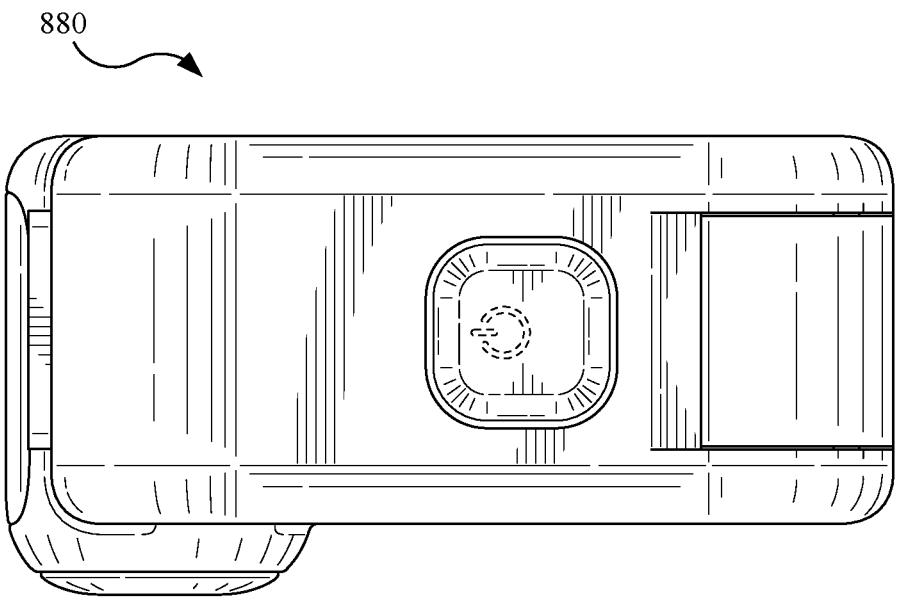
Figure 8K:
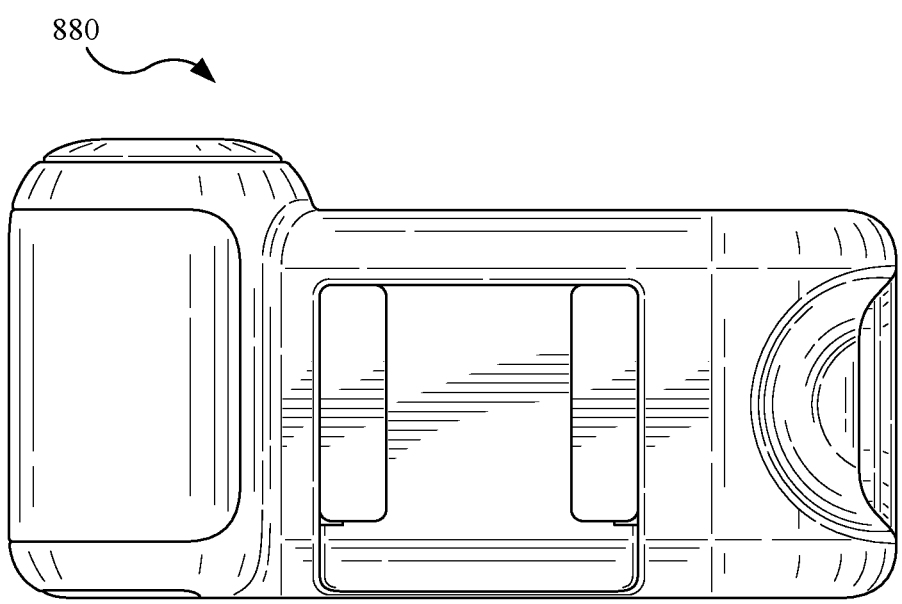
Figure 8L:
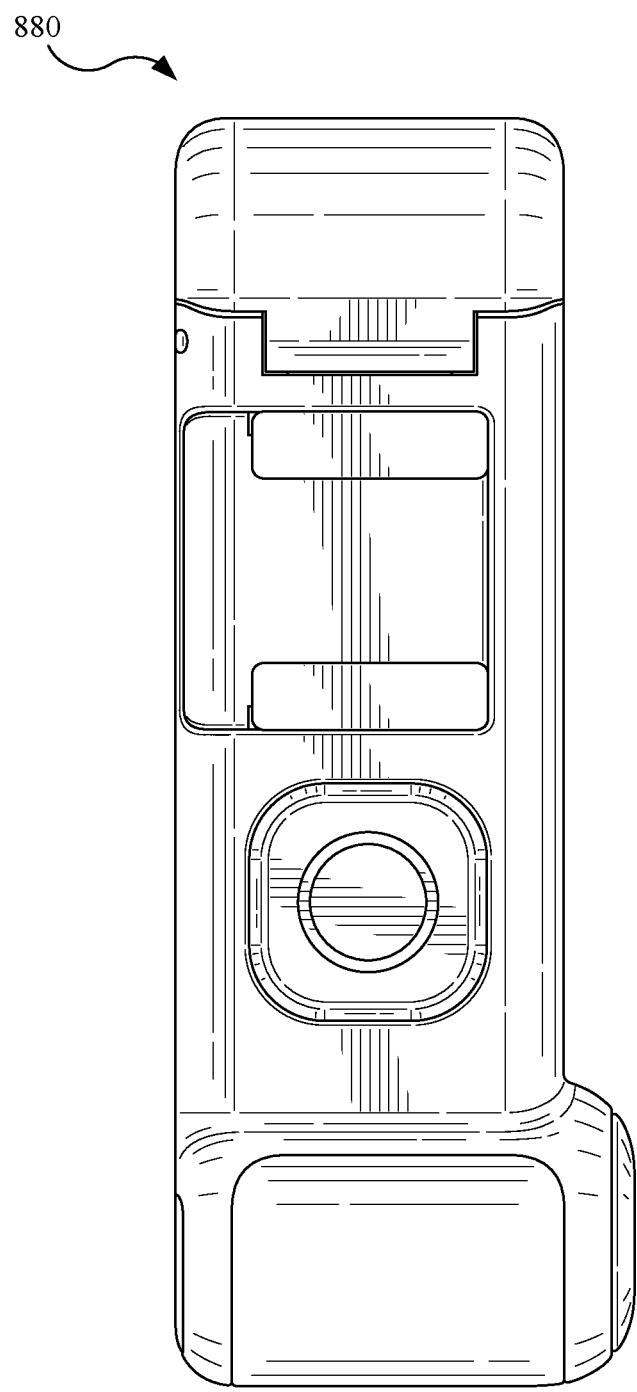
Figure 8M:
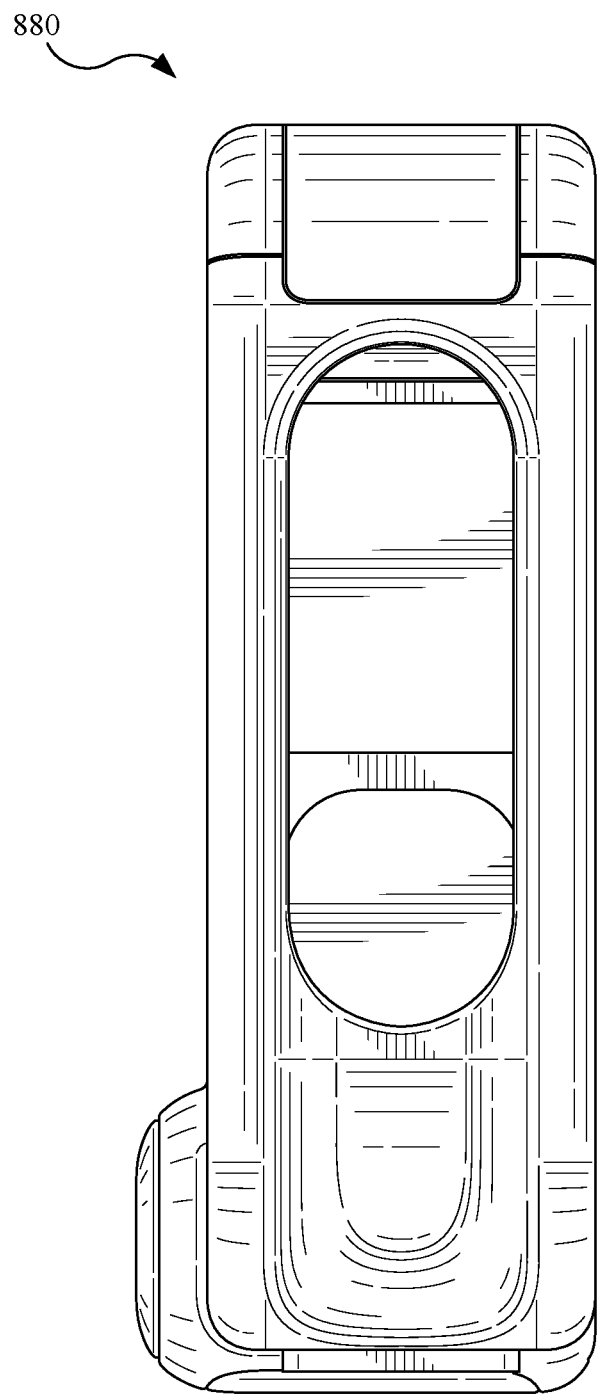
Figure 8N:
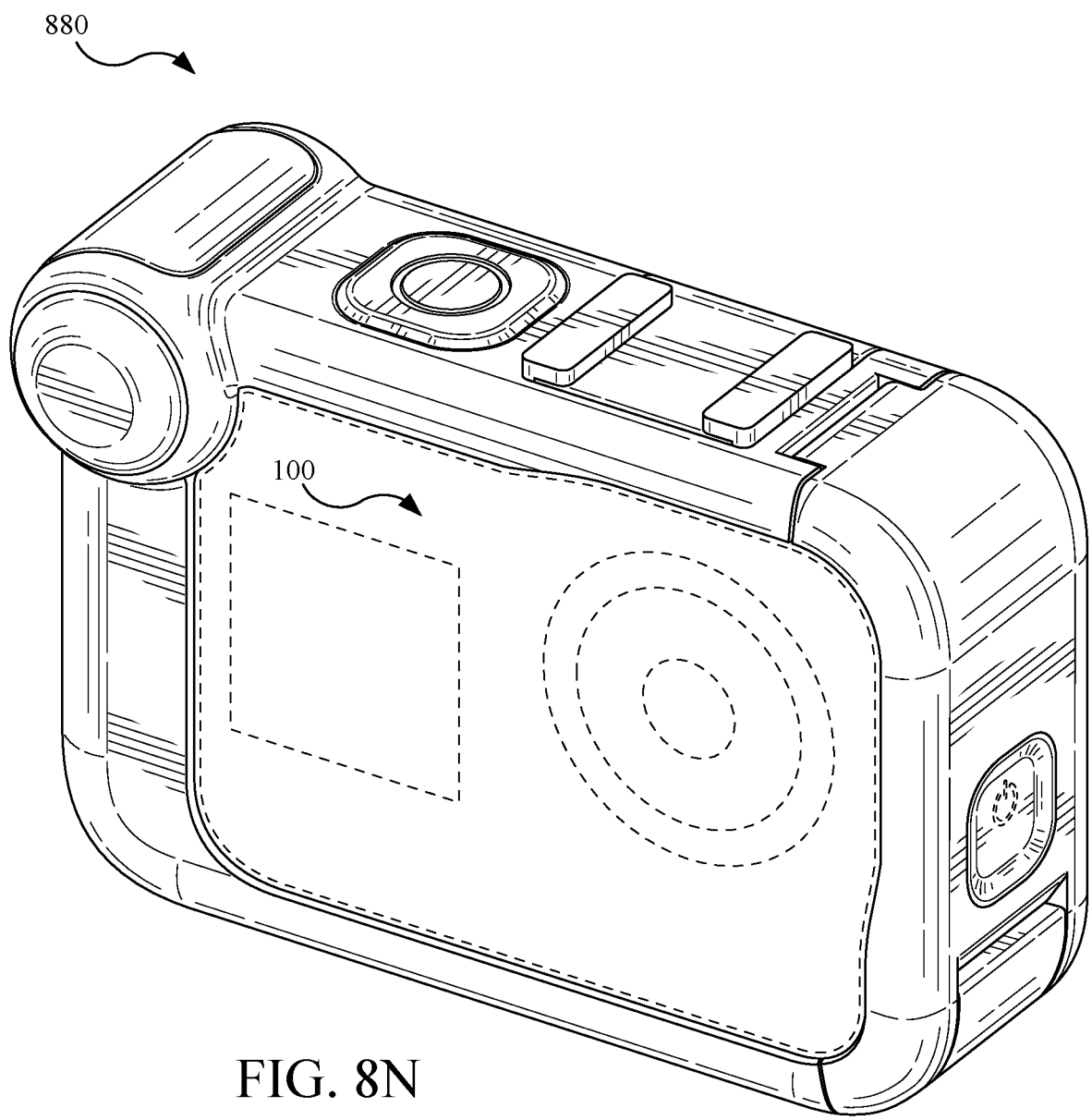
Figure 8O:
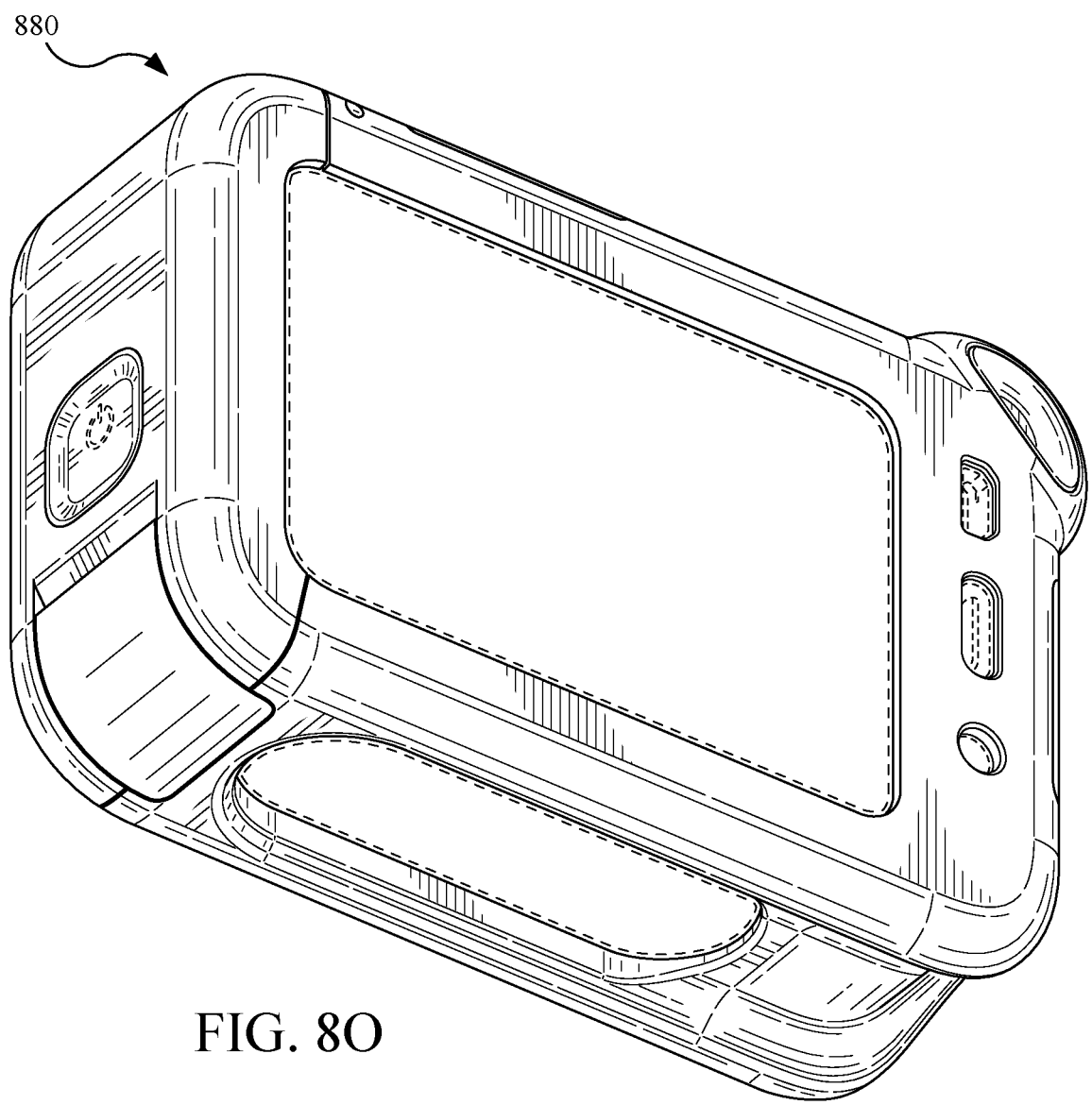
Figure 8P:
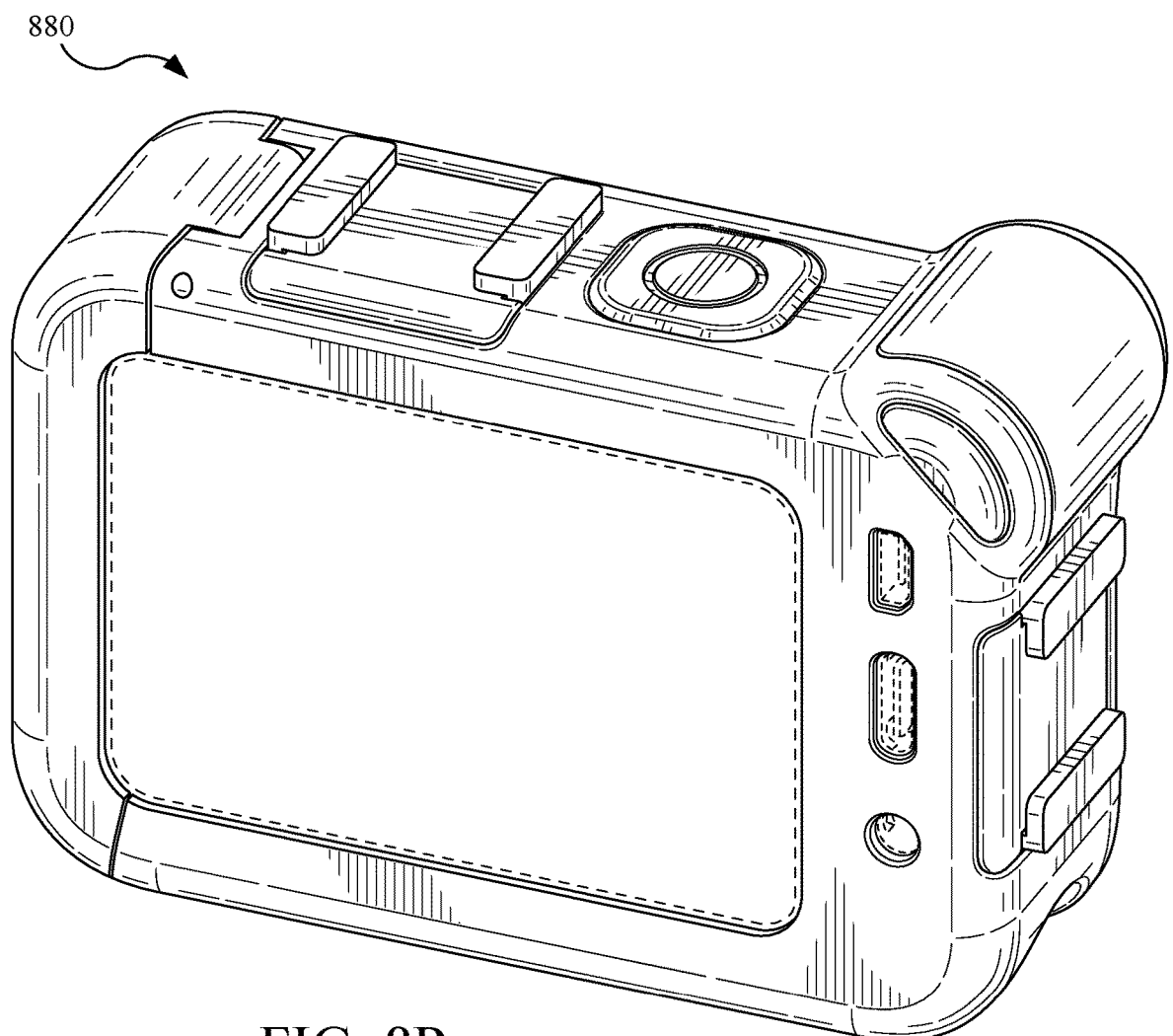
Figure 8Q:
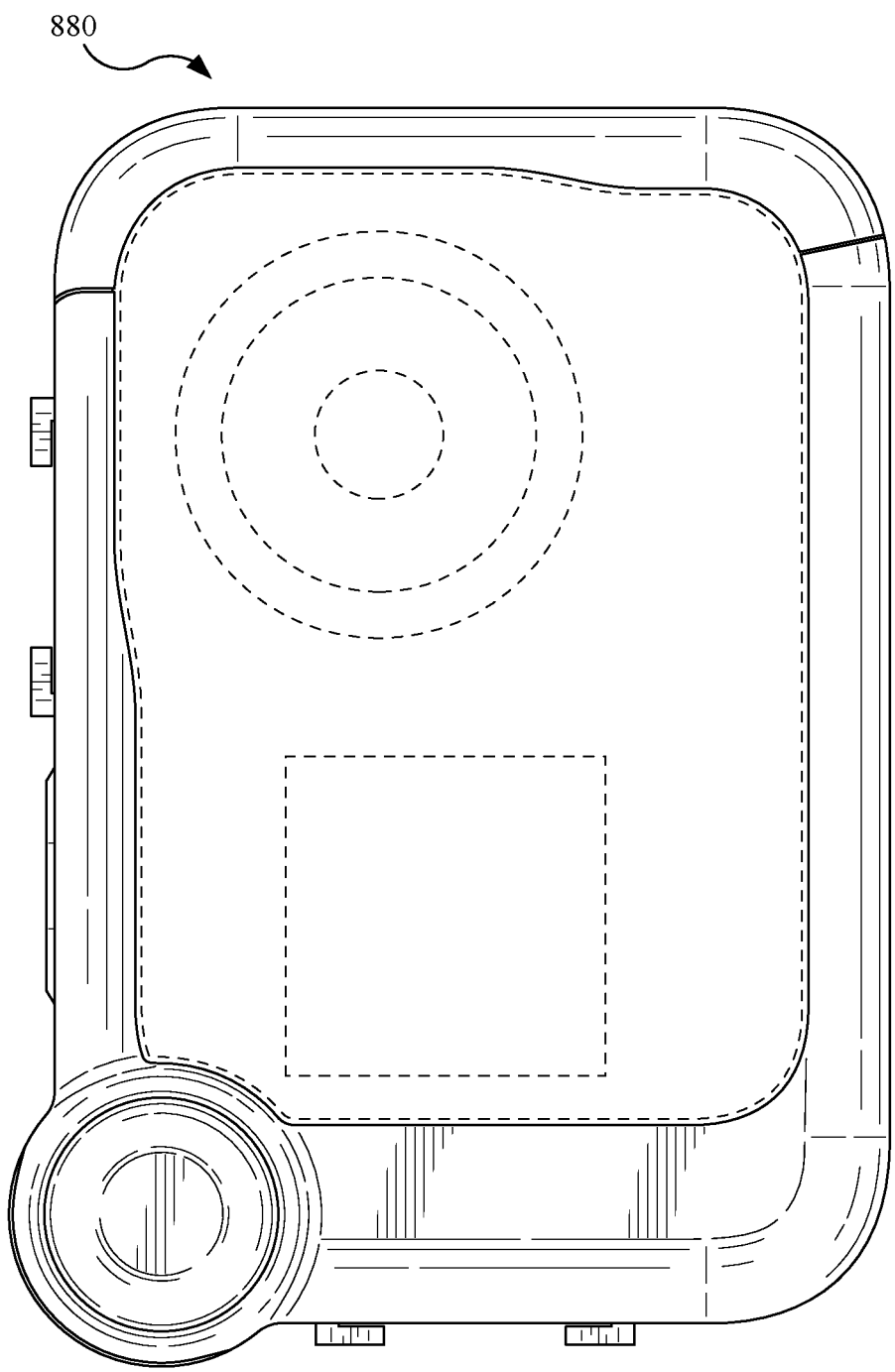
Figure 8R:
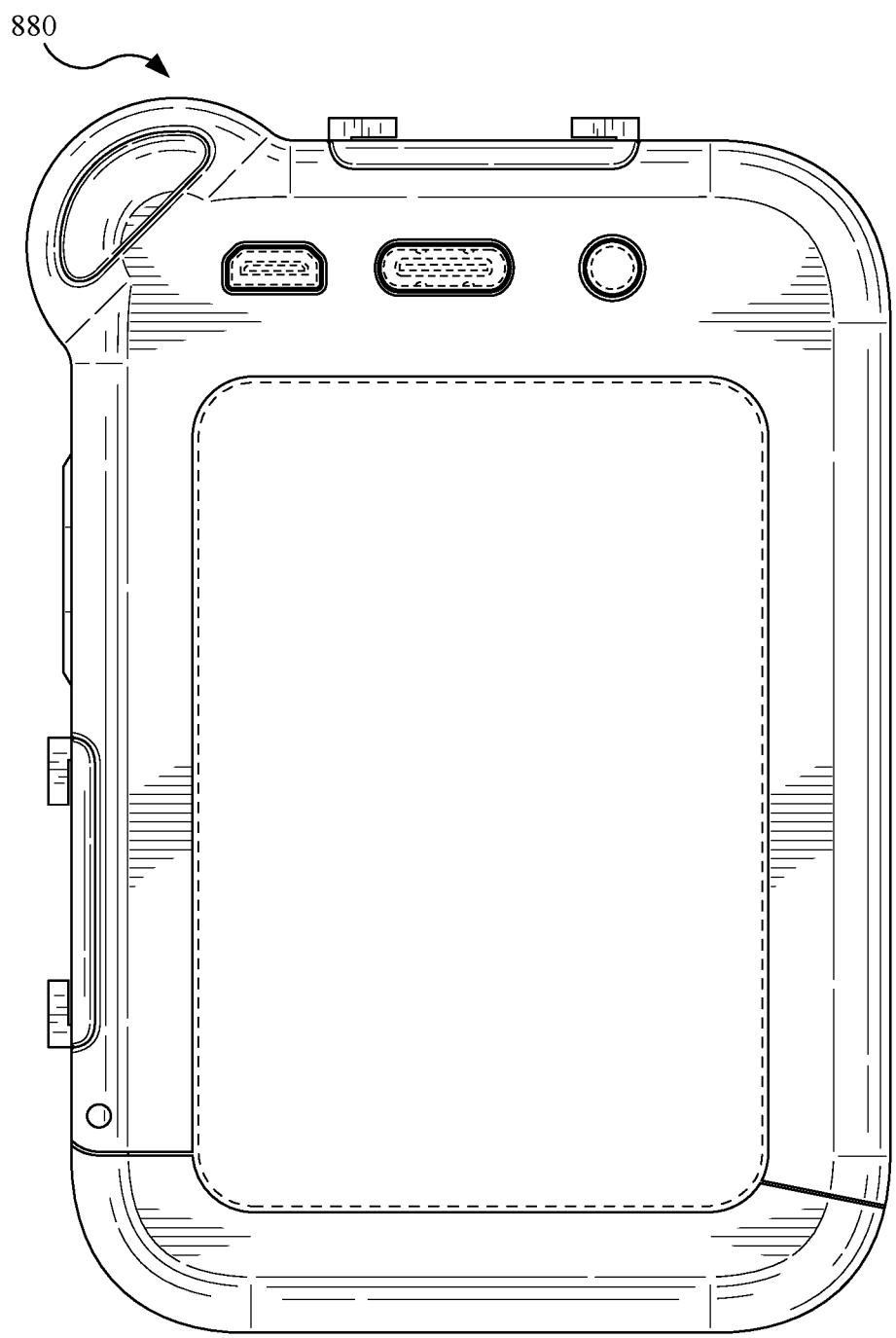
Figure 8S:
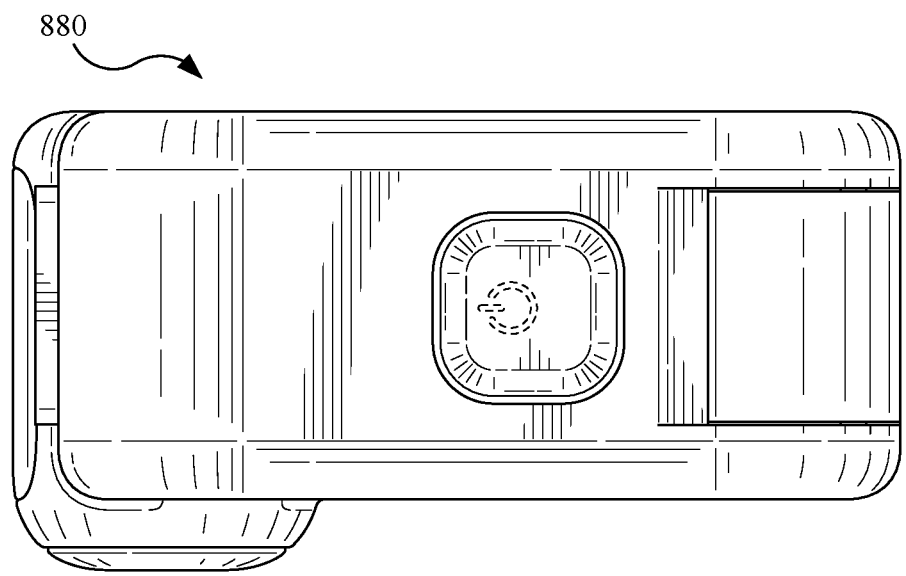
Figure 8T:
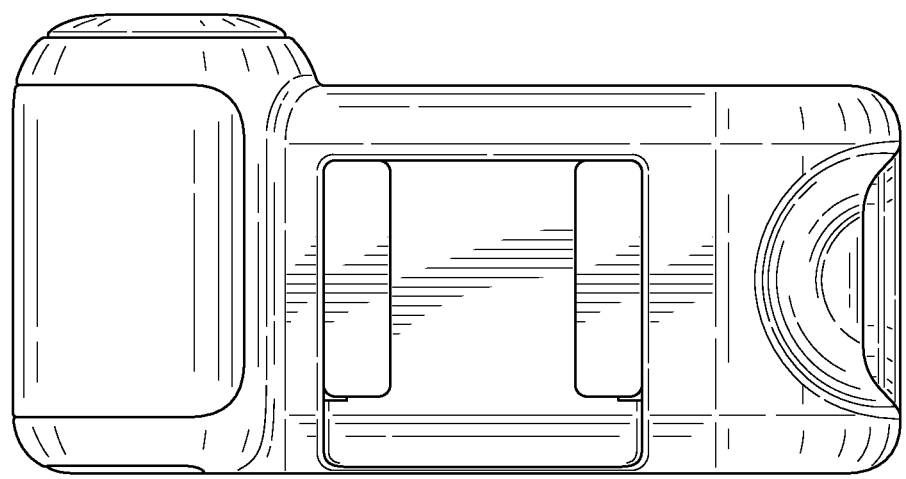
Figure 8U:
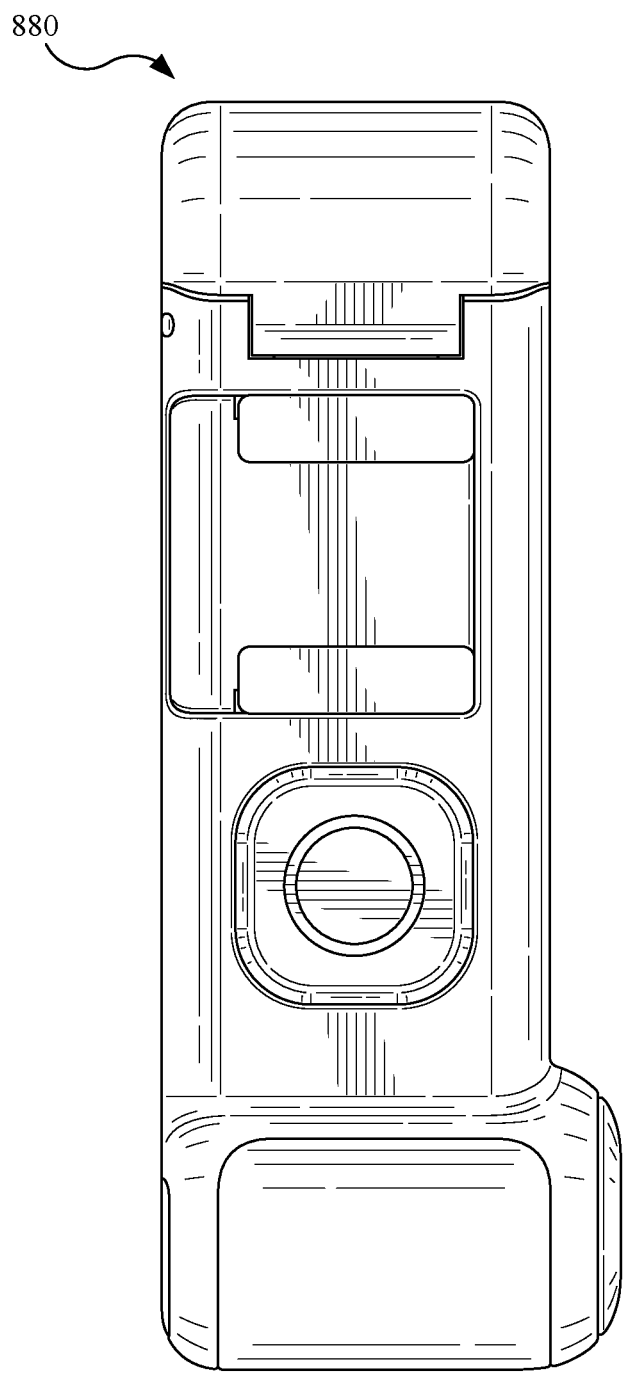
Figure 8V:
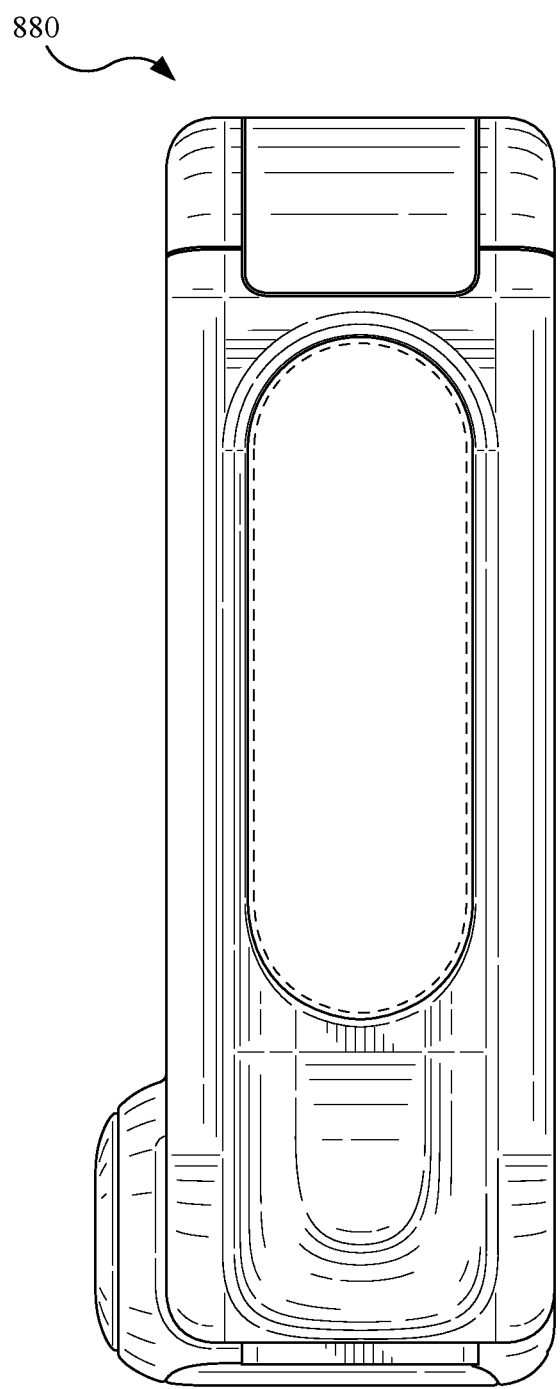

FIGS. 8E-8V are alternative views of the electronic housing 880 shown without reference numerals. In FIGS. 8N-8V depict the image capture device 100 in dashed lines and inside the electronic housing 880.

Referring to FIGS. 9A-9E, the battery housing 980 is configured similar to the electronic housing 880 with differences described below. In particular, the battery housing 980 includes a battery internal thereto (not shown), which provides supplemental power to the image capture device 100. Additionally, rather than include the rear opening 882*a*, the battery housing 980 includes a closed back side. Further, rather than include the mount aperture 890c, the battery housing 980 includes a mount 950. Various, but not all, of the comment elements with the electronic housing 880 are identified with like reference numerals for the battery housing 980.

Furthermore, the battery housing 980 is configured to seal the internal compartment of the body 140 of the image capture device 100 with the door 144 being removed therefrom. The battery housing 980 includes the electronic interface 886 and the protrusion 888 as described above with respect to the electronic housing 880. The battery housing 980 further includes a seal 988a coupled to the end of the protrusion 888 and which engages the door opening 246c in substantially the same manner as the seal 144b of the door 144 (e.g., being a peripheral seal that is compressed in a radial direction). Furthermore, the battery housing 980 may include a battery pad 988b positioned on the protrusion 888 and which engages the battery 132b to maintain engagement with the battery interface 130a of the image capture device 100. As referenced above, the seal 988a and/or the battery pad 988b may be included on the protrusion 888 of the electronic housing 880.

Further, rather than include an aperture to accommodate the mount 560 of the image capture device 100, the battery housing 980 includes the mount 950 configured substantially similar to the mount 560 (e.g., having pivotable finger members; not labeled). As shown, the mount 950 may be positioned rearward of a spatial center of the image capture device 100. By moving the mount 950 rearward relative to the image capture device 100 as compared to the mount 560, the mount 950 may be positioned nearer the center of gravity of the combined system of the image capture device 100 and the battery housing 980 (e.g., due to the mass and position of the battery in the battery housing 980).

Figure 9A:
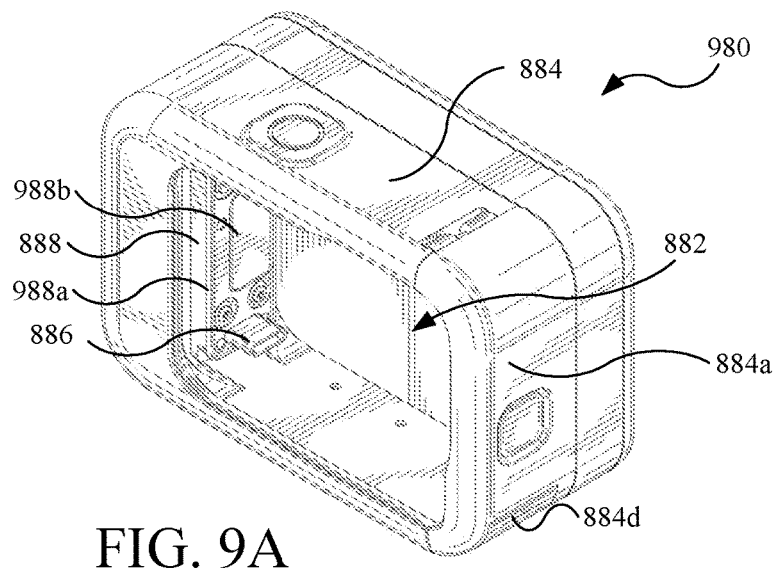
FIG. 9A is an upper, front, right perspective view of an electronic housing for the image capture device of FIG. 1B.
Figure 9C:
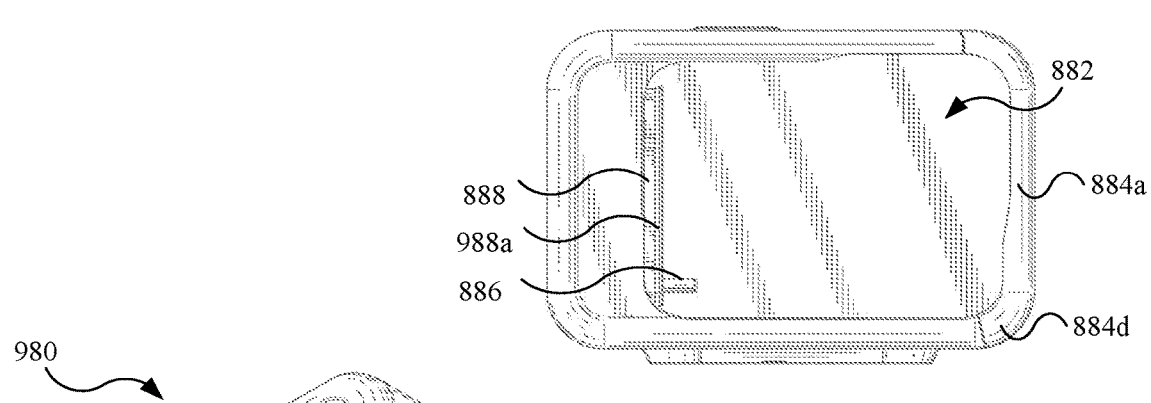
FIG. 9C is a front view of the electronic housing of FIG. 9A.
Figure 9B:
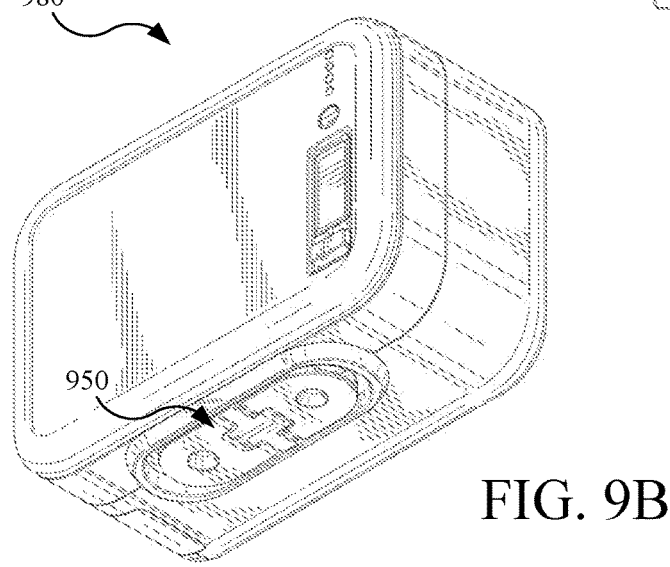
FIG. 9B is a lower, rear, left perspective view of the electronic housing of FIG. 9A.
Figures 9D, 9E:
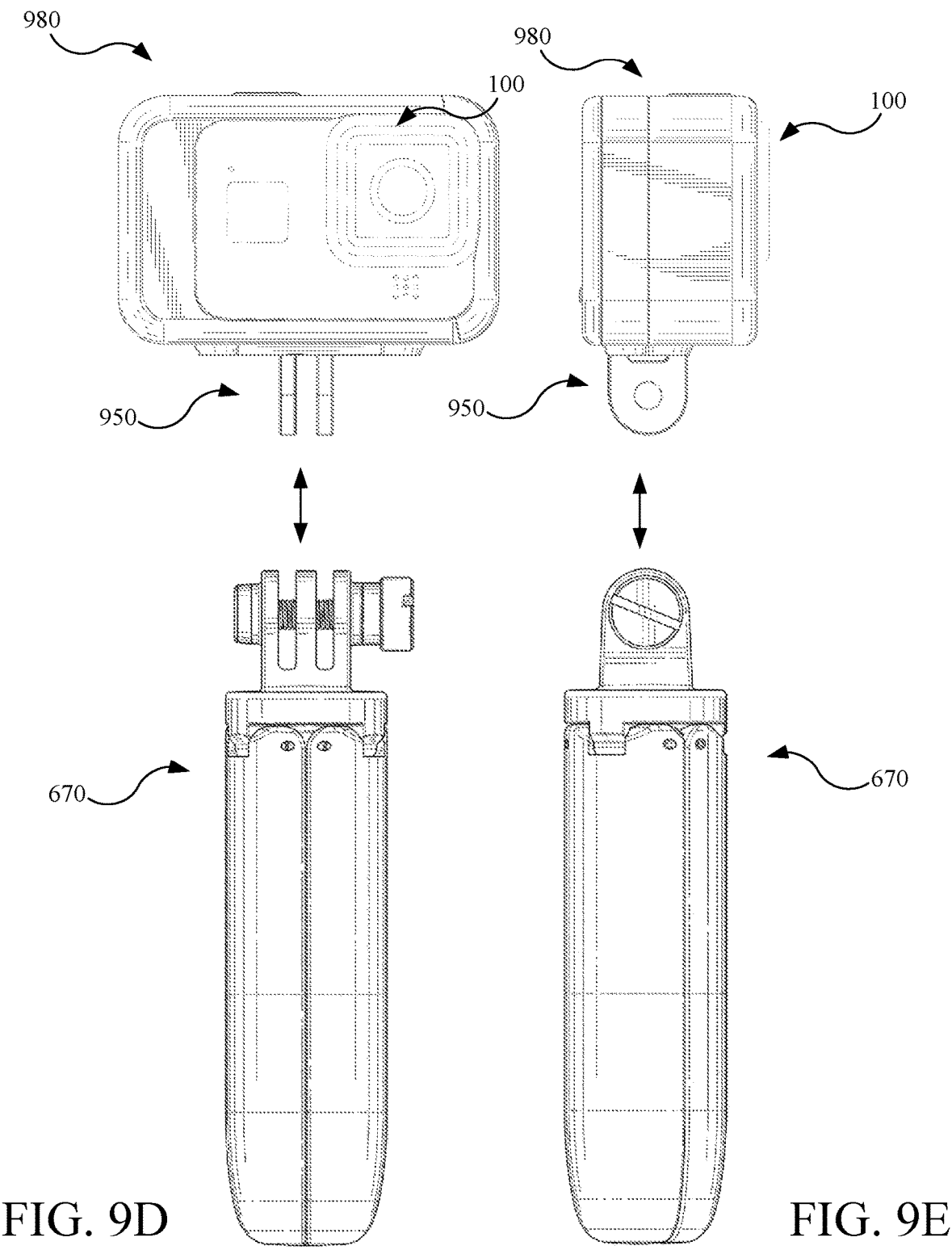
FIG. 9D is a front view of the image capture device of FIG. 1B, the elastomeric housing of FIG. 9A, and the support device of FIG. 6C.
FIG. 9E is a right view of the image capture device of FIG. 1B, the elastomeric housing of FIG. 9A, and the support device of FIG. 6C.
Figure 9F:
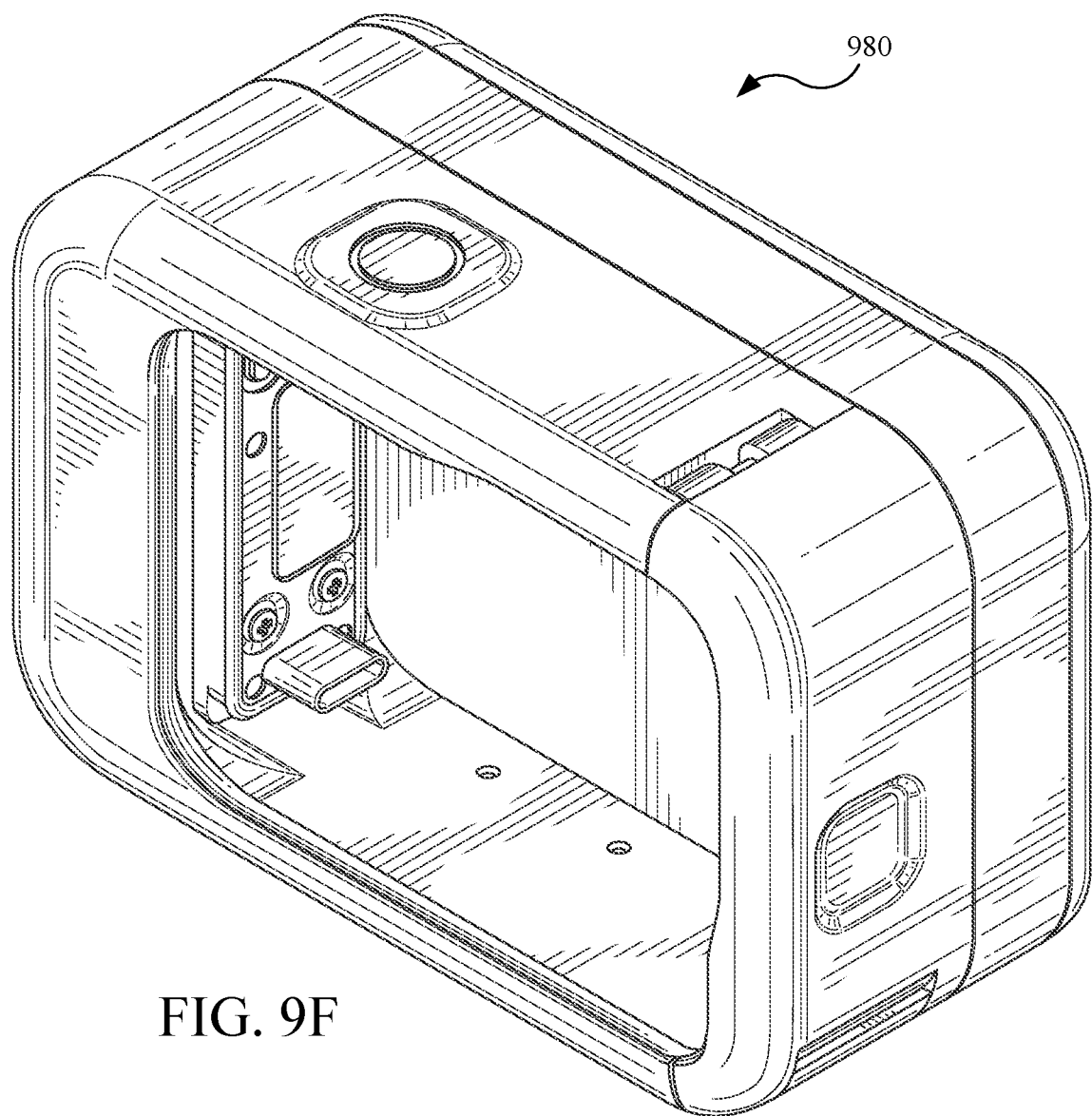
FIGS. 9F-9U are alternative views of the elastomeric housing of FIG. 9A.
Figure 9G:
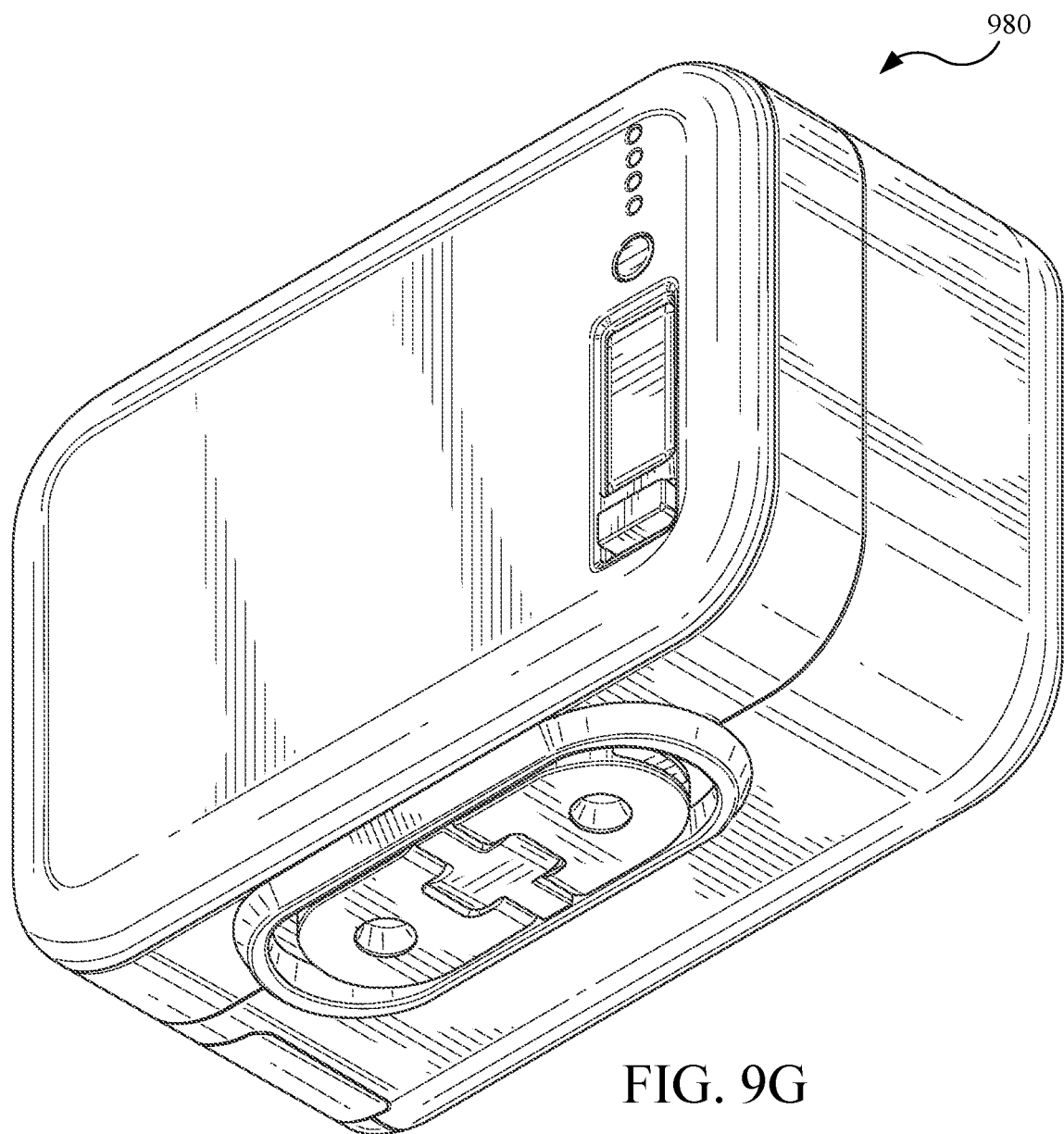
Figure 9H:
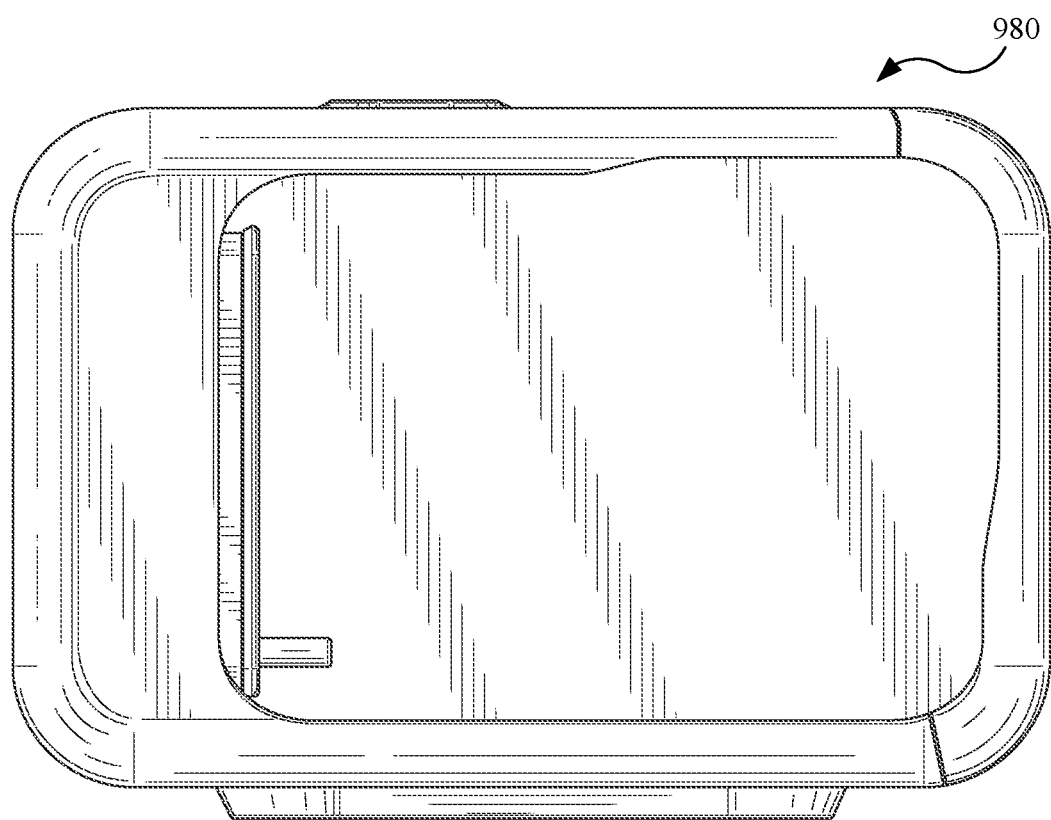
Figure 9I:
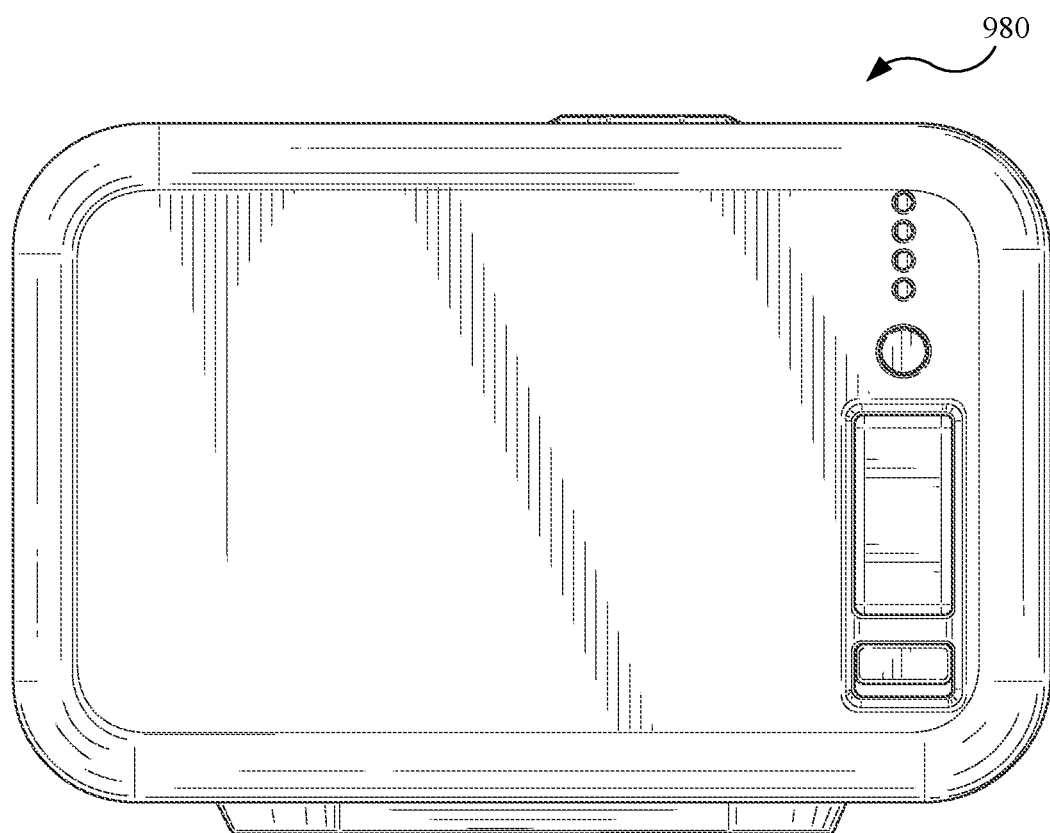
Figure 9J:
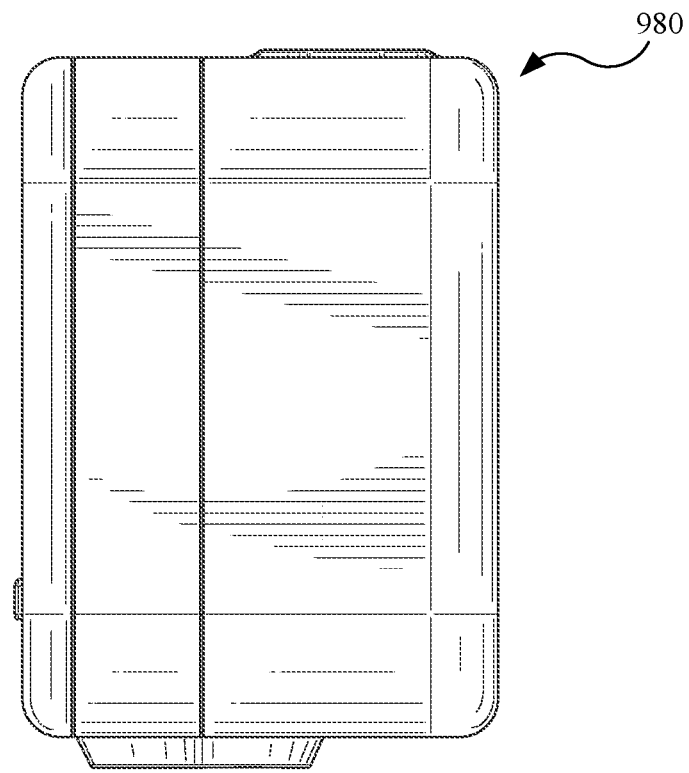
Figure 9K:
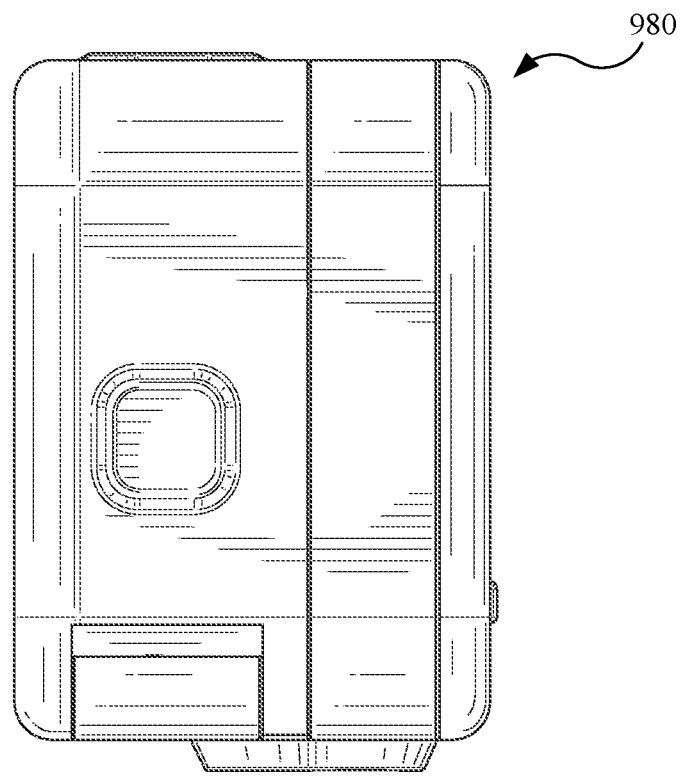
Figure 9L:
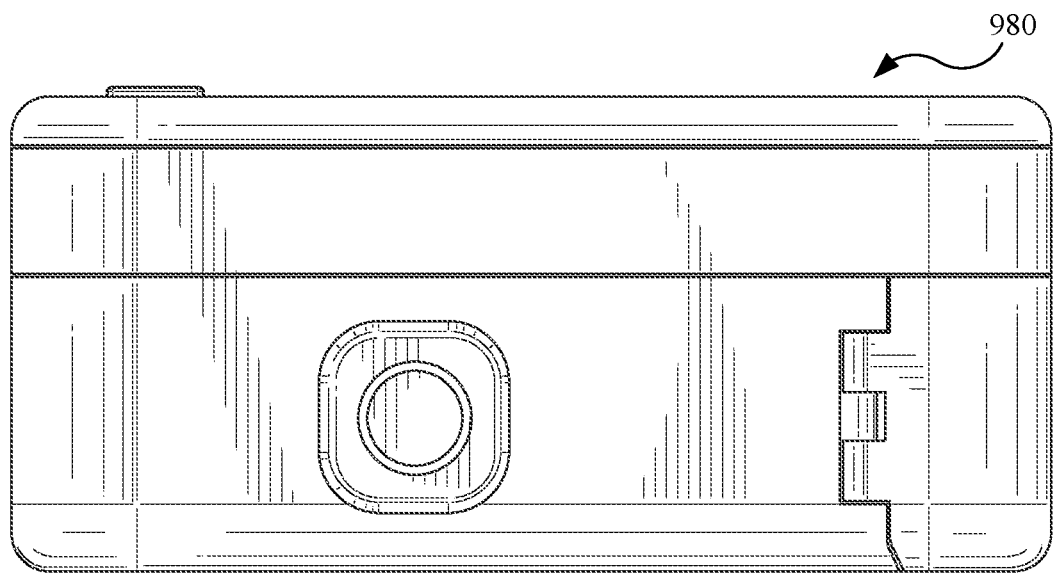
Figure 9M:
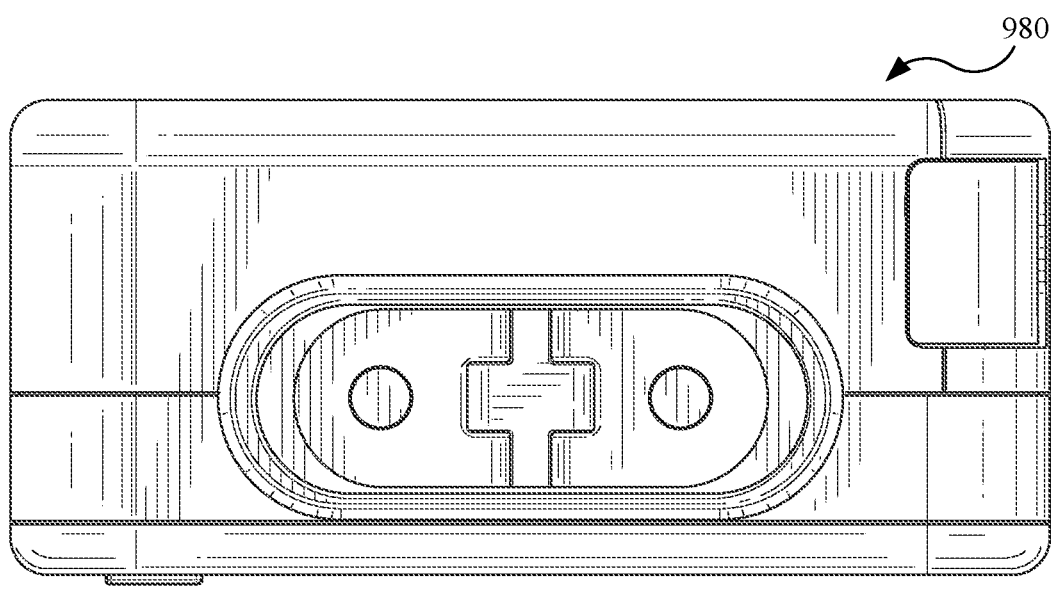
Figure 9N:
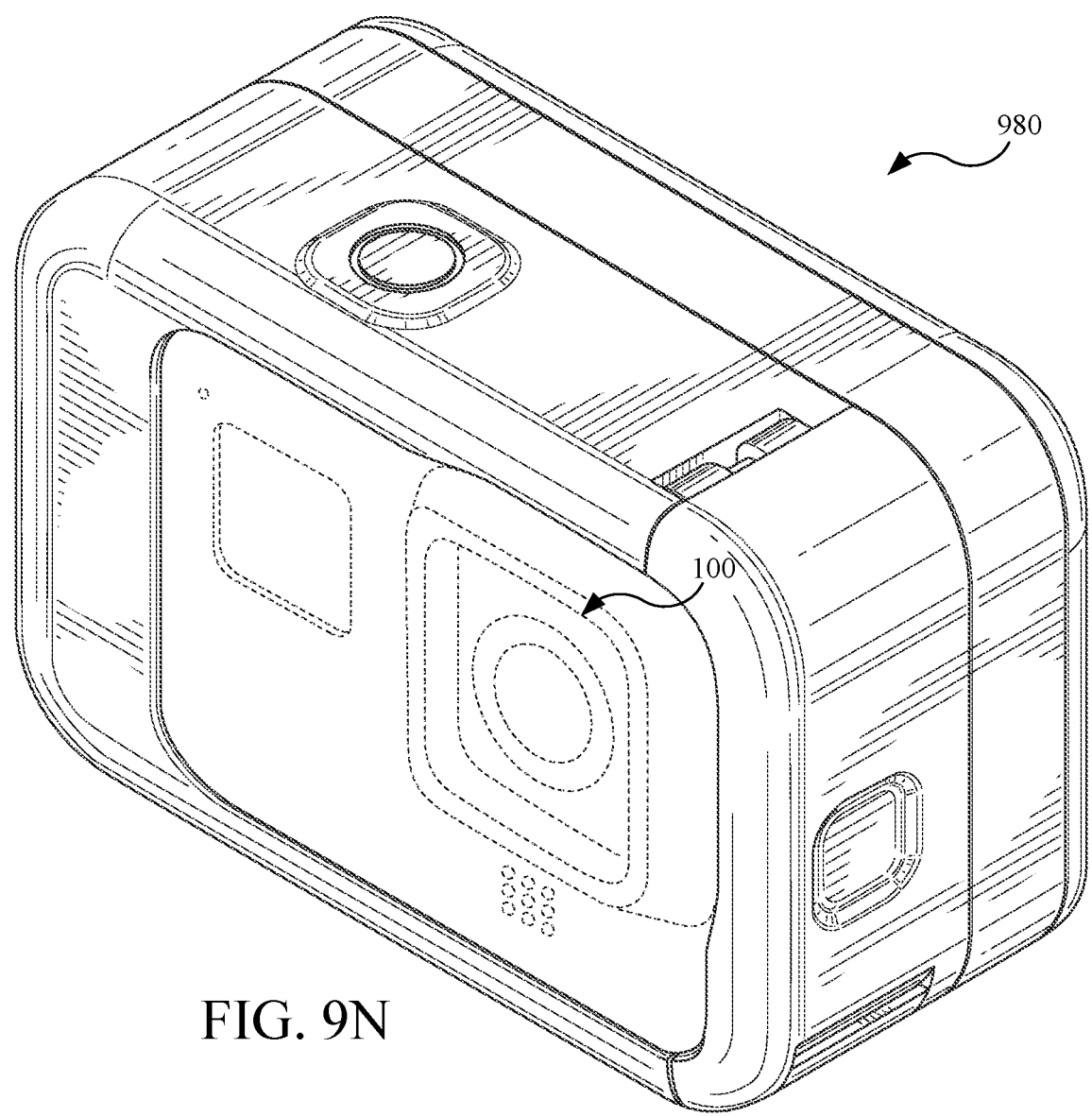
Figure 9O:
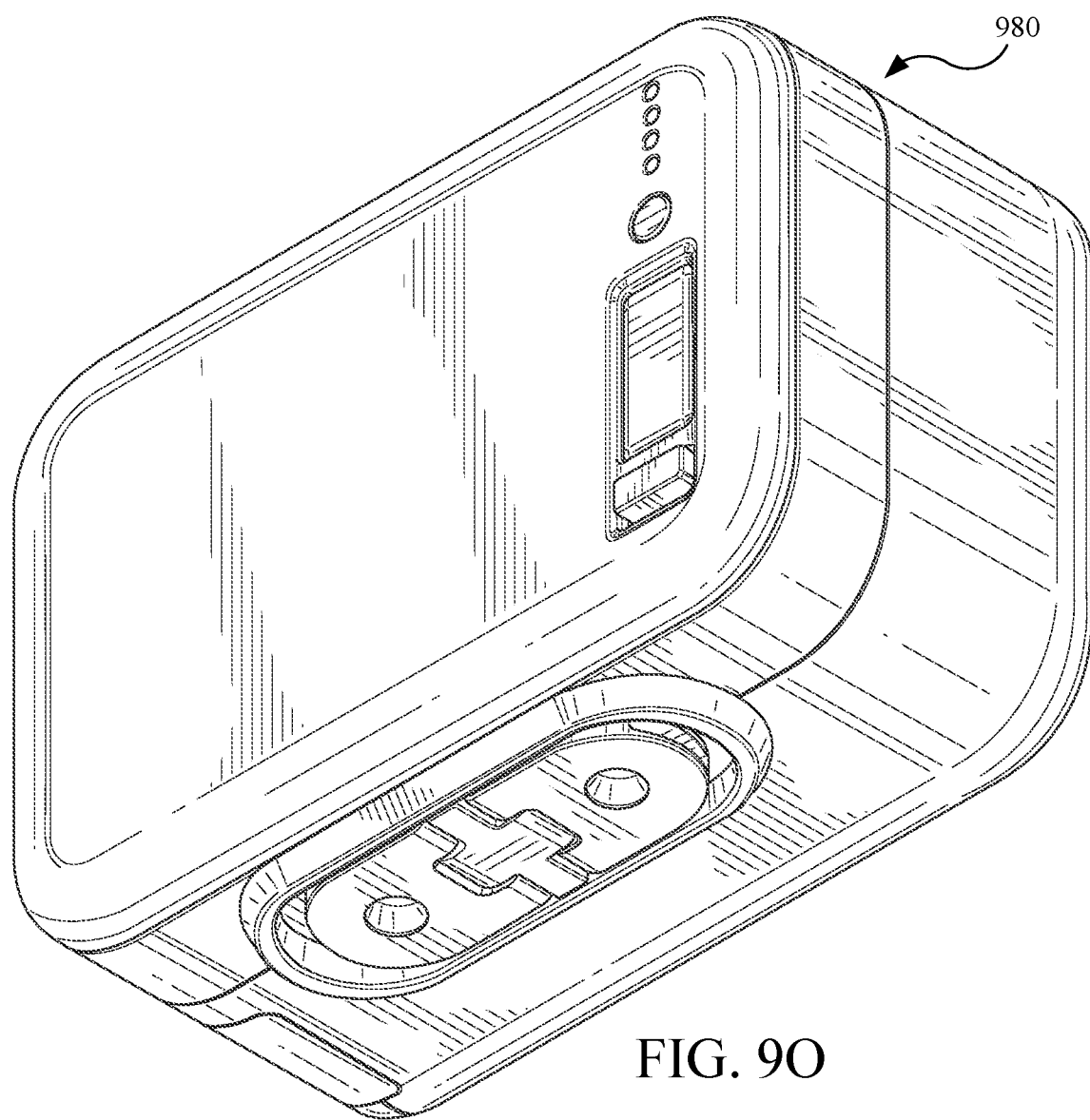
Figure 9P:
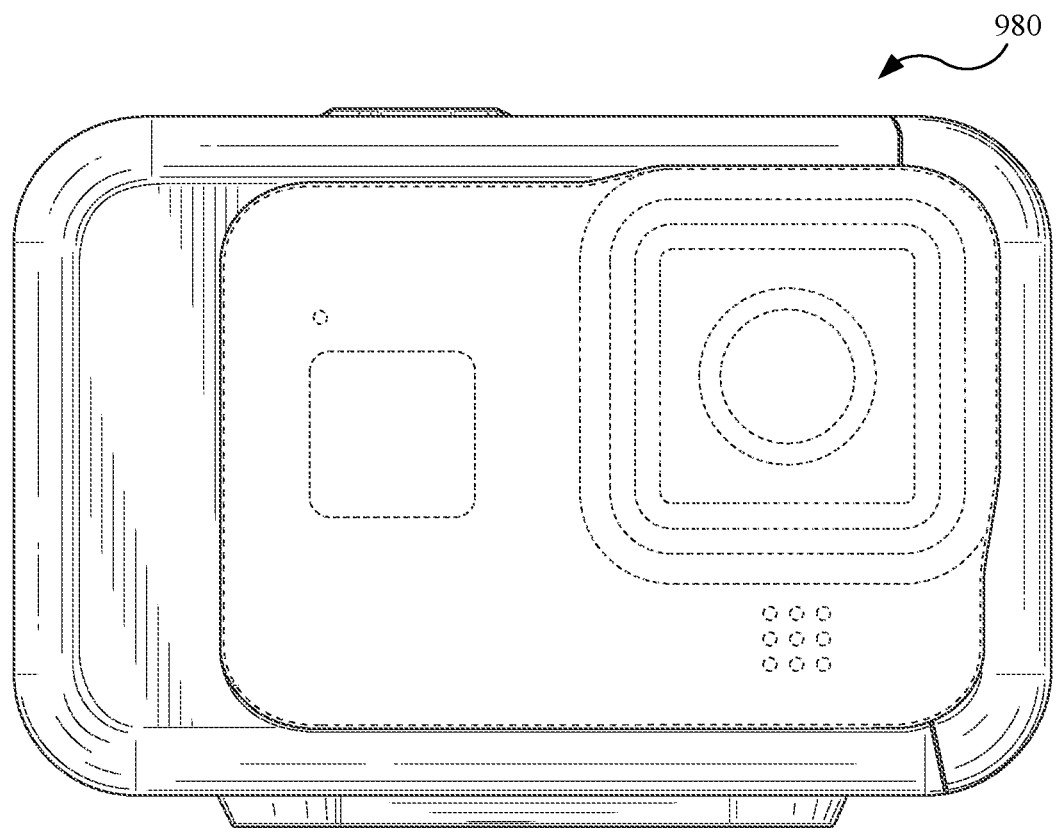
Figure 9Q:
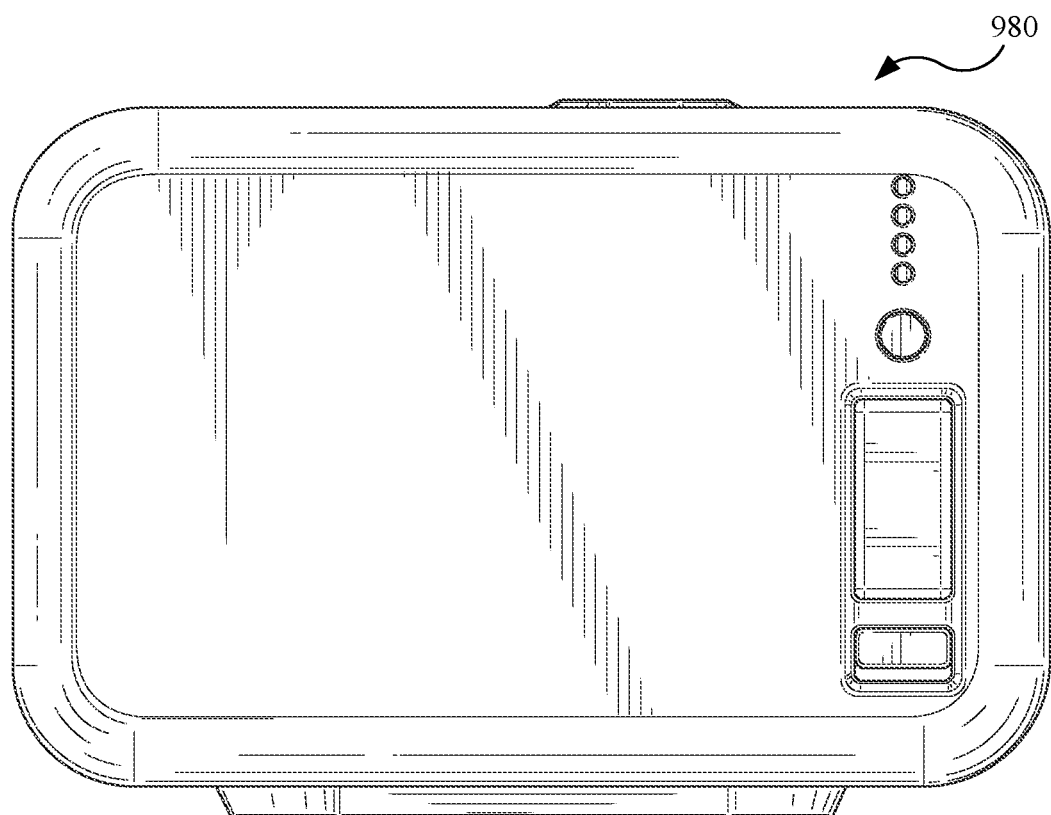
Figure 9R:
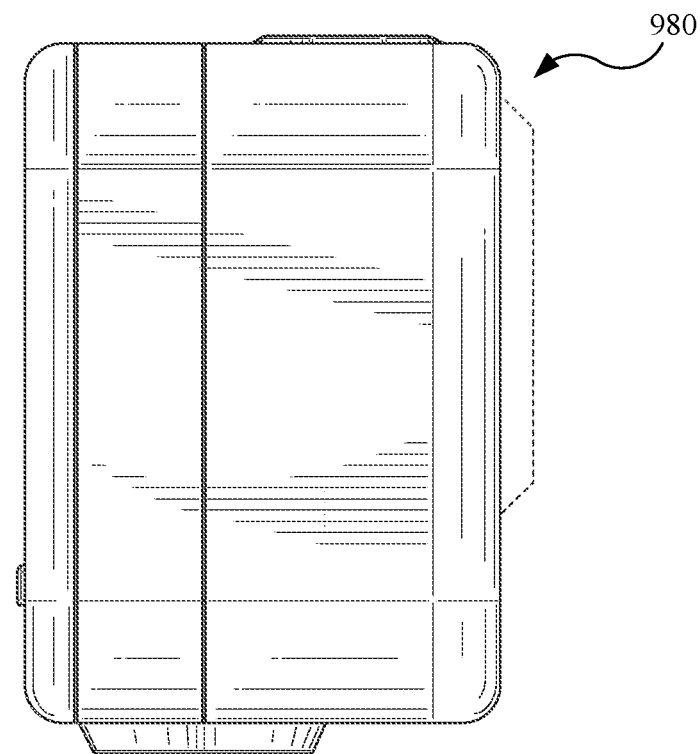
Figure 9S:
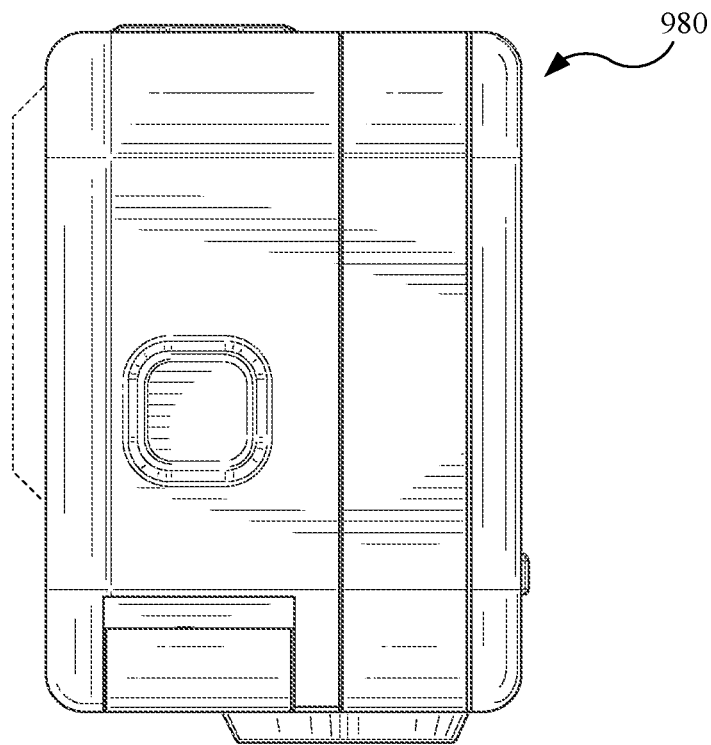
Figure 9T:
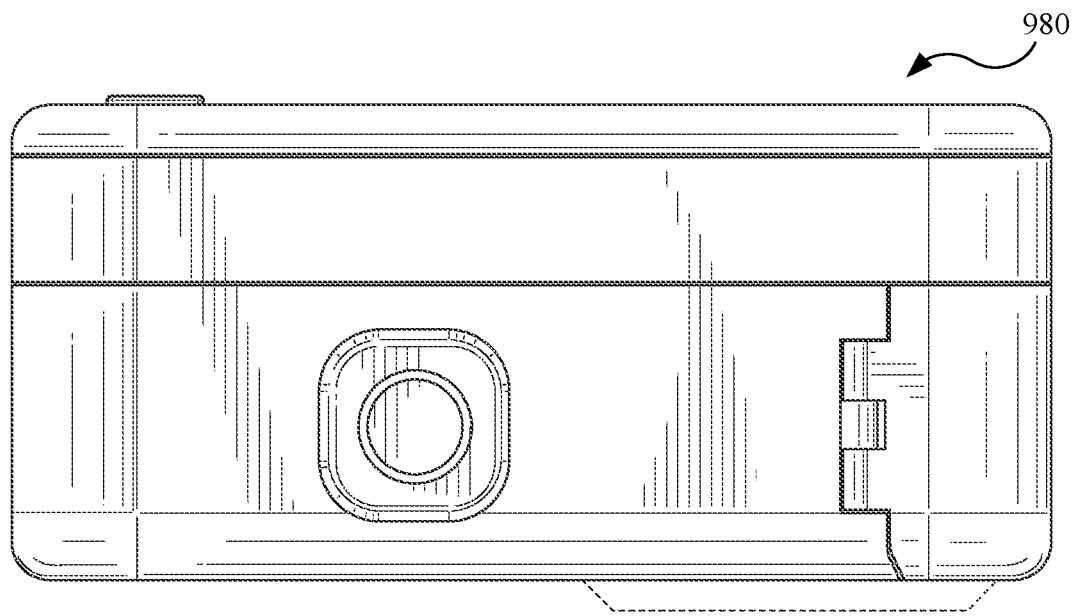
Figure 9U:
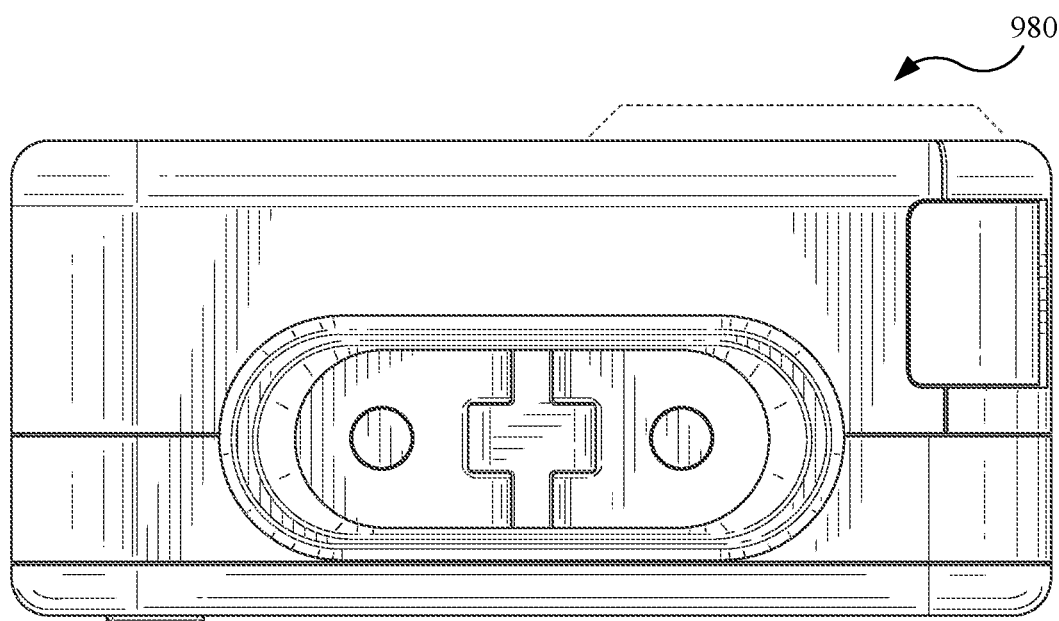
Figure 10A:
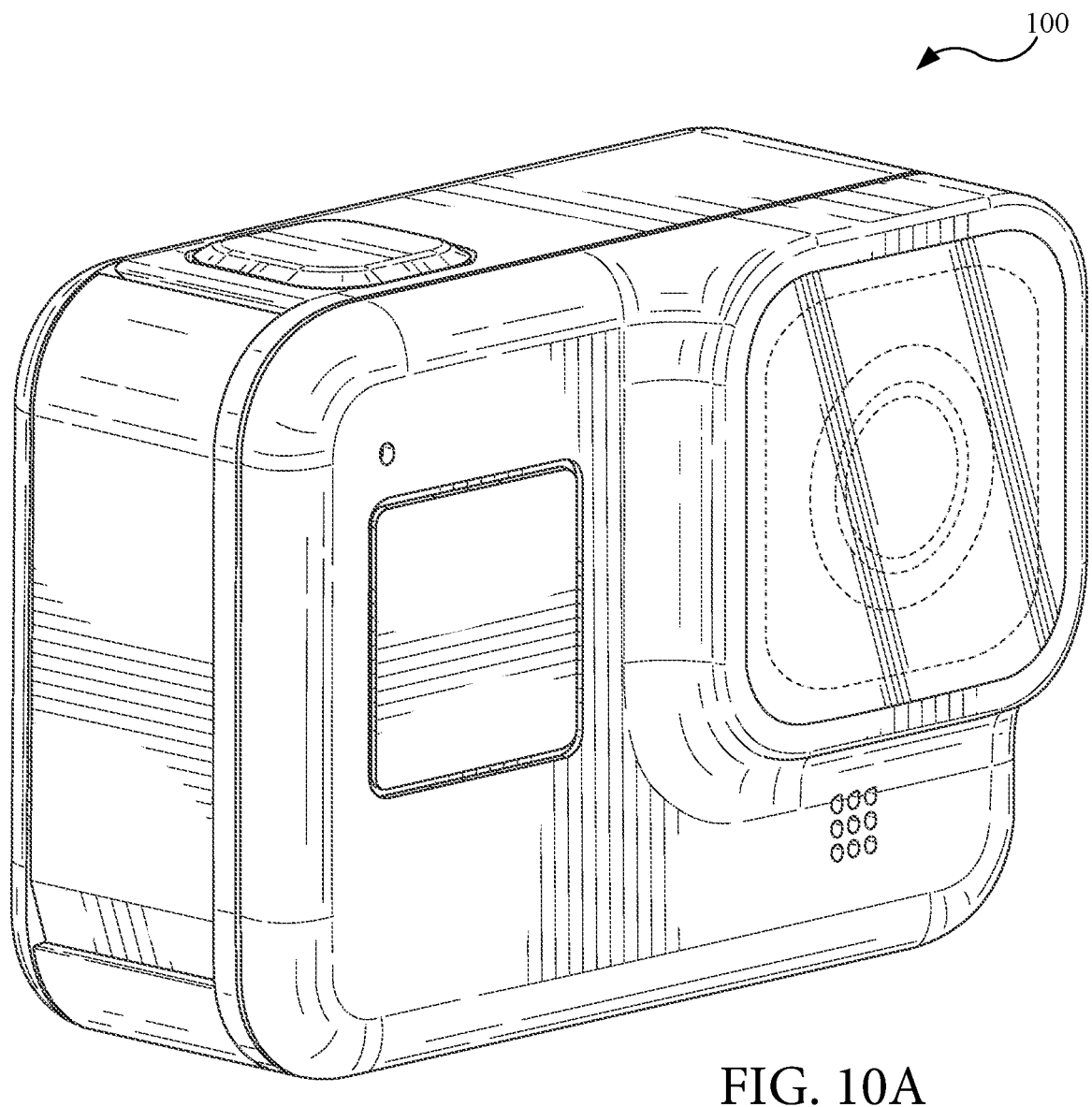
FIG. 10A-10P are alternative views of the image capture device 100.
Figure 10B:
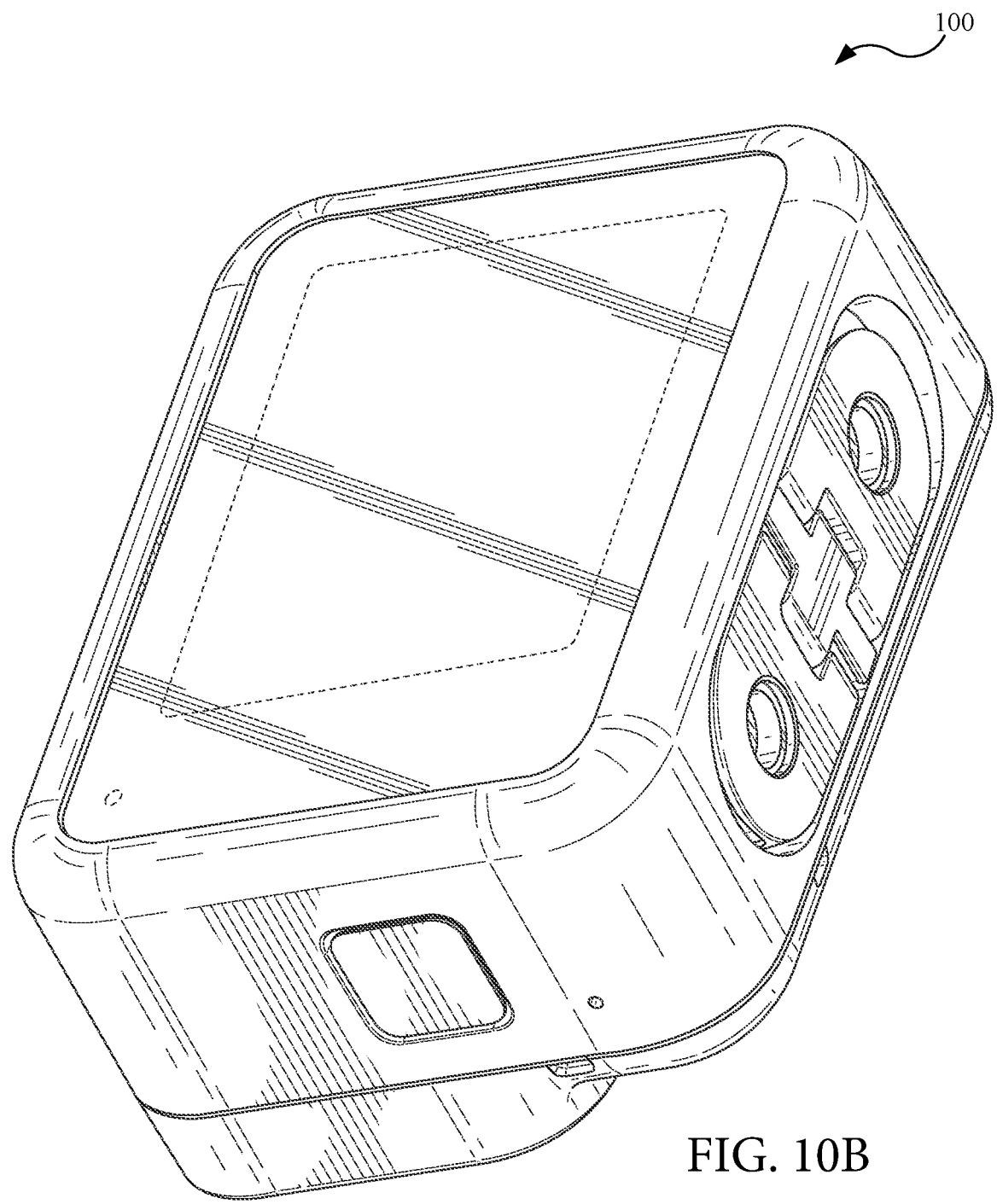
Figure 10C:
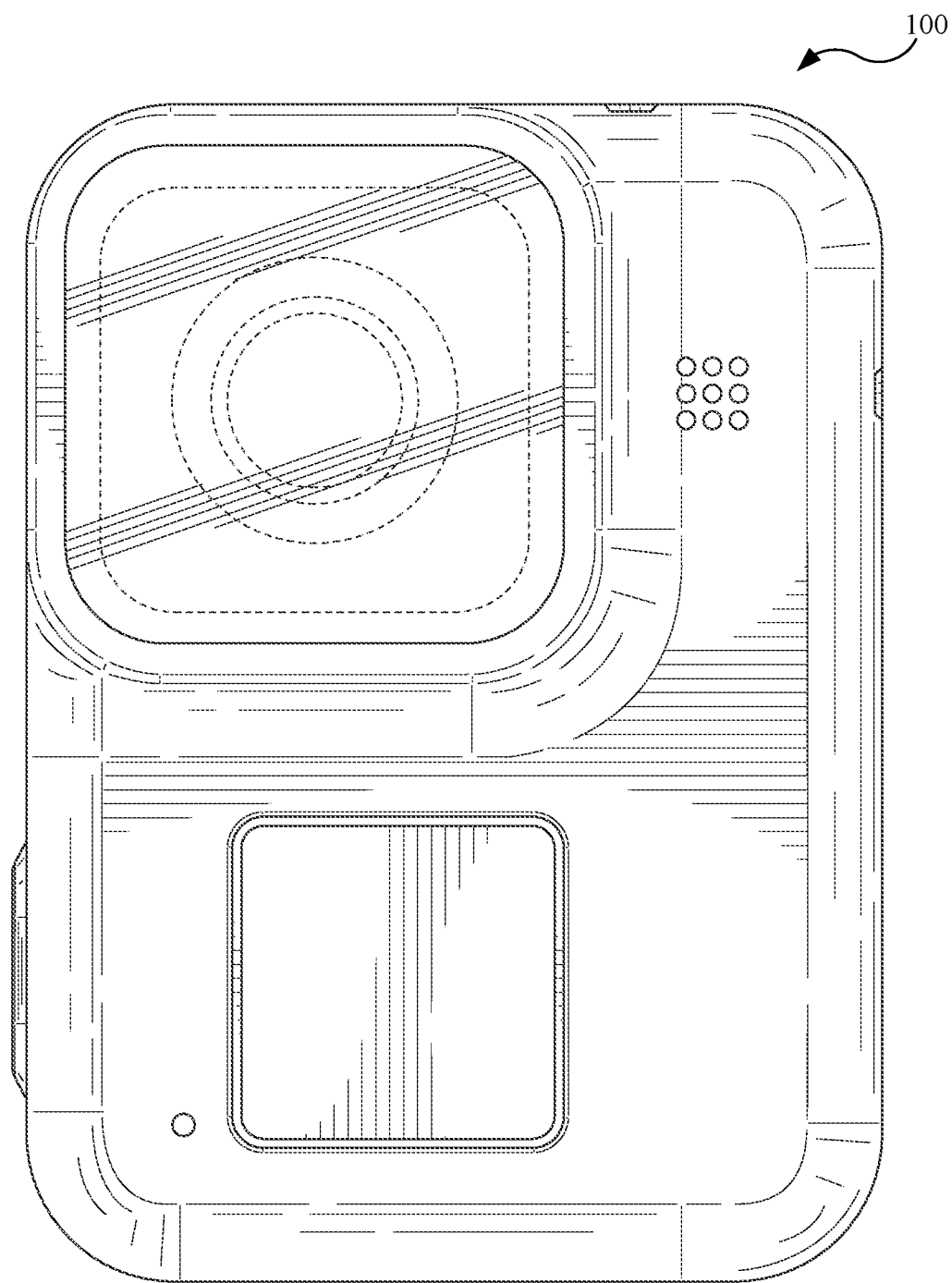
Figure 10D:
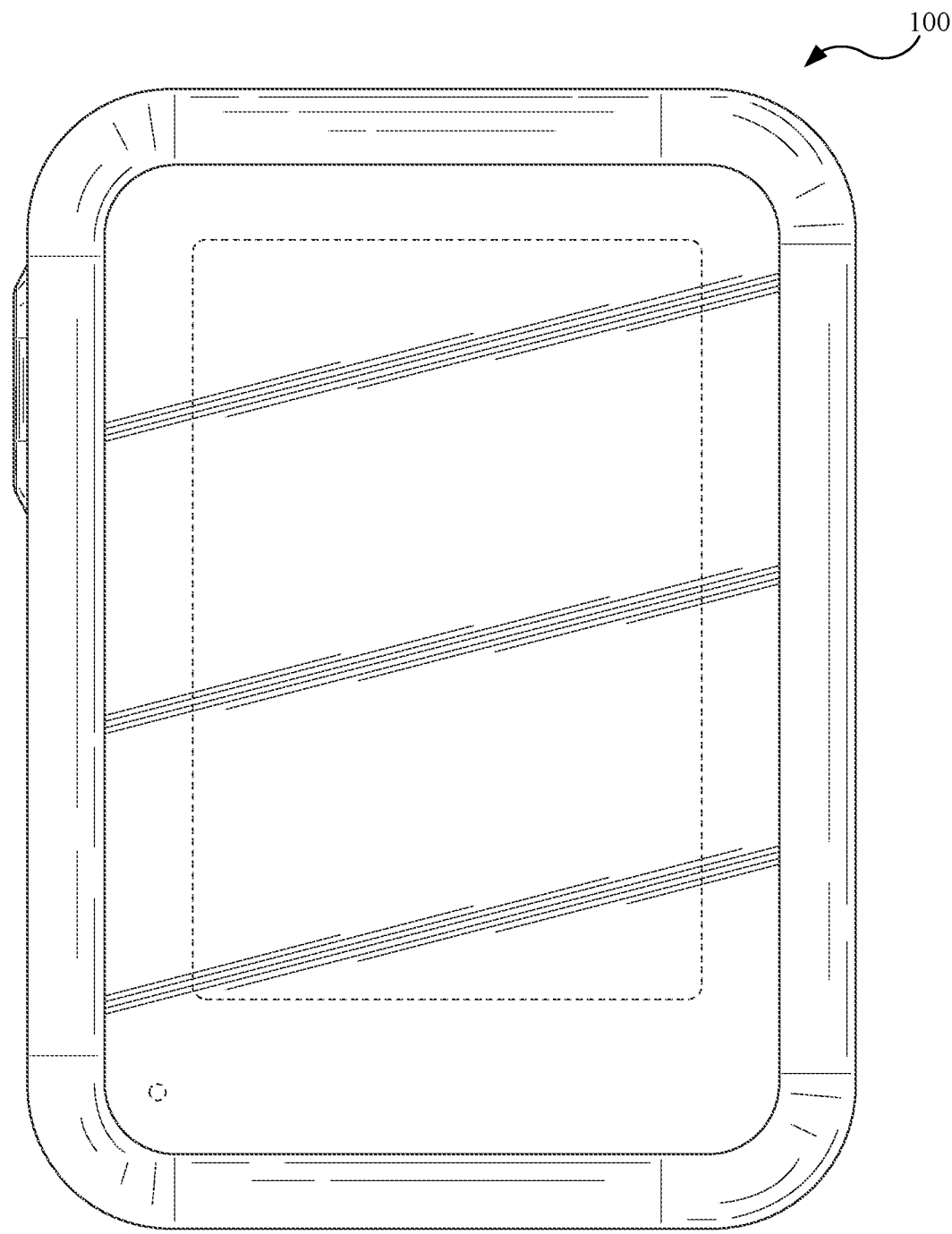
Figure 10E:
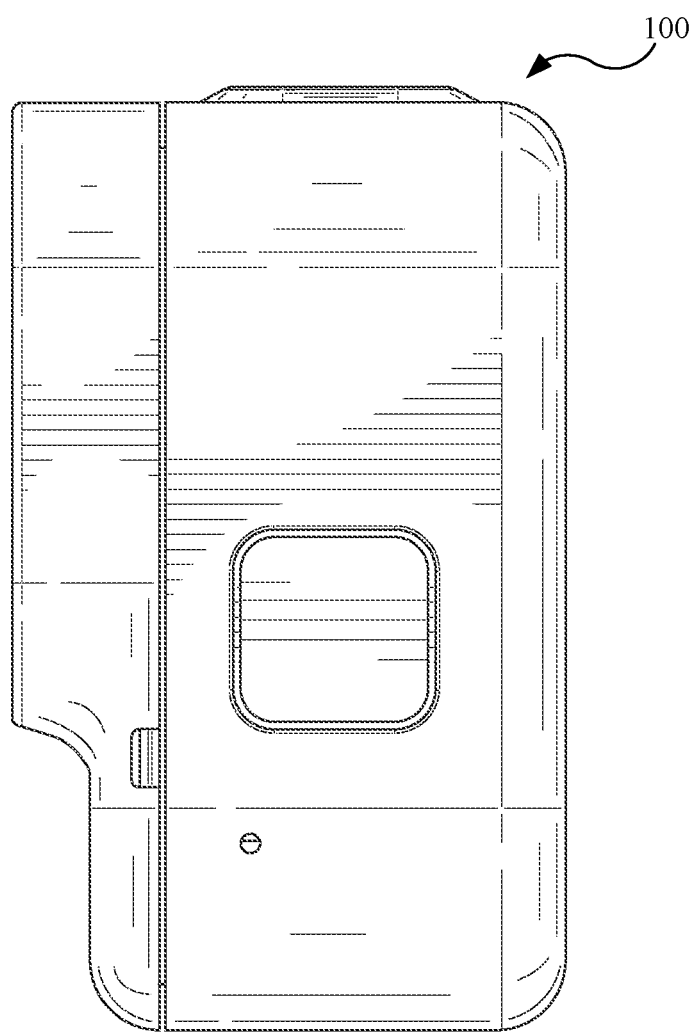
Figure 10F:
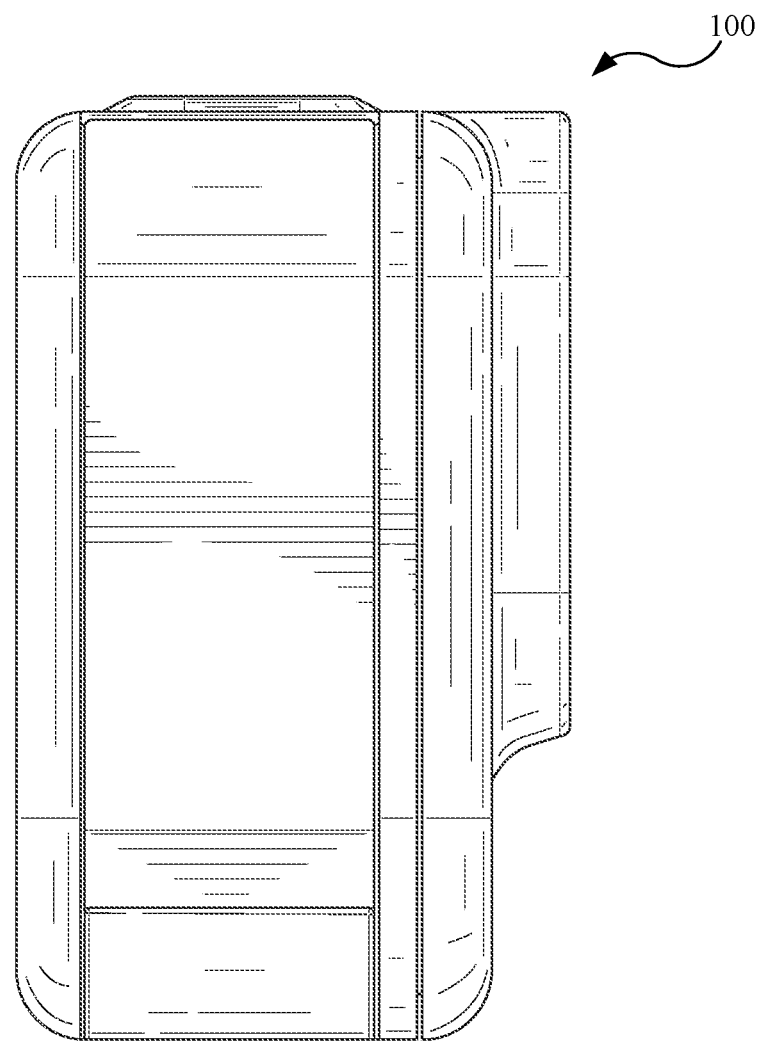
Figure 10G:
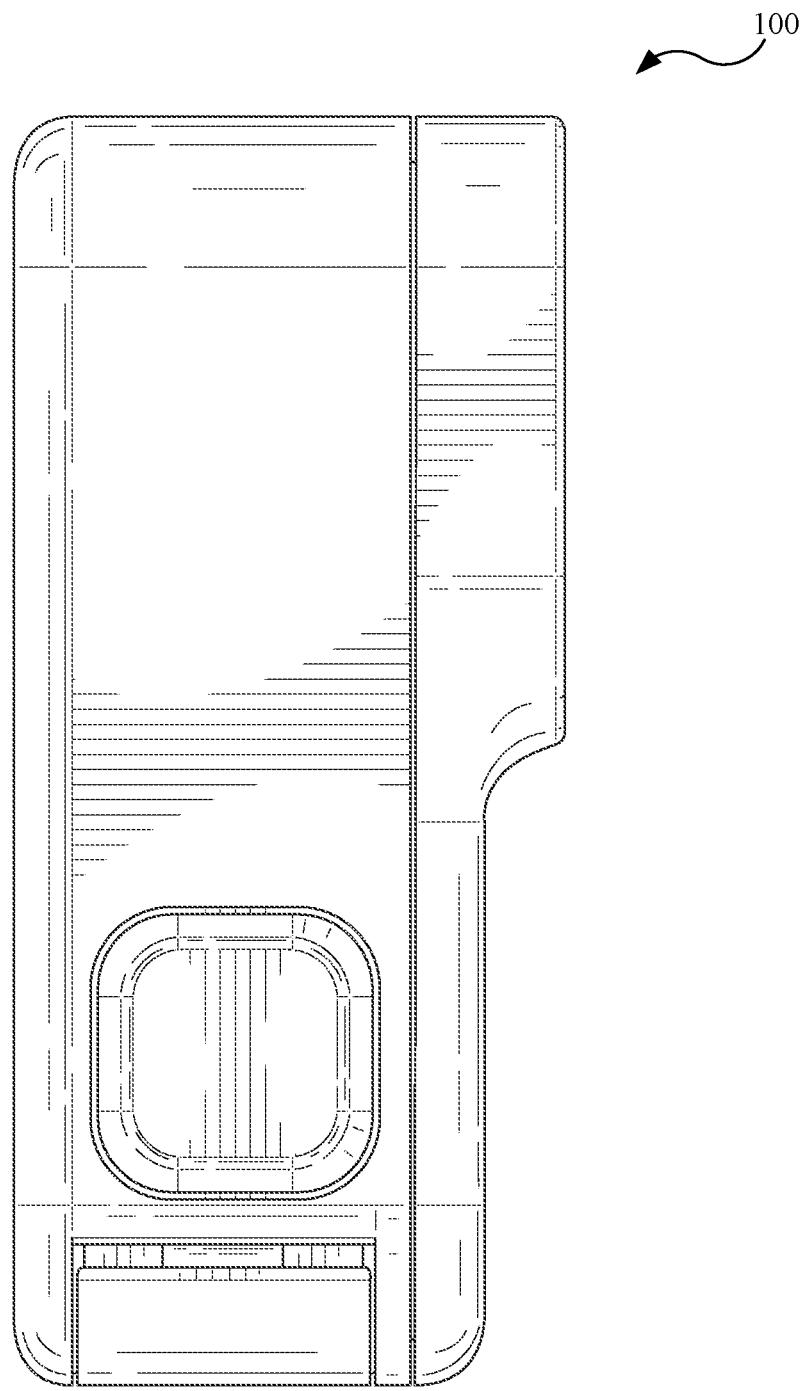
Figure 10H:
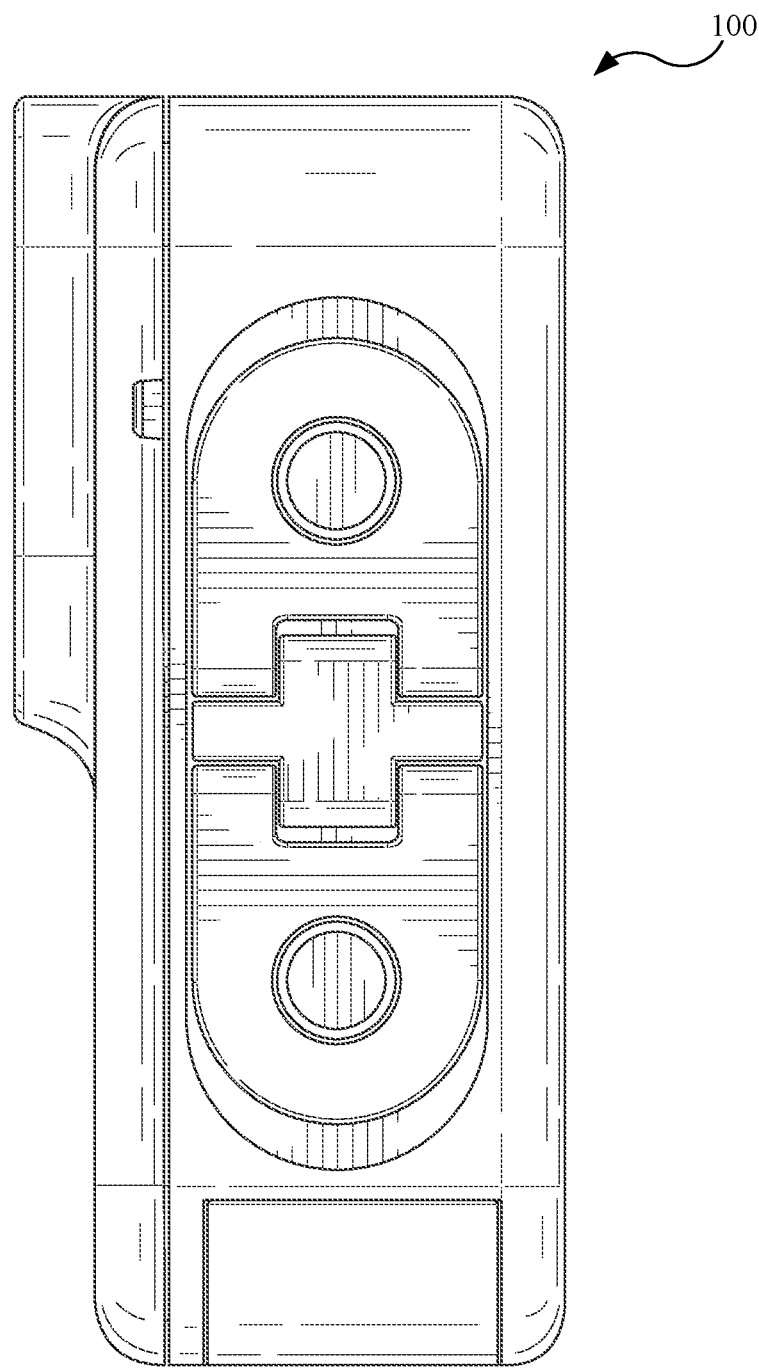
Figure 10I:
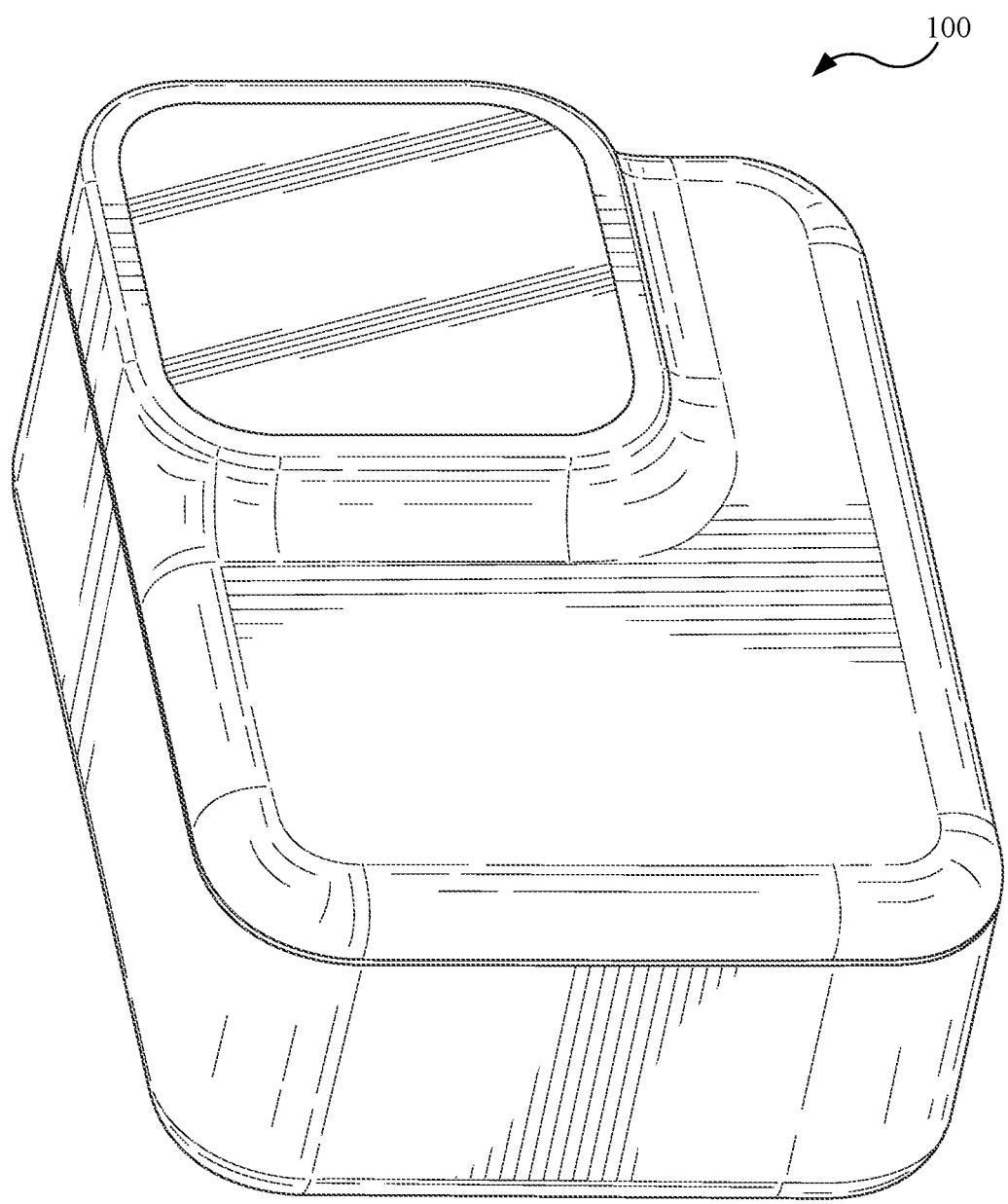
Figure 10J:
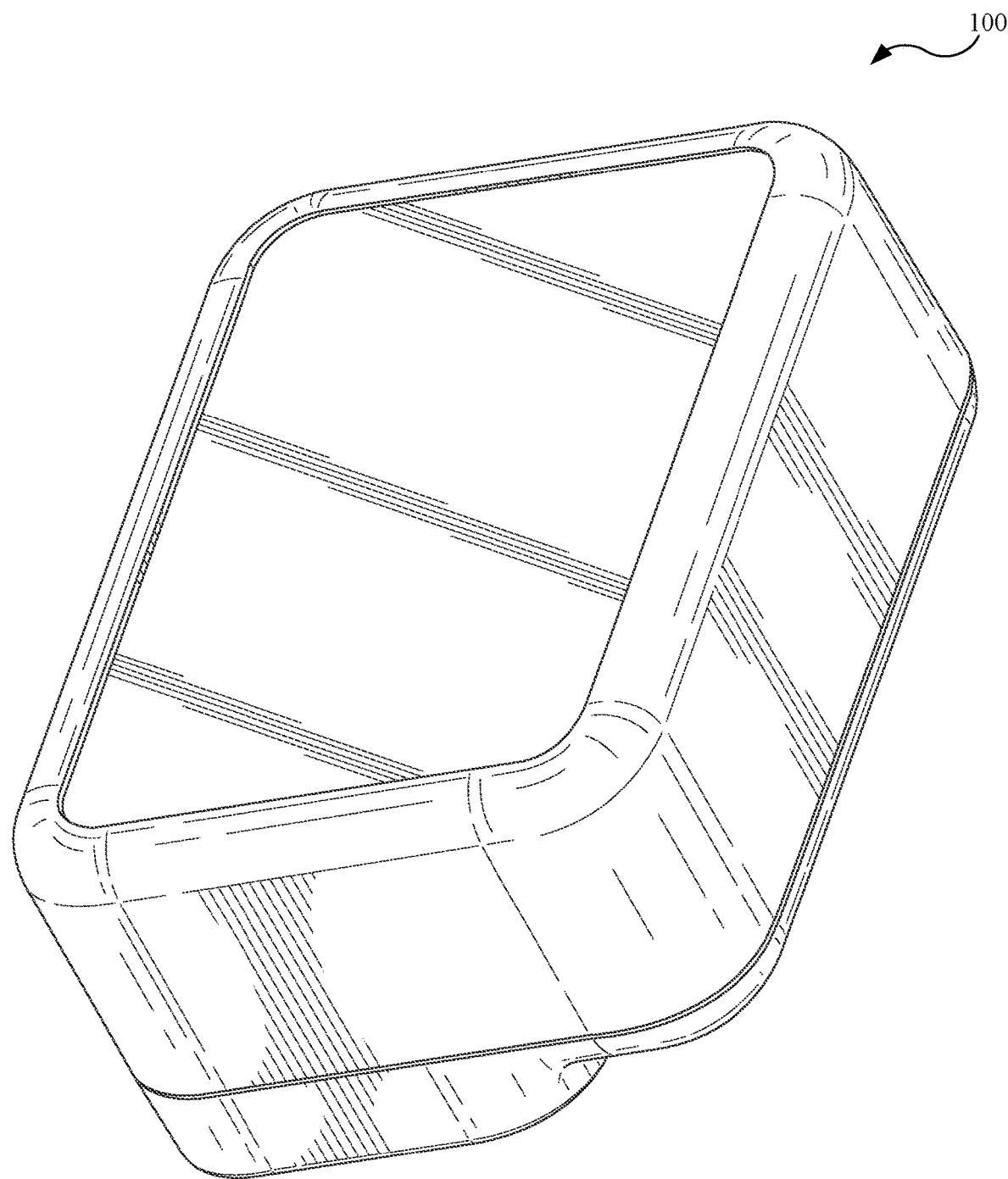
Figure 10K:
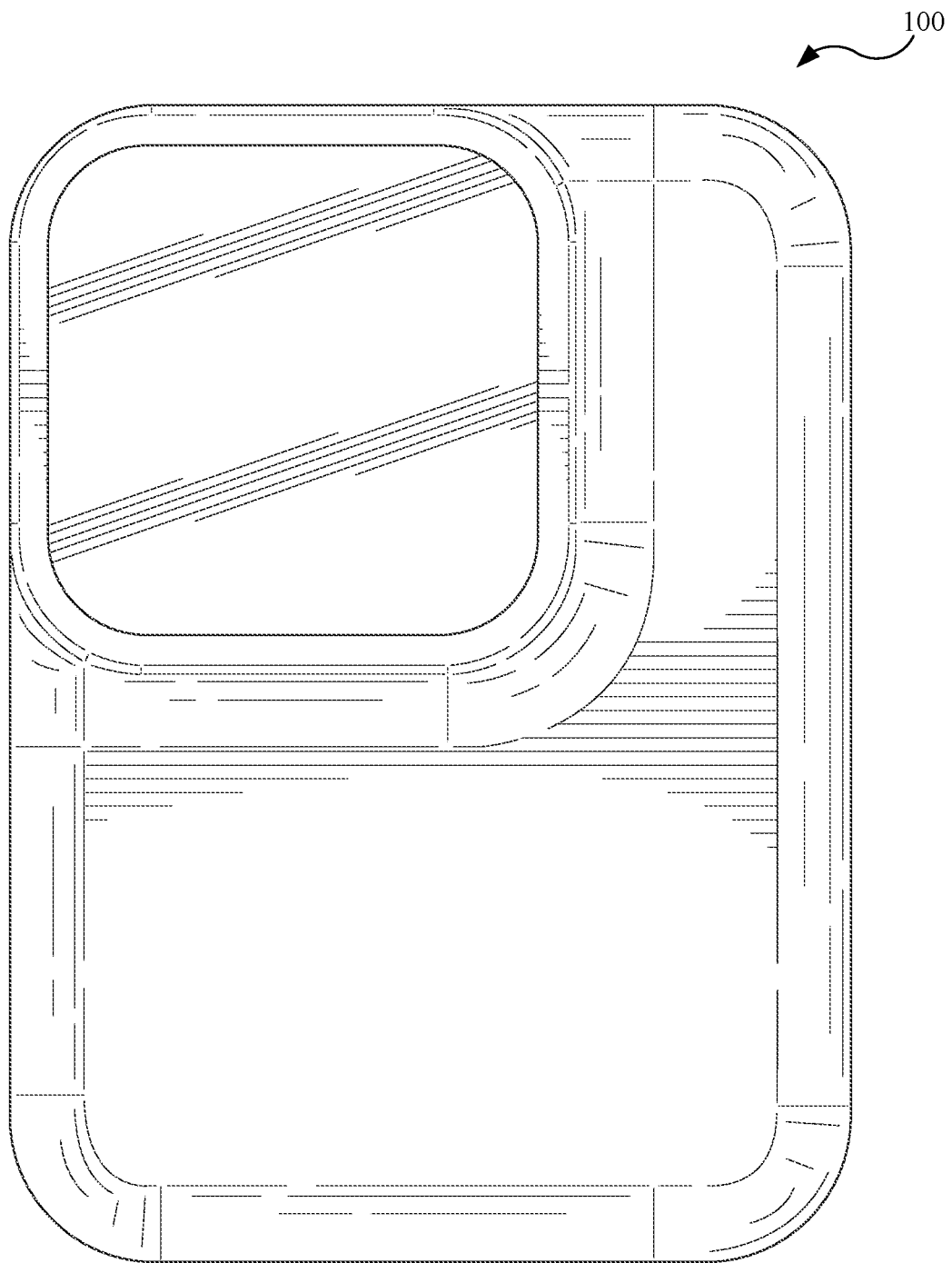
Figure 10L:
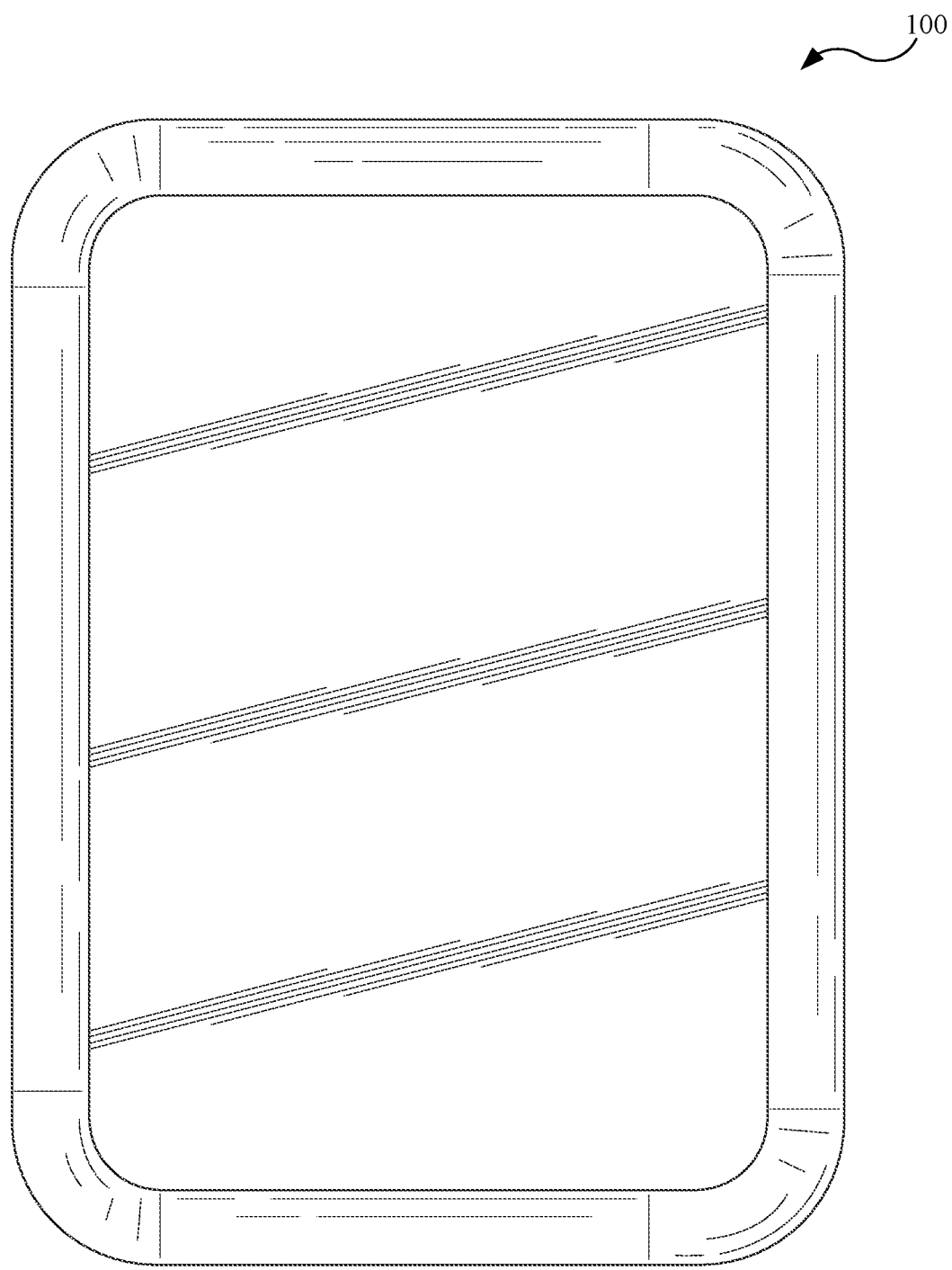
Figure 10M:
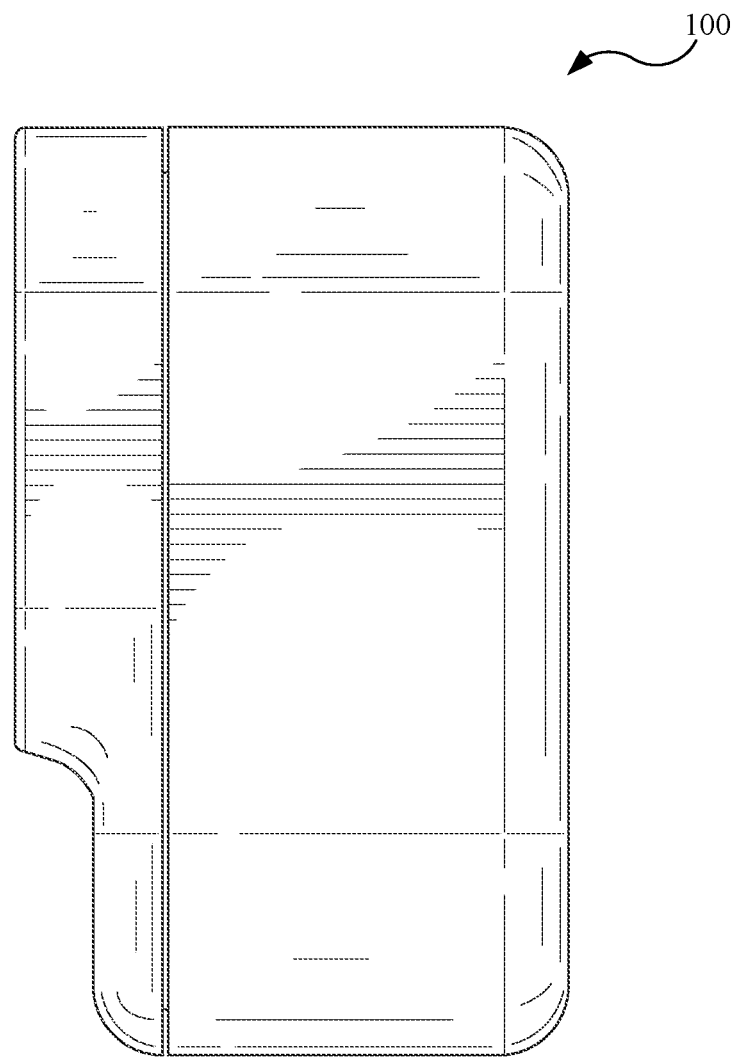
Figure 10N:
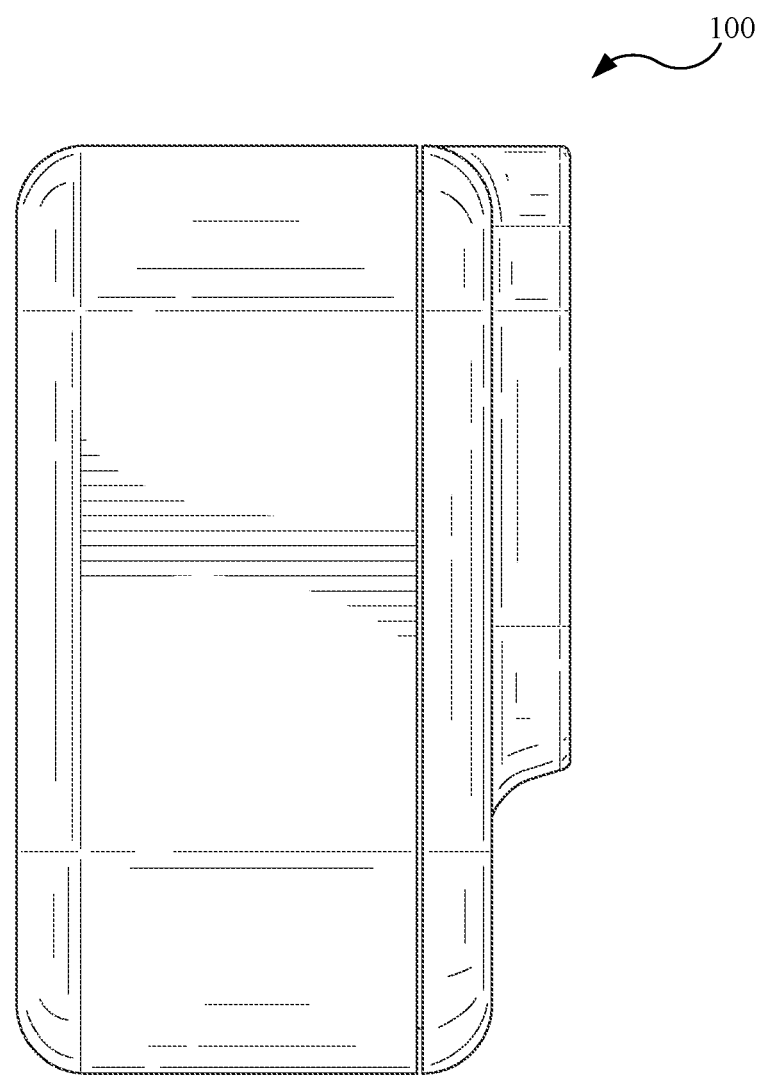
Figure 10O:
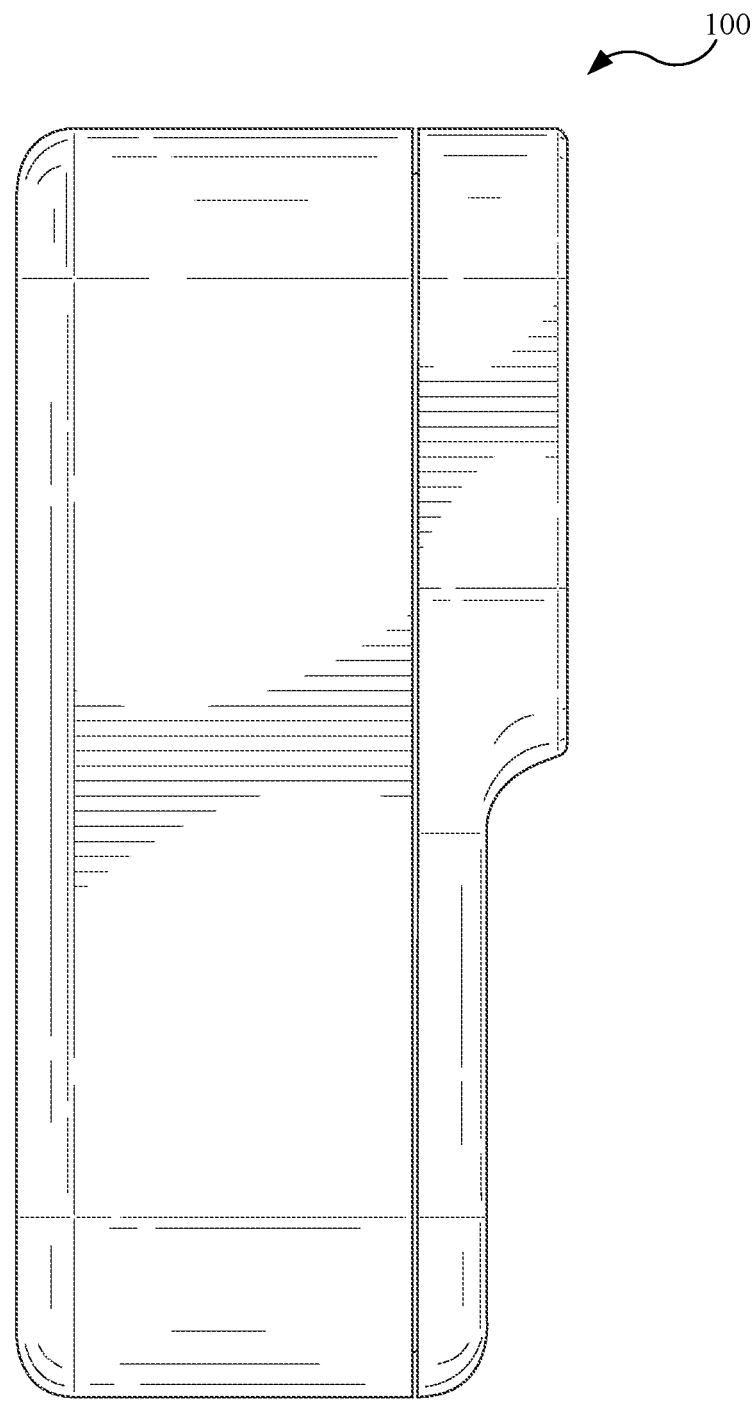
Figure 10P:
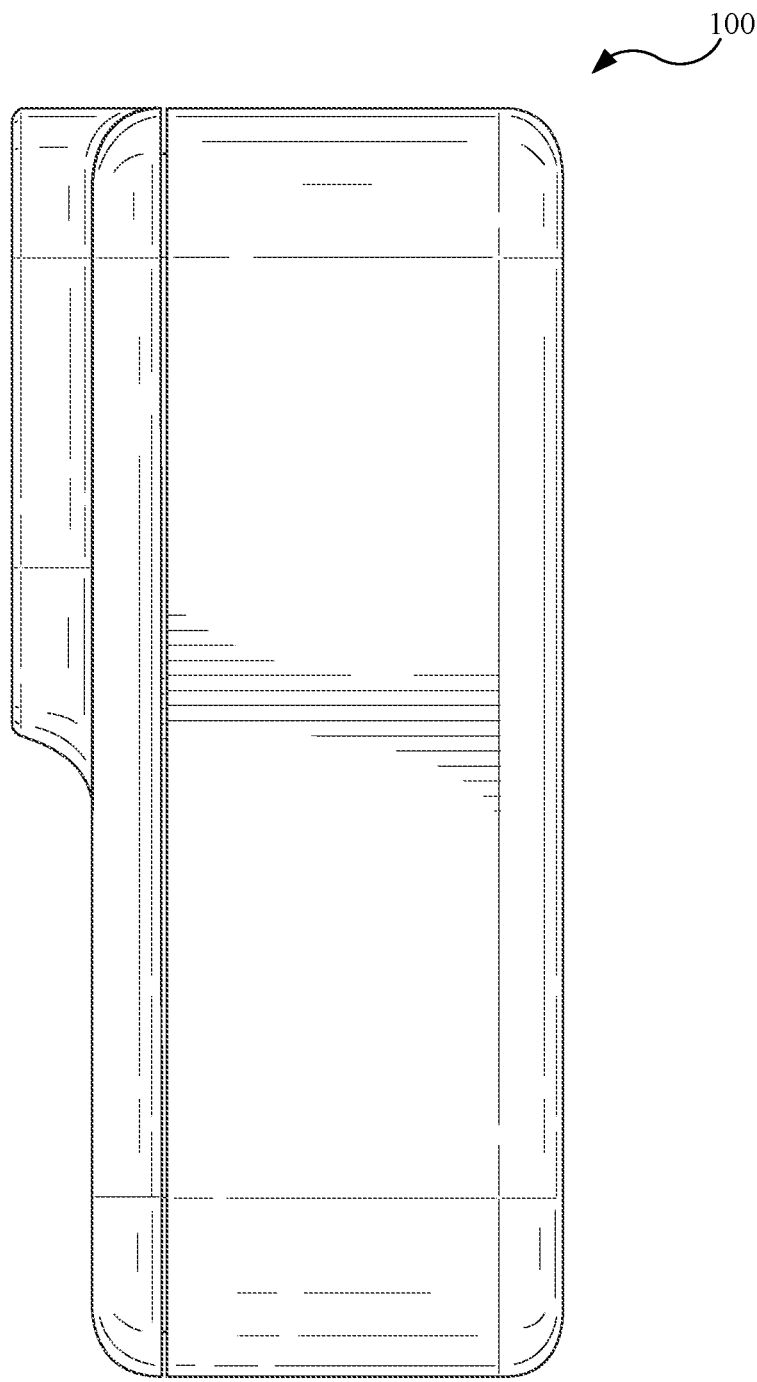

FIGS. 9F-9U are alternative views of the battery housing 980 shown without reference numerals. In FIGS. 9N-9U depict the image capture device 100 in dashed lines and inside the battery housing 980.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An image capture device comprising:
   electronic components that include an image sensor and a processing apparatus; and
   a body that defines an internal compartment containing the electronic components, the body comprising:
   a rear housing extending around a top side, a right side, a bottom side, and a left side of the body; and
   a chassis comprising an upright portion and a lateral portion extending rearward from the upright portion;
   wherein the rear housing and the chassis are coupled to each other to cooperatively form the internal compartment, the upright portion of the chassis being coupled to a front end of the rear housing, and the lateral portion being positioned outside of and below the internal compartment.

2. The image capture device of claim 1, wherein the internal compartment is waterproof, a seal is formed between the upright portion of the chassis and the front end of the rear housing, and the lateral portion extends rearward from the upright portion below the seal.

3. The image capture device of claim 2, wherein the seal is formed by an O-ring compressed between the upright portion of the chassis and the front end of the rear housing, and the lateral portion of the chassis extends rearward from the upright portion below the O-ring.

4. The image capture device of claim 1, further comprising a mount by which the image capture device is removably coupleable to a support device, wherein the mount is coupled to the lateral portion of the chassis and is coupled to the rear housing indirectly by the chassis.

5. The image capture device of claim 4, wherein the bottom side of the body forms a mount receptacle below the internal compartment, the lateral portion of the chassis and the mount being positioned in the mount receptacle.

6. The image capture device of claim 5, wherein the mount includes two finger members that are each pivotable relative to the body between a stowed position and a deployed position, each of the finger members being contained in the mount receptacle in the stowed position and extending outward from the mount receptacle in the deployed position.

7. The image capture device of claim 4, wherein the rear housing defines a mount receptacle, and the lateral portion of the chassis extends through an aperture of the rear housing into the mount receptacle.

8. The image capture device of claim 7, wherein the aperture is positioned below a seal formed between the chassis and the rear housing and above a bottommost surface of the body that is formed by the rear housing.

9. The image capture device of claim 1, wherein the chassis is formed from a first material, and the rear housing is formed from a second material that has a lower yield strength than the first material.

10. The image capture device of claim 9, wherein the first material is a metal, and the second material is a polymer.

11. An image capture device comprising:
a rear housing defining an aperture extending laterally along a width of the image capture device;
a chassis connected to the rear housing so as to form an internal compartment accommodating electronic components of the image capture device, the chassis including a lateral portion extending rearwardly towards the rear housing and into the aperture such that the lateral portion is positioned vertically below the internal compartment along a height of the image capture device; and
a seal positioned between the rear housing and the chassis.

12. The image capture device of claim 11, wherein the seal defines a recessed portion extending about the aperture in the rear housing such that the lateral portion of the chassis extends below the seal.

13. The image capture device of claim 11, wherein the rear housing is formed from a non-metallic material and the chassis is formed from a metallic material such that the chassis supports thermal conduction.

14. The image capture device of claim 11, further comprising a mount coupled to the chassis and configured for connection to a support device such that the image capture device is removably connectable to the support device via the mount.

15. The image capture device of claim 14, wherein the mount is coupled to the lateral portion of the chassis.

16. The image capture device of claim 14, wherein the rear housing defines a receptacle configured to receive the mount.

17. An image capture device comprising:
a rear housing;
a chassis connected to the rear housing so as to form an internal compartment accommodating electronic components of the image capture device, the chassis including a lateral portion extending into the rear housing; and
a mount coupled to the lateral portion and configured for connection to a support device such that the image capture device is removably connectable to the support device via the mount, the mount reconfigurable between a stowed position and a deployed position.

18. The image capture device of claim 17, wherein the lateral portion is positioned vertically below the internal compartment along a height of the image capture device.

19. The image capture device of claim 17, wherein the rear housing defines a receptacle configured to receive the mount.

20. The image capture device of claim 17, wherein the rear housing is formed from a non-metallic material and the chassis is formed from a metallic material such that the chassis supports thermal conduction.

* * * * *